United States Patent [19]
Mansfield et al.

[11] Patent Number: 5,488,476
[45] Date of Patent: Jan. 30, 1996

[54] APPARATUS AND METHOD USING OPTICAL DIFFRACTION TO MEASURE SURFACE ROUGHNESS

[75] Inventors: Daniel Mansfield; Ian Bell; Ian Buehring; Jennifer Harding, all of Leicester, Great Britain

[73] Assignee: Rank Taylor Hobson Limited, Great Britain

[21] Appl. No.: 322,088

[22] Filed: Oct. 12, 1994

Related U.S. Application Data

[63] Continuation of Ser. No. 777,349, Dec. 5, 1991, abandoned.

[30] Foreign Application Priority Data

Apr. 12, 1990 [GB] United Kingdom ................ 9008331

[51] Int. Cl.$^6$ .................................................. G01B 9/02
[52] U.S. Cl. ............................................ 356/354; 356/371
[58] Field of Search .................................. 336/354, 355, 336/356, 357, 358, 360, 371, 237

[56] References Cited

U.S. PATENT DOCUMENTS

| | | |
|---|---|---|
| 4,846,578 | 7/1989 | Morita et al. |
| 5,106,192 | 4/1992 | Tucker et al. ........................... 356/358 |

OTHER PUBLICATIONS

Optical Engineering, vol. 24, No. 3, May/Jun. 1985 (Bellingham, Wash.), R. Brodmann et al.: "Optical roughness measuring instrument for fine-machined surfaces," pp. 408–413.

Patent Abstracts of Japan, vol. 10, No. 250 (P-491) (2306), 28 Aug. 1986, & JP, A, 6180010 (Hitachi Ltd) 23 Apr. 1986.

Patent Abstracts of Japan, vol. 8, No. 75 (P-266)(1512), 7 Apr. 1984, & JP. A. 58221104 (Hitashi Seisakusho K.K.) 22 Dec. 1983.

Patent Abstracts of Japan, vol. 10, No. 250 (P-491)(2306), 28 Aug. 1986, & JP, A, 6177709 (Omron Tateisi Electronics Co.), 21 Apr. 1986.

Patent Abstracts of Japan, vol. 11, No. 9 (P-534) (2456), 10 Jan. 1987, & JP, A, 61186829 (Victor Co. of Japan Ltd.), 20 Aug. 1986.

*Primary Examiner*—Samuel A. Turner
*Attorney, Agent, or Firm*—Lerner, David, Littenberg, Krumholz & Mentlik

[57] ABSTRACT

Apparatus for measuring surface roughness utilizes diffraction patterns derived from the surface under test. The energies in the different orders are detected and processed utilizing various different algorithms dependent upon a number of factors such as the number of orders in the diffraction pattern and asymmetry in the diffraction pattern. Various filter functions both for the diffraction pattern itself and for values of surface roughness after measurement are disclosed. One algorithm for measuring surface roughness involves comparison of values representing the energy orders with reference values, preferably reference values obtained by an interpolation operation between one set of reference values representative of a diffraction pattern from a symmetrical surface and another set representative of a diffraction pattern from an asymmetrical surface.

66 Claims, 43 Drawing Sheets

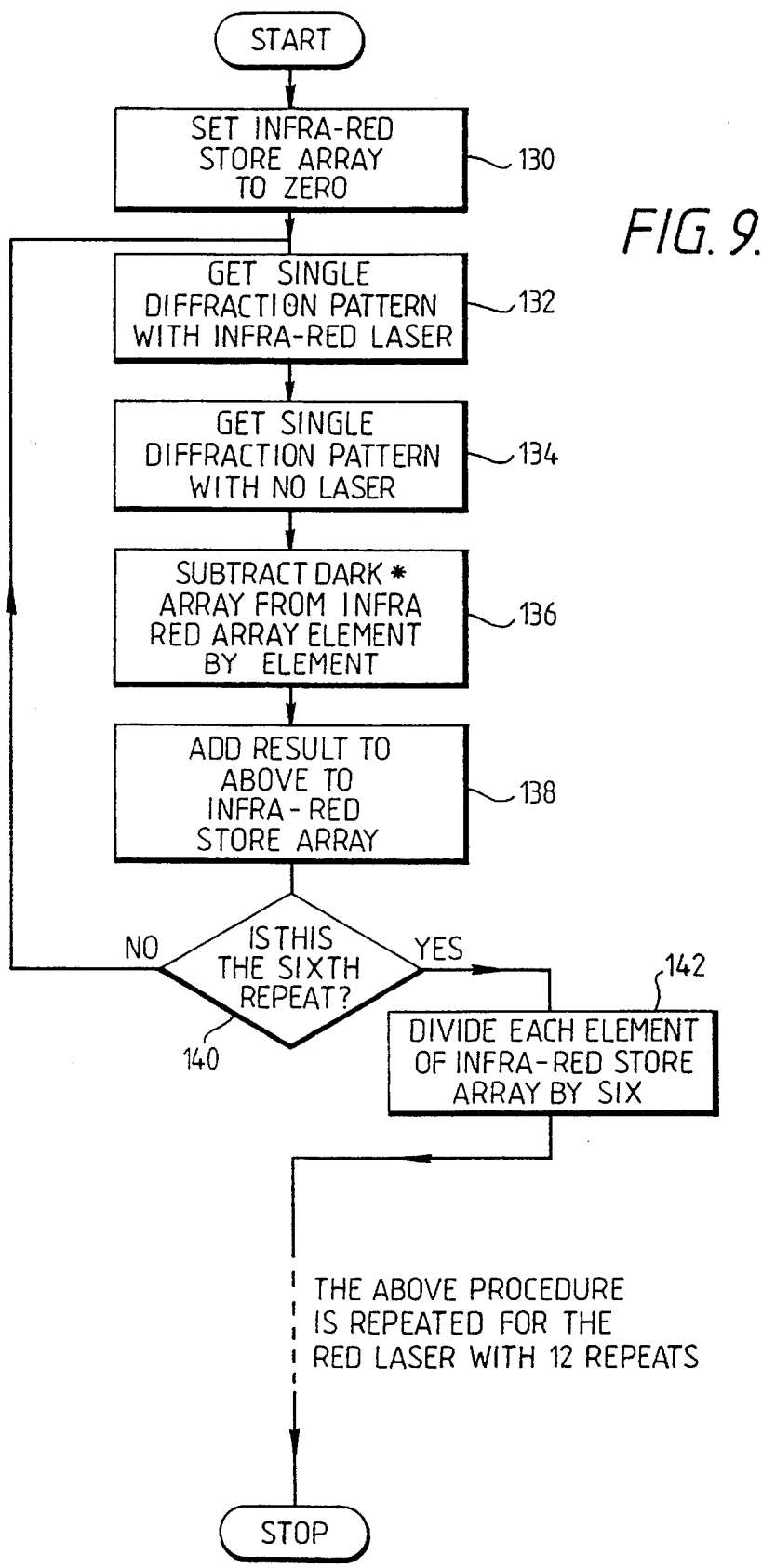

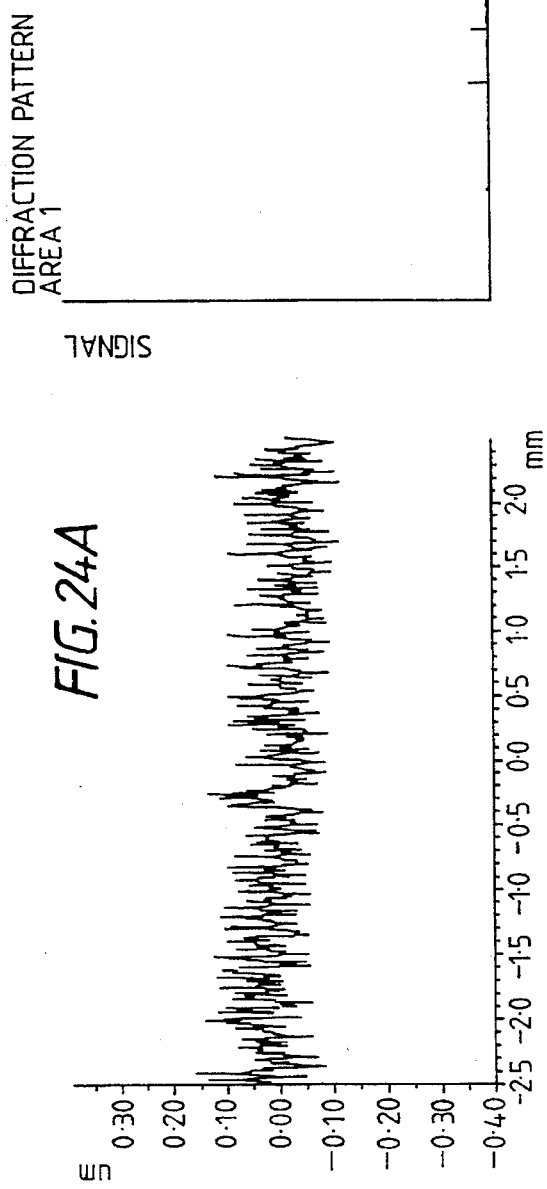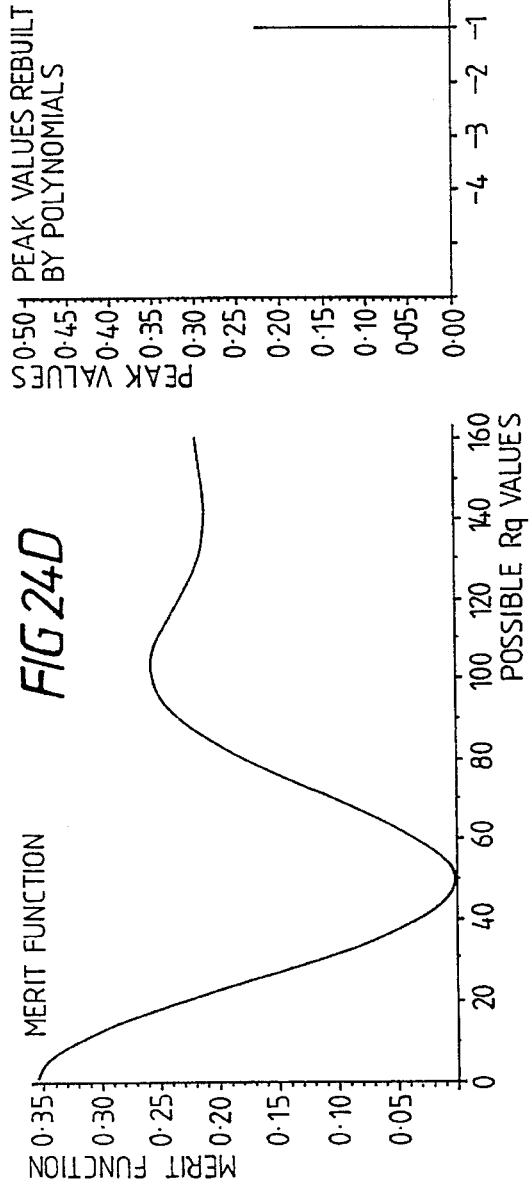

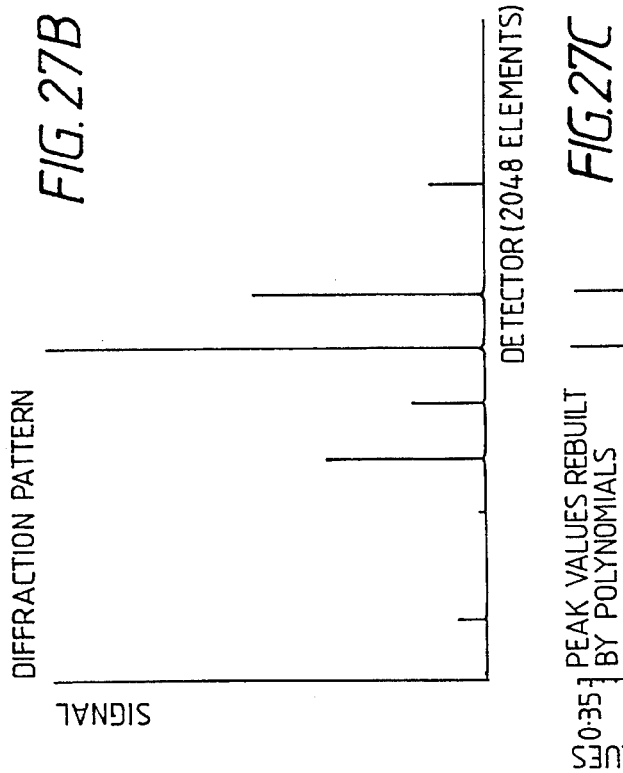
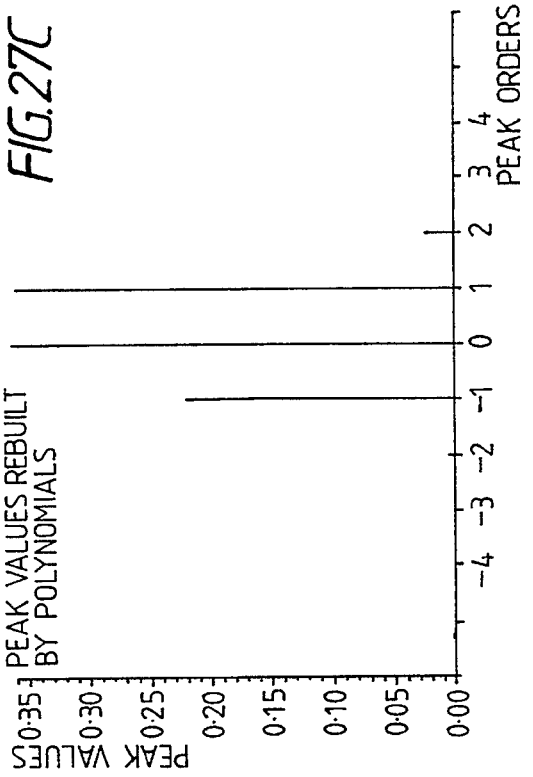
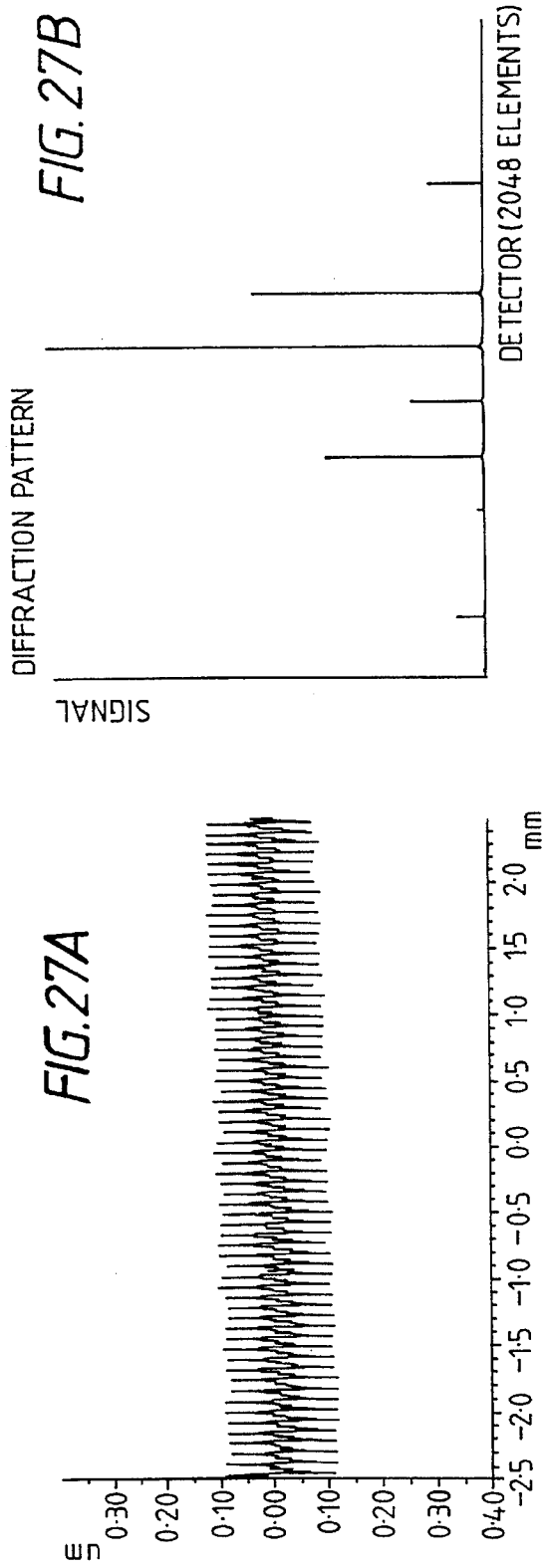
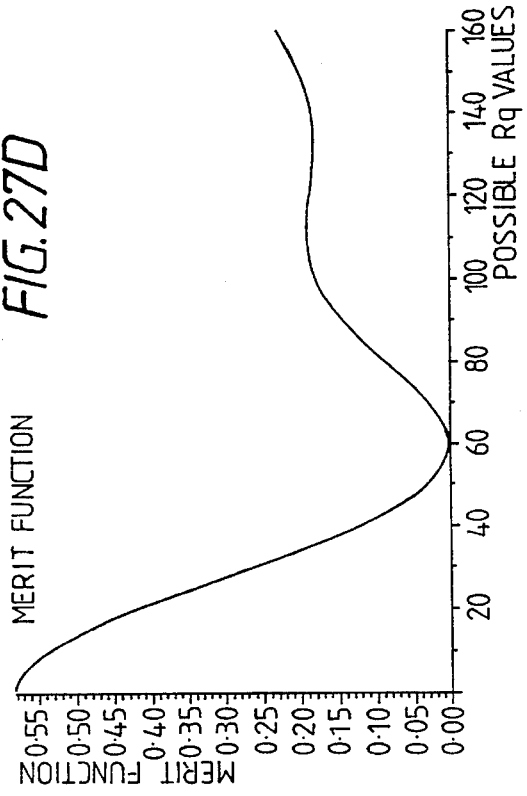

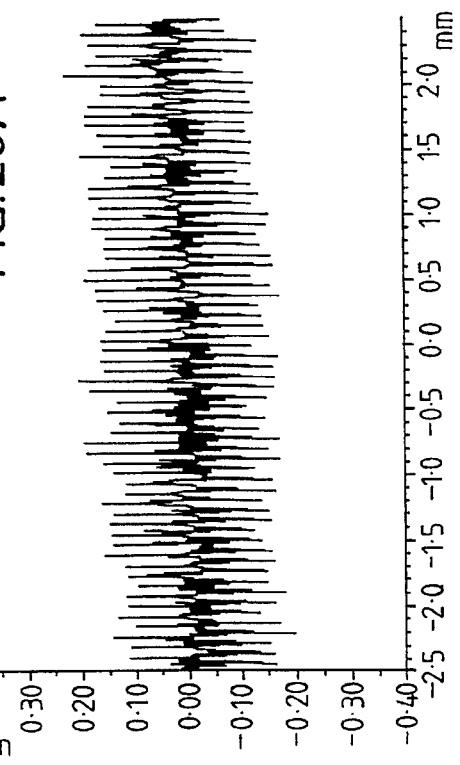
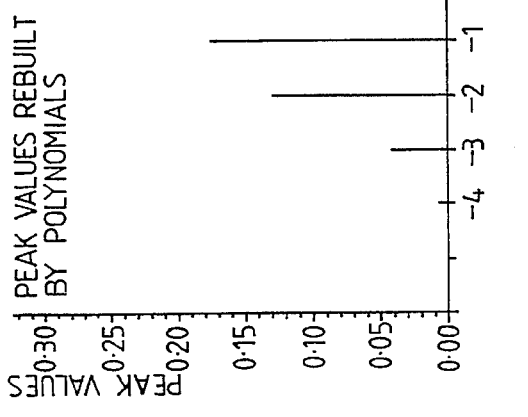
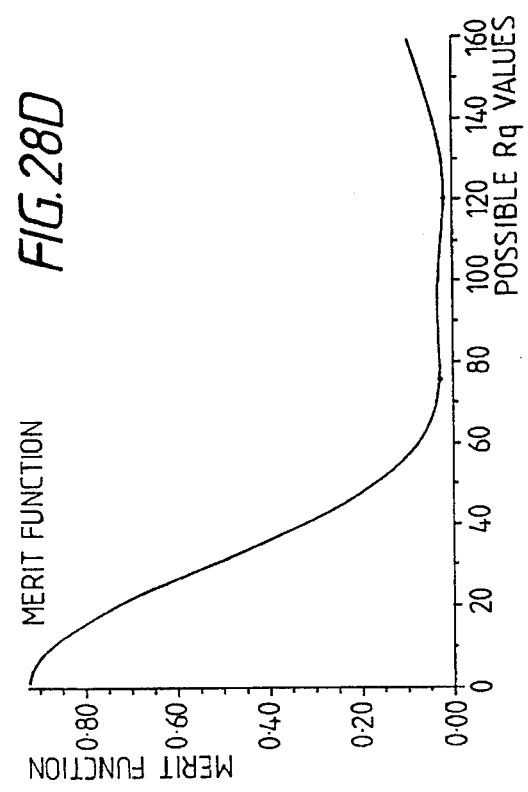

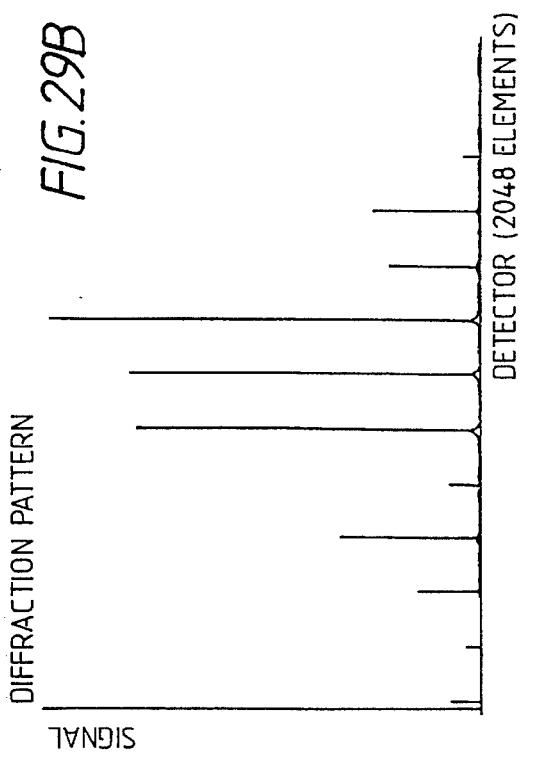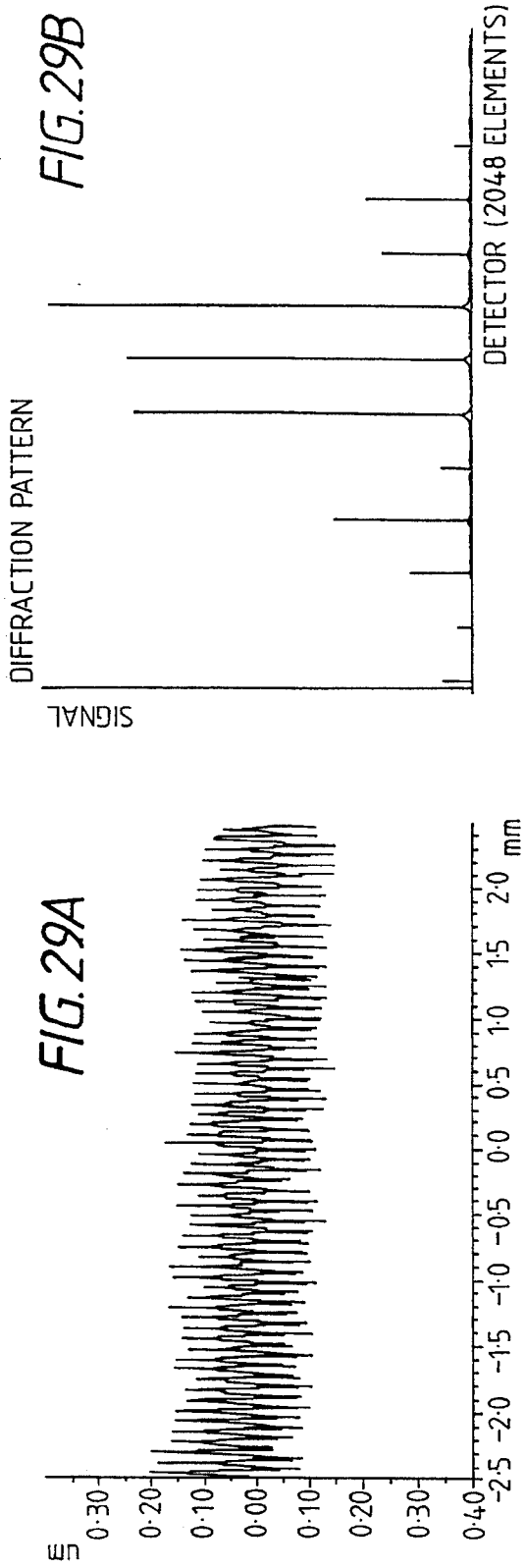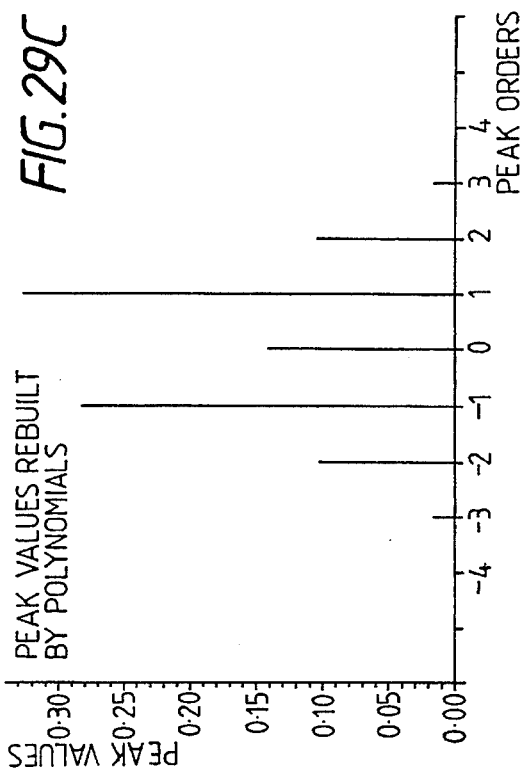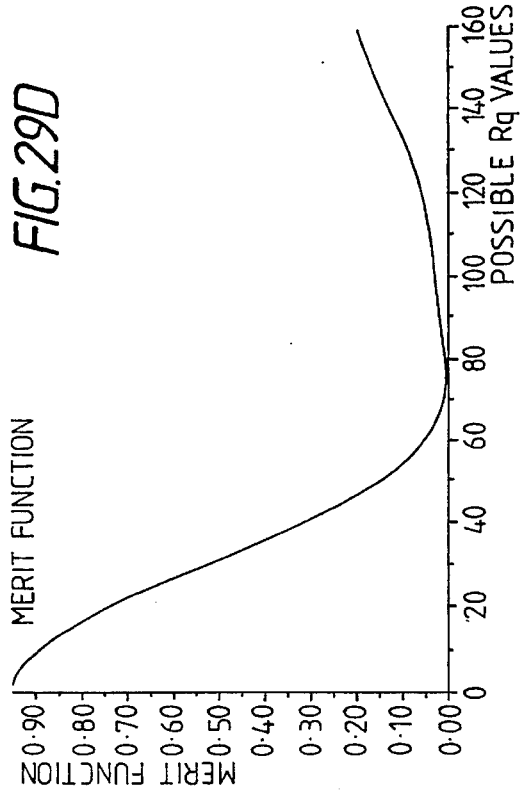

FIG. 38 A
FIG. 38 B
FIG. 38 C
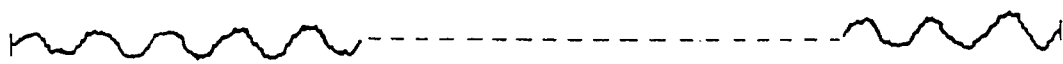
FIG. 38 D

APPARATUS AND METHOD USING OPTICAL DIFFRACTION TO MEASURE SURFACE ROUGHNESS

This is a continuation of application Ser. No. 07/77,349, filed Dec. 5, 1991 now abandoned.

This invention relates to apparatus and method for the measurement of surface characteristics of a workpiece, such as surface roughness.

Conventionally, surface characteristics, such as roughness, of a workpiece have been obtained by drawing a stylus across the surface, recording its movements with an appropriate transducer and carrying out calculations on the resulting signals to obtain, for example, Root Mean Square (RMS) roughness Rq and other quantities. This method is not suitable for all surfaces since damage to the surface can result, and it is an inherently slow process.

With a view to avoiding this problem, proposals have been made in the prior art for calculating Rq utilising a diffraction pattern produced by reflecting monochromatic light from the surface of the workpiece. Discussion of such techniques can be found in the following papers:

1. "Relation Between Surface Roughness and Specular Reflectance at Normal Incidence" by Bennett et al , Journal of the Optical Society of America,
   Vol. 51 No. 2, February 1961, pages 123 to 129.
2. "The Practical Application of Diffraction Techniques to Assess Surface Finish of Diamond Turned Parts" by Hingle et al , Annals of the CIRP, Vol. 32/1/1983 pages 499 to 501.
3. "The Use of Bessel Functions to Extend the Range of Optical Diffraction Techniques for In-Process Surface Finish Measurements of High Precision Turned Parts" by Rakels J. Phys. E: Sci. Instrum. 19 (1986).
4. "Surface Profile Measurement from Intensity of Diffracted Light Using the Phase Retrieval Method" by Sasaki et al, Applied Optics, Vol. 24, No. 16, 15 Aug. 1985, pages 2696 to 2700.

The proposals contained in these papers would, if implemented, only permit the measurement of Rq over a small range of values and none has resulted in a practical instrument of commercial utility.

In one aspect, the invention provides a method and apparatus for measurement of surface roughness in which the energy distribution in a diffraction pattern derived from the surface is compared with reference values to obtain a measure of Rq.

In another aspect, the invention provides a method and apparatus for measuring surface roughness in which the number of orders in a diffraction pattern derived from the surface is counted and an algorithm for deriving Rq is selected according to the number of orders present.

In a further aspect, the invention provides a method and apparatus for measuring surface roughness in which a set of reference values for the energy distribution in a diffraction pattern derived from the surface is produced by interpolation between values derived from theoretical surfaces of different characteristics, such as a theoretical surface having an asymmetrical profile and a theoretical surface having a relatively symmetrical profile.

In a further aspect, the invention provides a method and apparatus for measuring surface roughness in which surface roughness is derived from the energy content in the zero order of a diffraction pattern derived from the surface. Preferably, surface roughness is computed utilising a Gaussian function. Preferably the diffraction pattern is subject to a filtering operation prior to application of the Gaussian function.

In a further aspect, the invention provides a method and apparatus for measuring surface characteristics of a workpiece in which comparison of the energy content of a selected order, preferably the zero order, in each of two diffraction patterns produced respectively by light of different wavelength is effected, and the result of the comparison utilised in the determination of the surface characteristic.

In a further aspect, the invention provides a method and apparatus for measuring surface roughness of a workpiece in which the range of values within which surface roughness falls is determined by comparison of the energy content of a selected order, preferably the zero order, in each of two diffraction patterns produced respectively by light of different wavelength.

In a further aspect, the invention provides a method and apparatus for processing a diffraction pattern, which comprises detecting the zero order thereof. Preferably the zero order is detected by producing first and second diffraction patterns with light of different wavelengths and locating an order in one of the patterns which is coincident with an order in the other. This method is particularly applicable to processing diffraction patterns for measuring surface characteristics such as roughness but may also have other applications.

In a further aspect, the invention provides a method and apparatus for processing a diffraction pattern in which filtering is applied to the pattern to enhance the peak structure. For example, the filter may be applied so as to at least reduce the effect of surface waviness and for wavefront distortion. This method is particularly applicable to processing a diffraction pattern for measurement of surface characteristics such as roughness but may also have other applications where it is desired to enhance the structure of a diffraction pattern prior to utilising the pattern for the derivation of information.

The invention is described further, by way of example, with reference to the accompanying drawings, in which:

FIGS. 7 to 9 are further flow charts showing in more detail, one of the steps illustrated in the flow chart of FIGS. 6A and 6B;

Figure 10A:
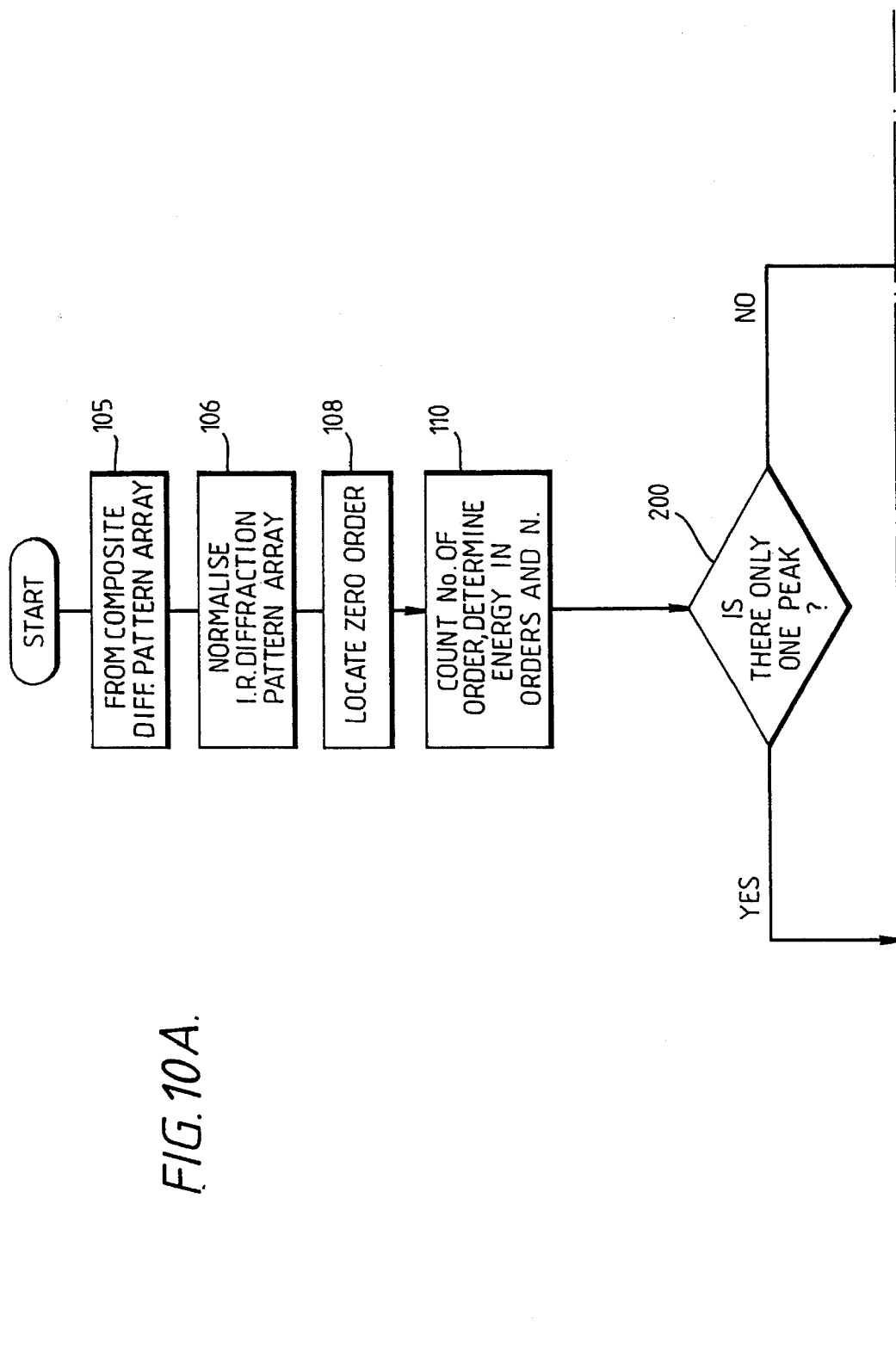
FIGS. 10A and 10B show is a flow chart showing in more detail another of the steps in the flow chart of FIGS. 6A and B.
Figure 10B:
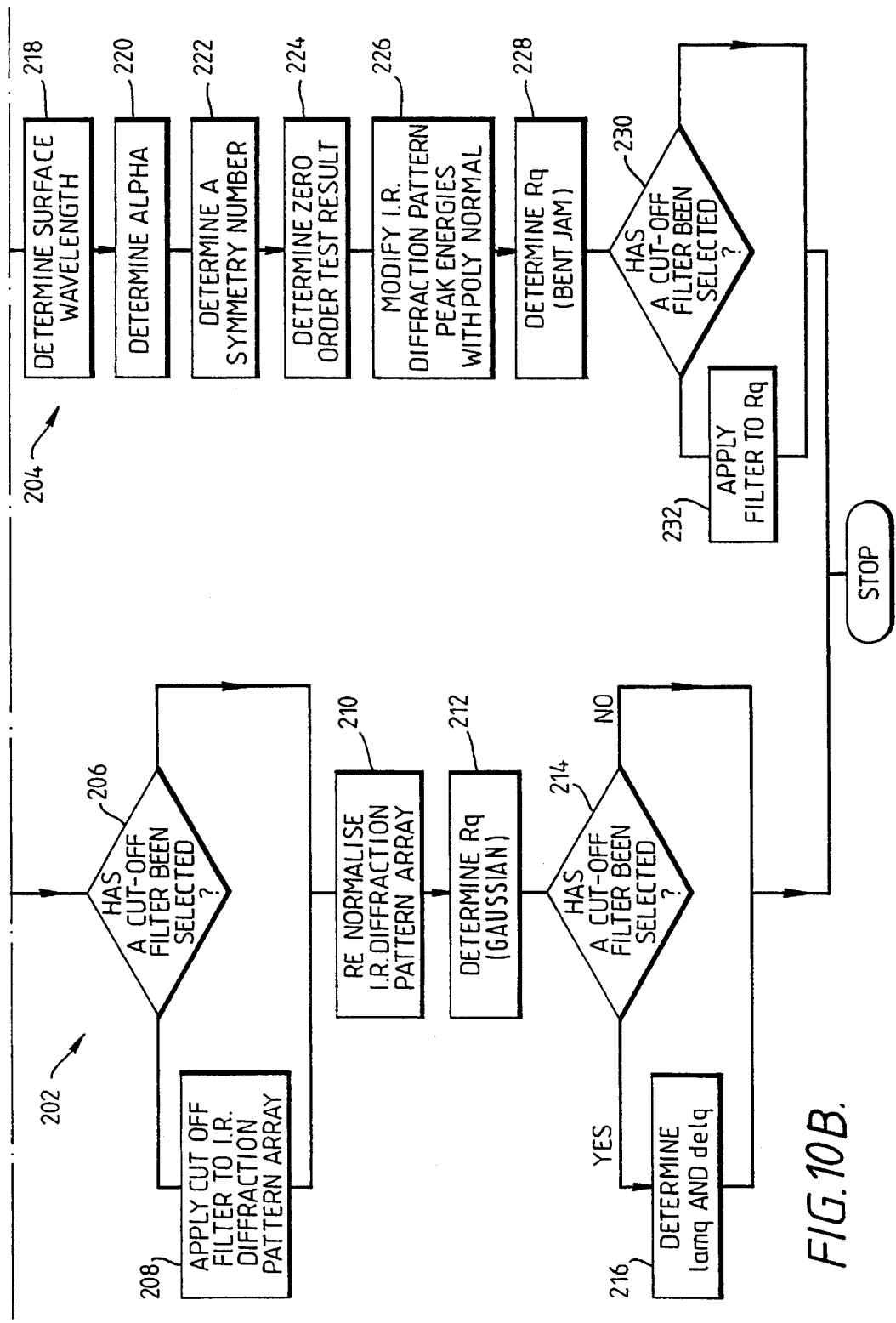
Figure 11A:
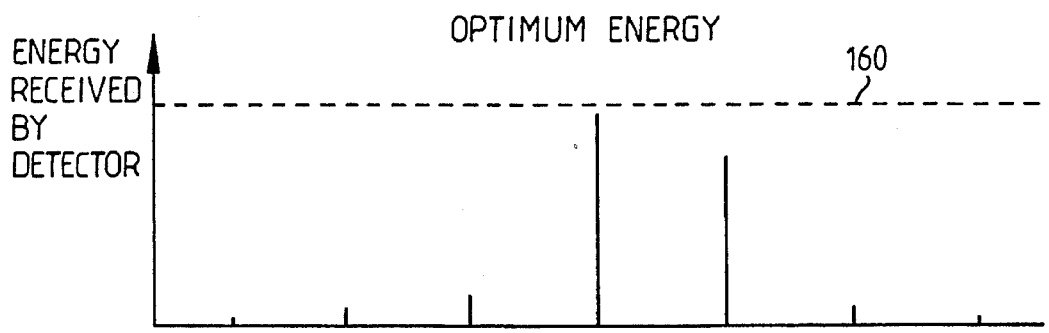
Figure 11B:
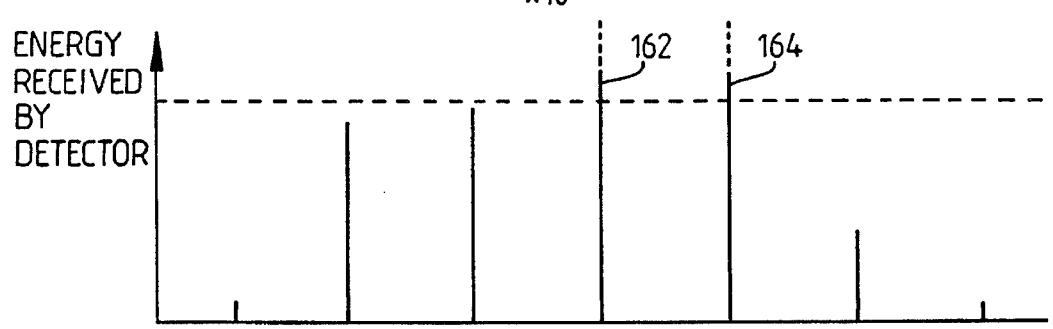
Figure 11C:
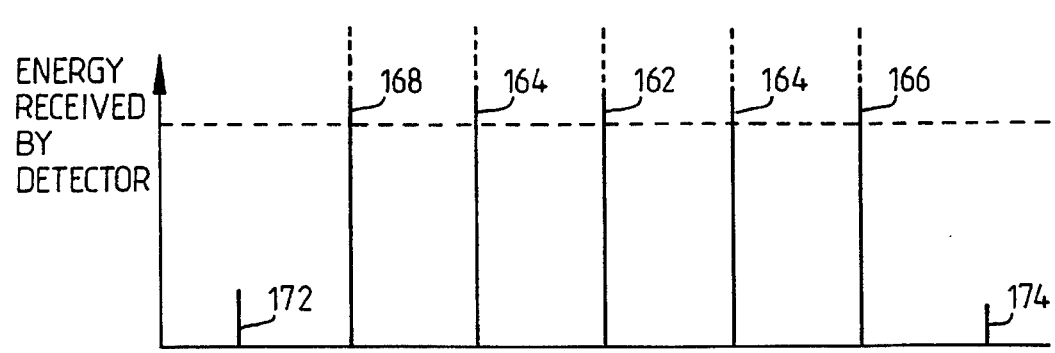
Figure 12:
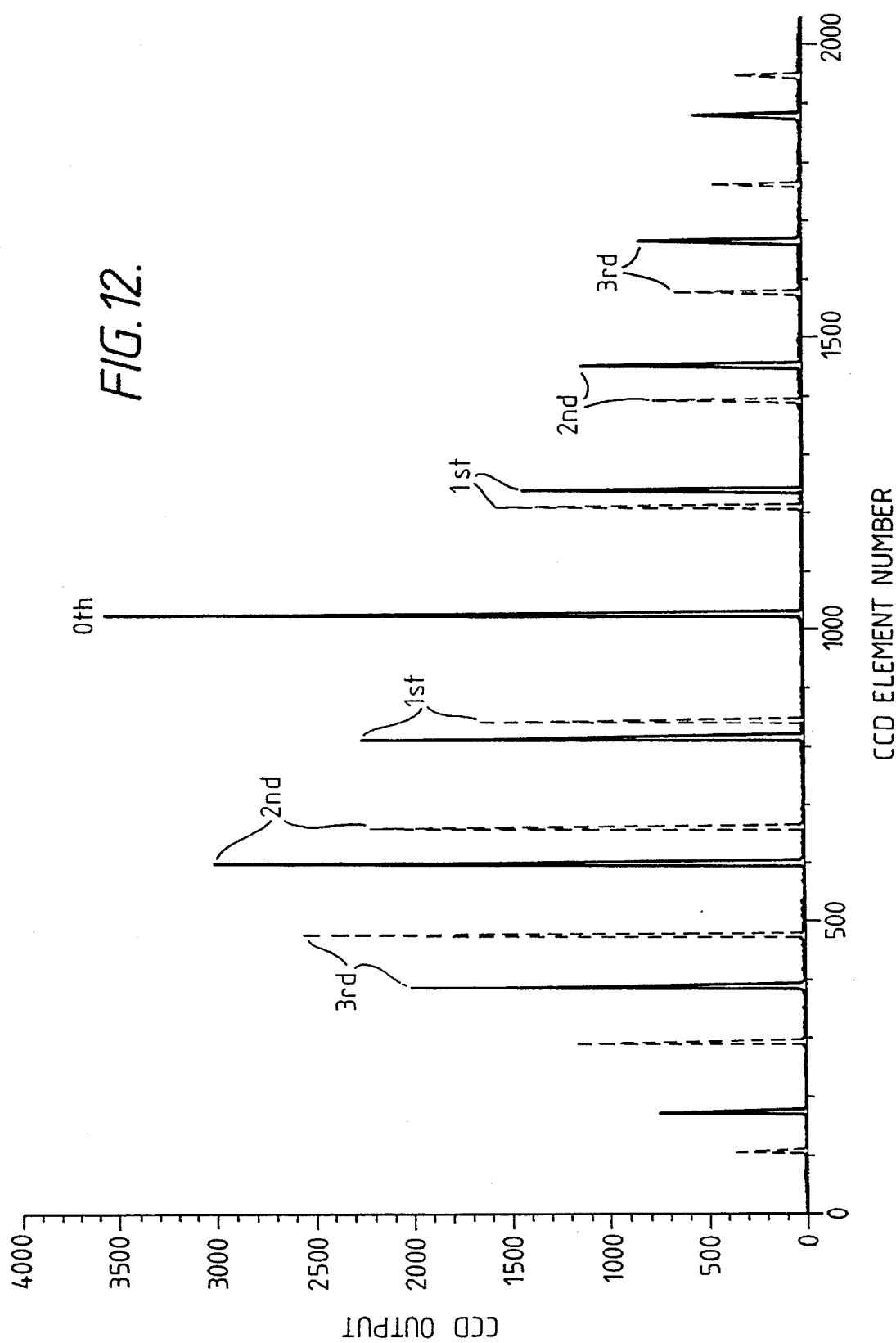
Figure 19:
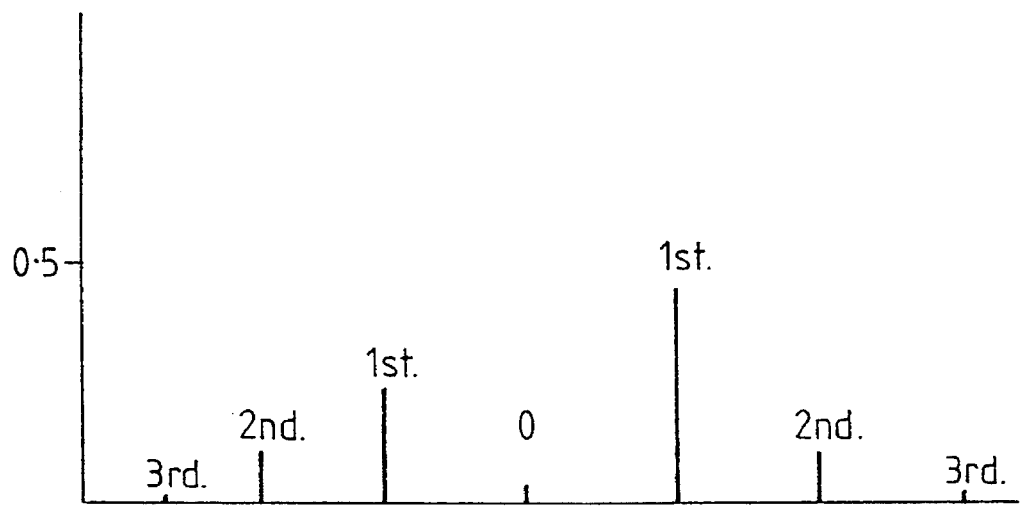
Figure 20:
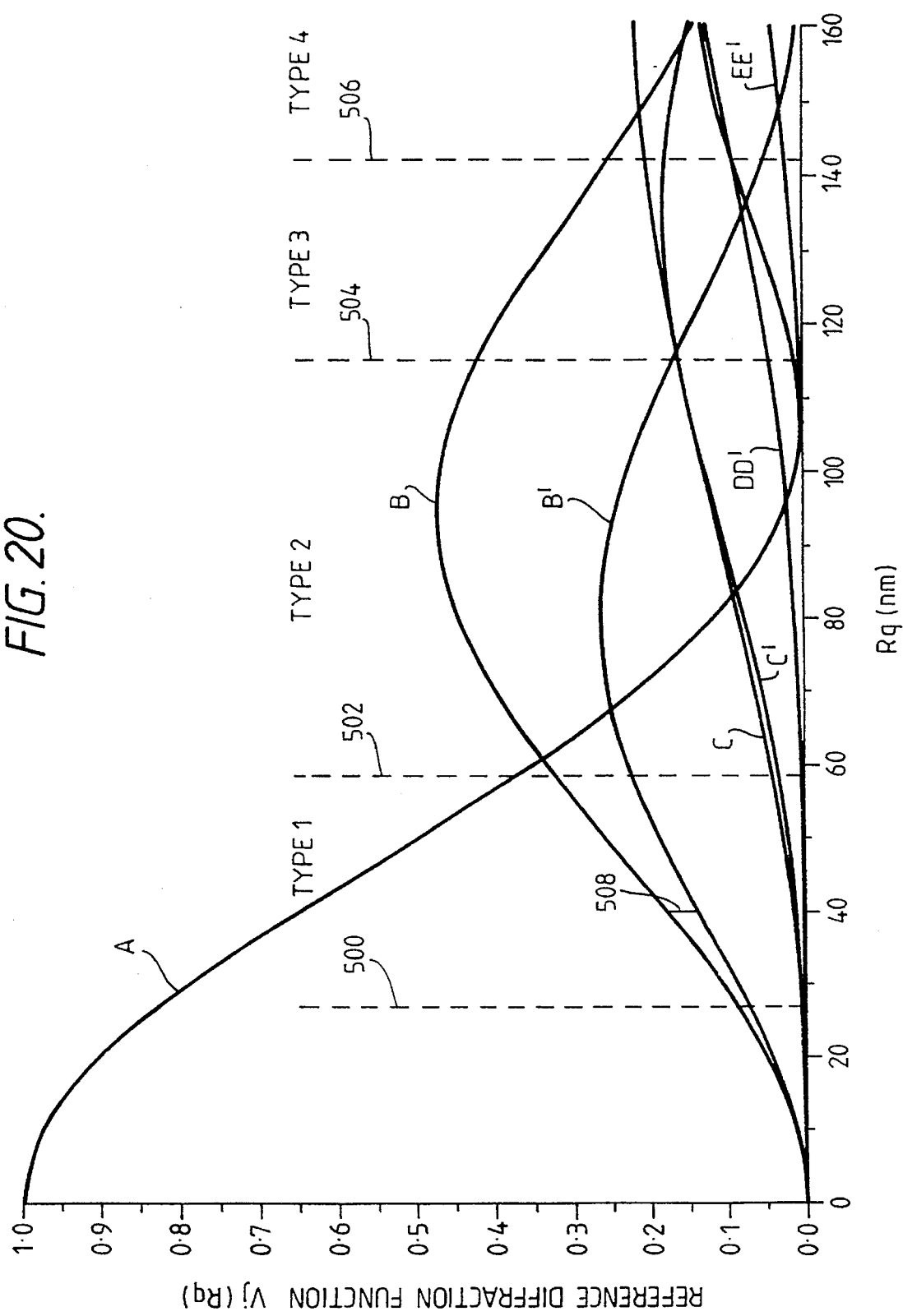
Figure 21:
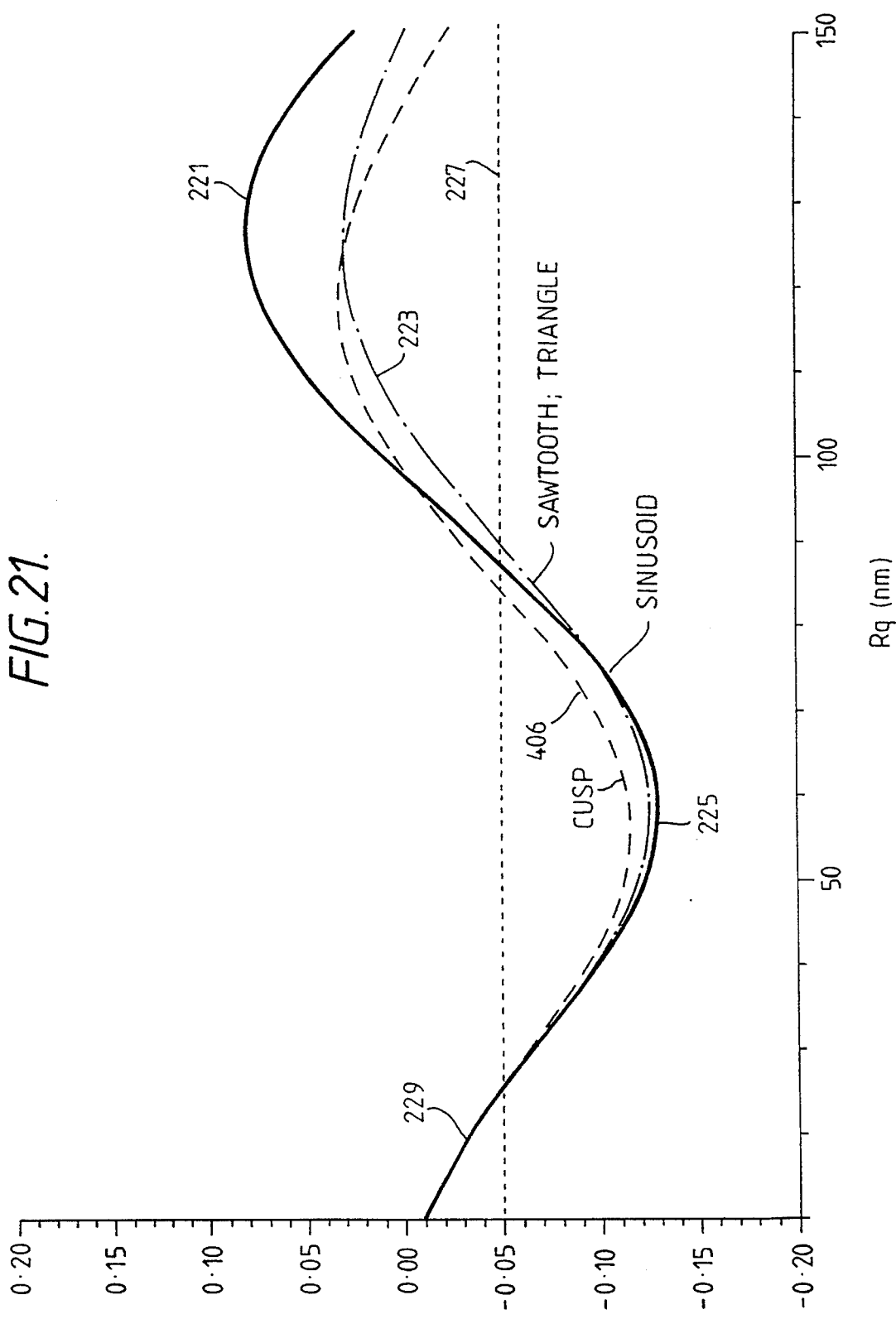
Figure 22A:
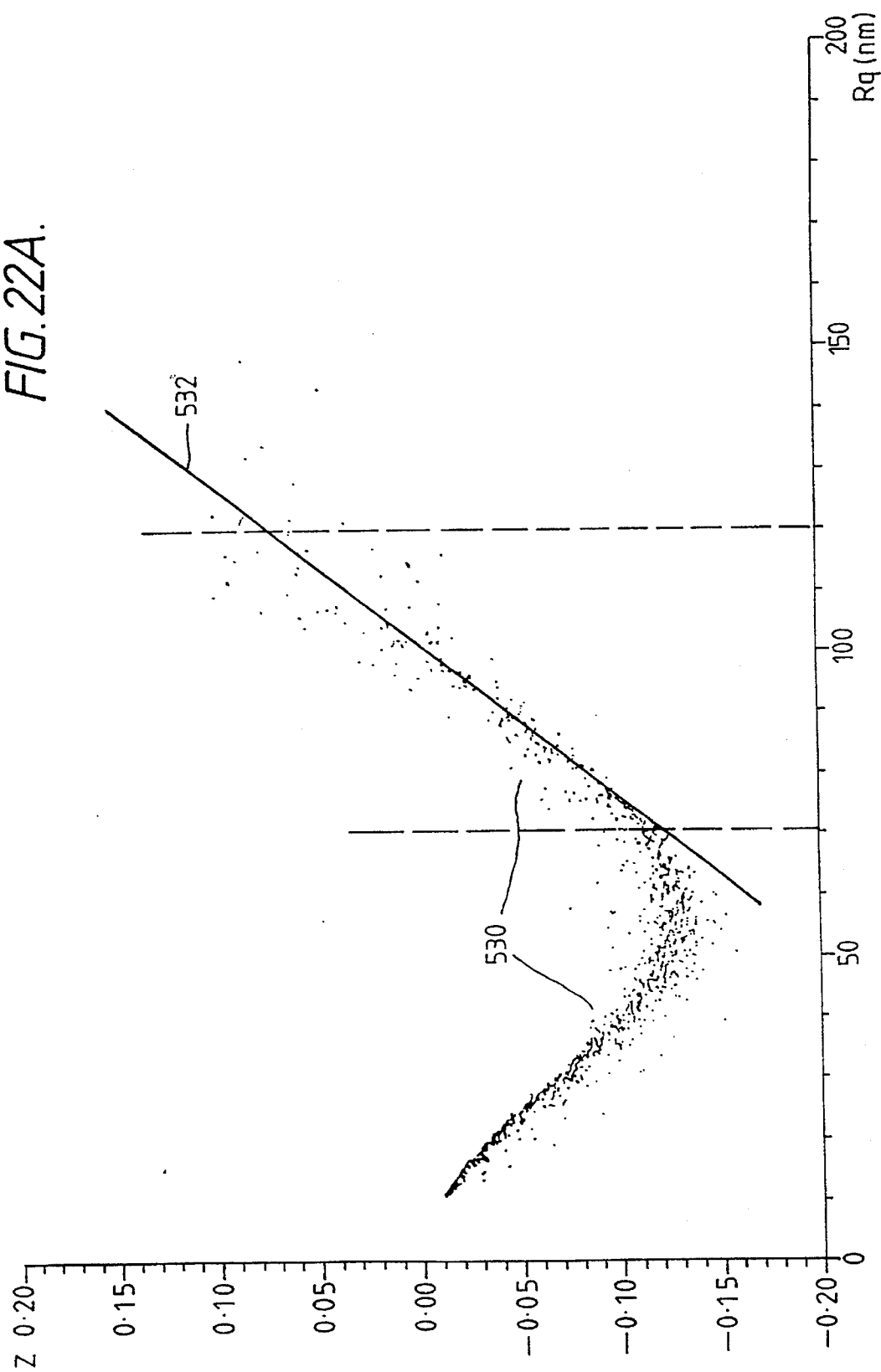
Figure 22B:
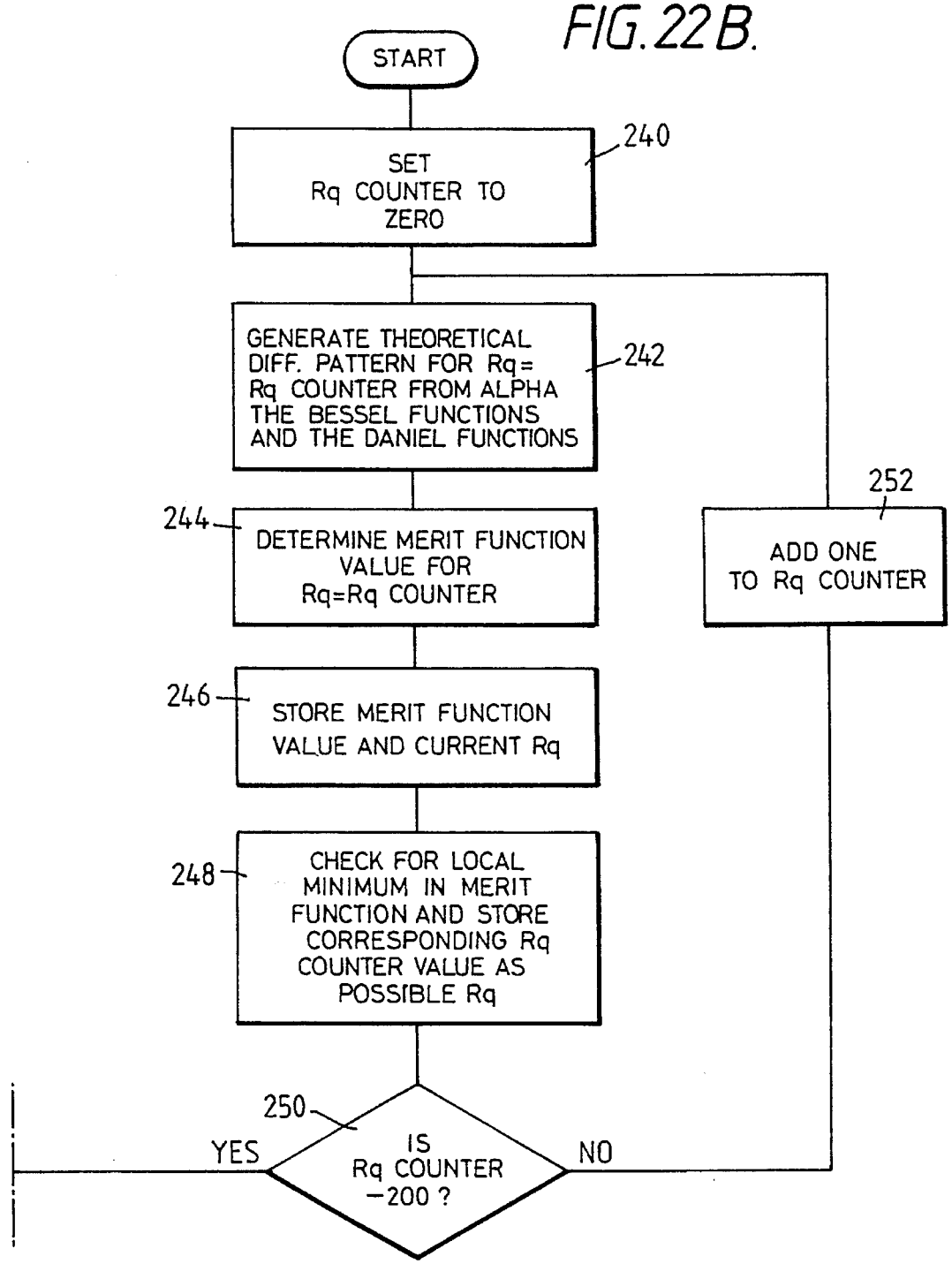
Figure 22C:
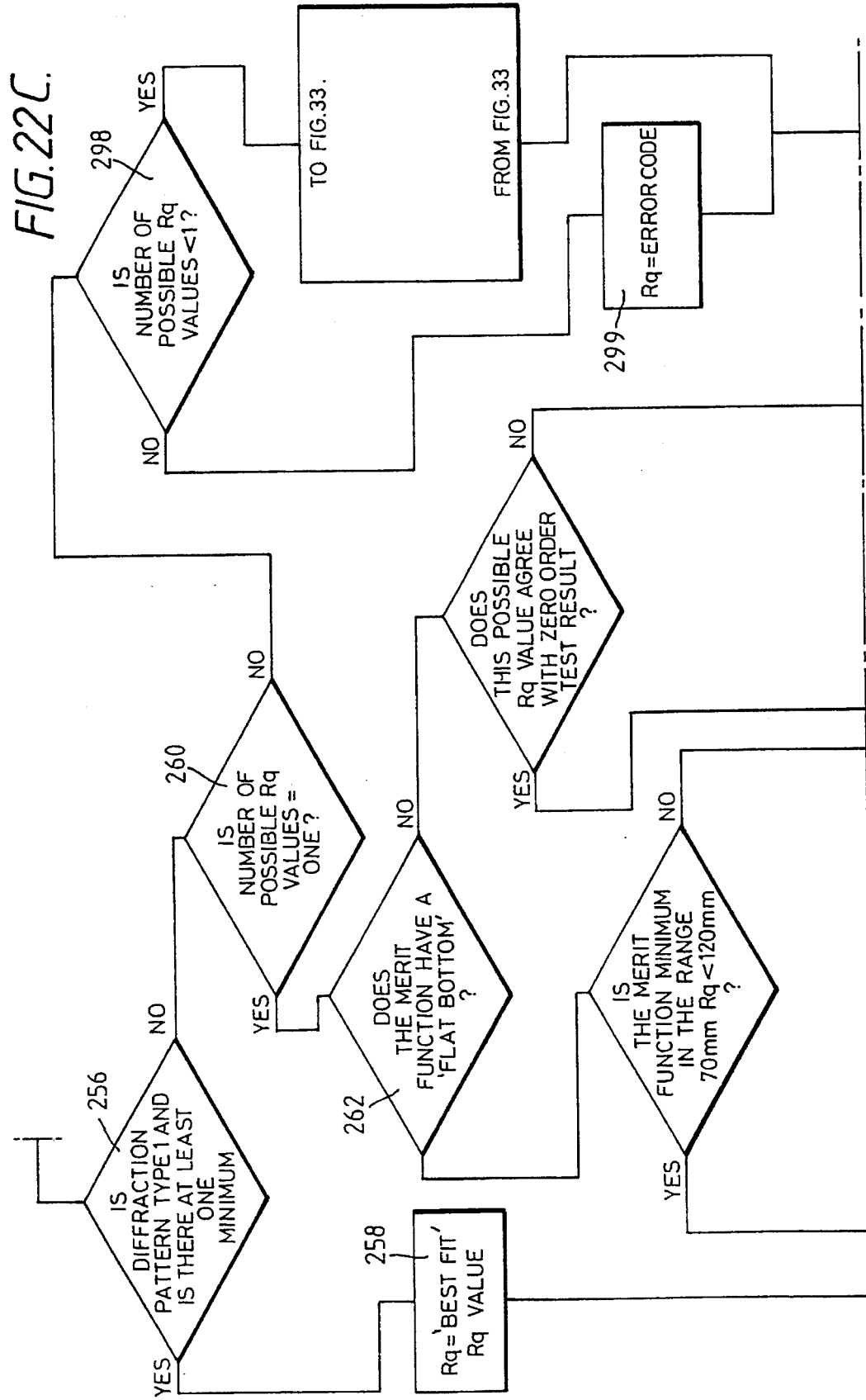
Figure 22D:
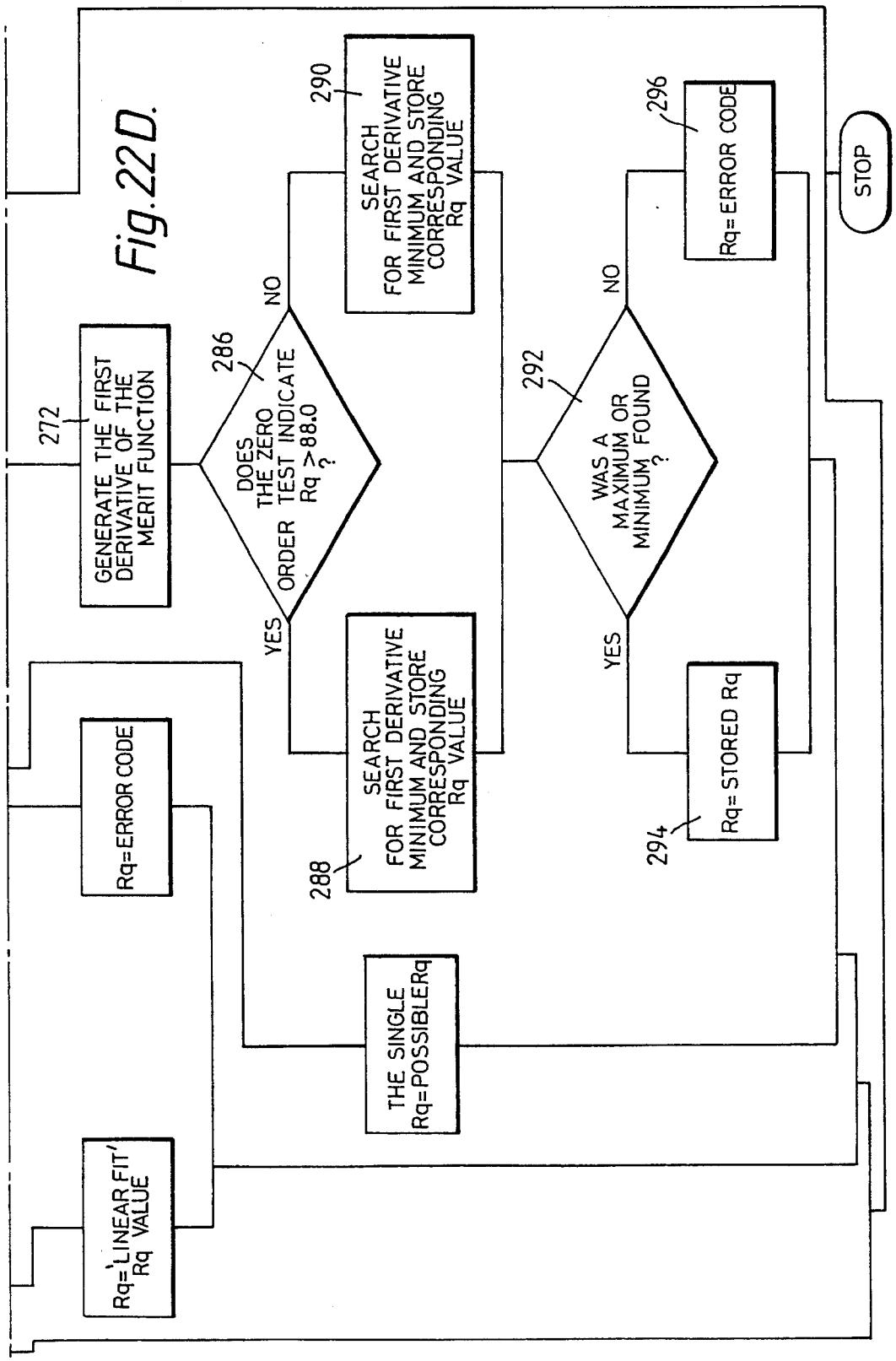
Figures 23A, 23B, 23C, 23D:
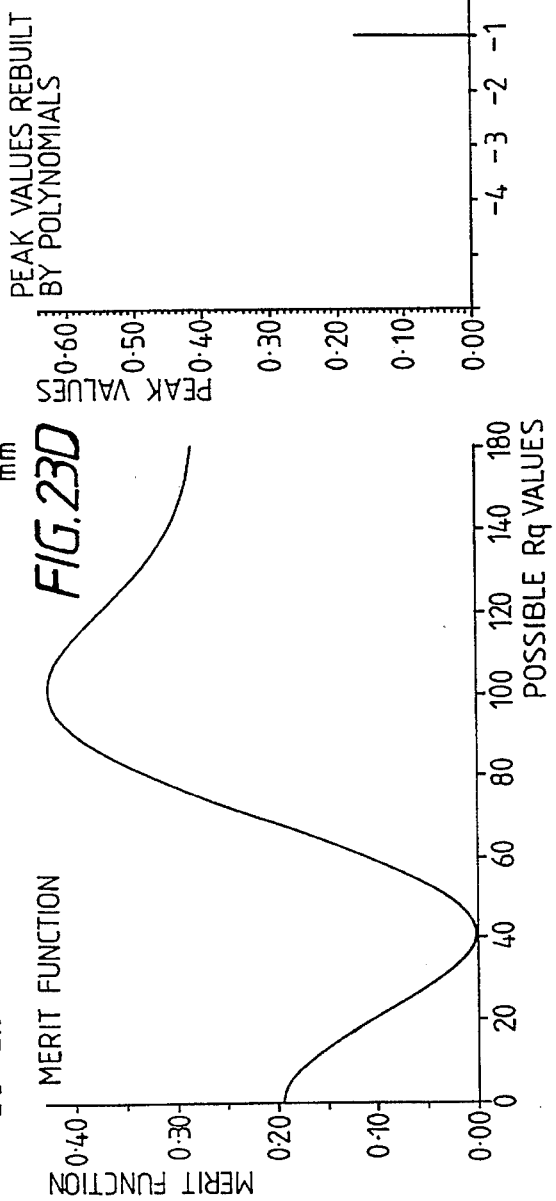
Figure 25B:
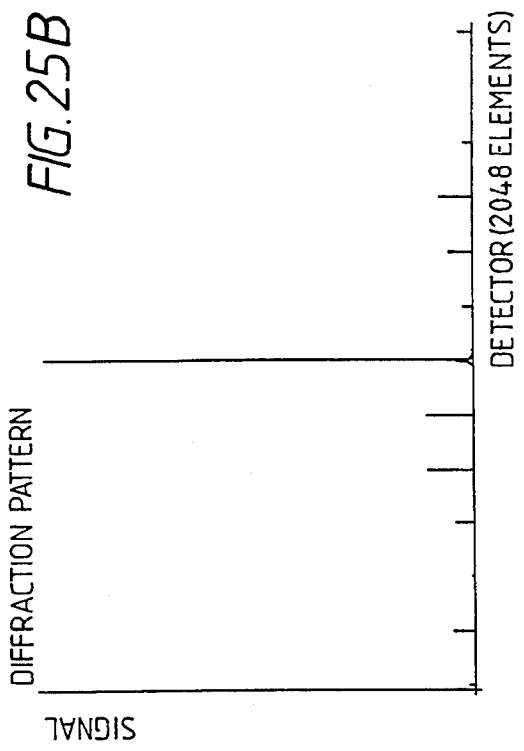
Figure 25C:
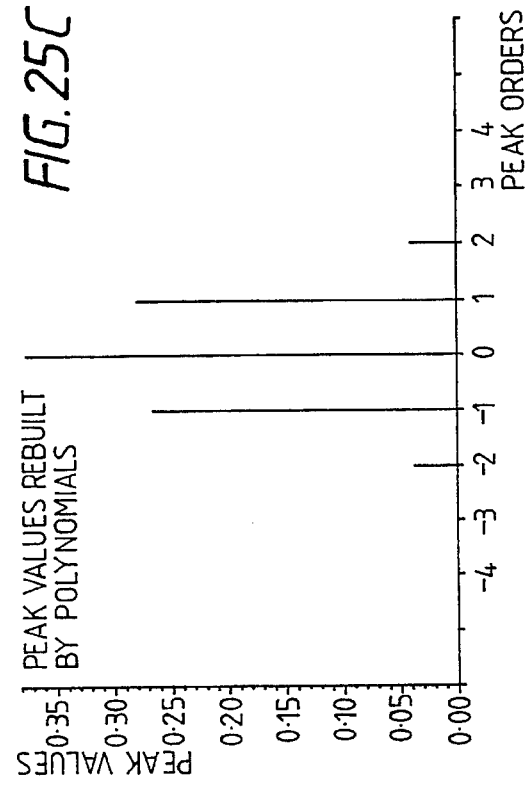
Figure 25A:
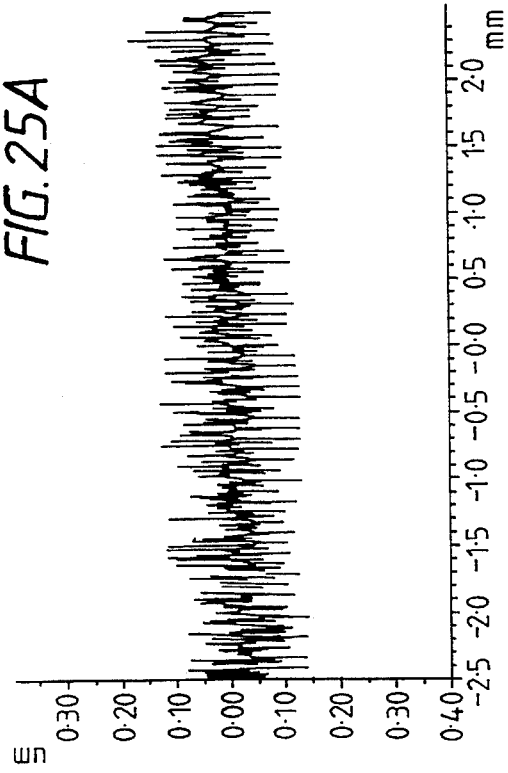
Figure 25D:
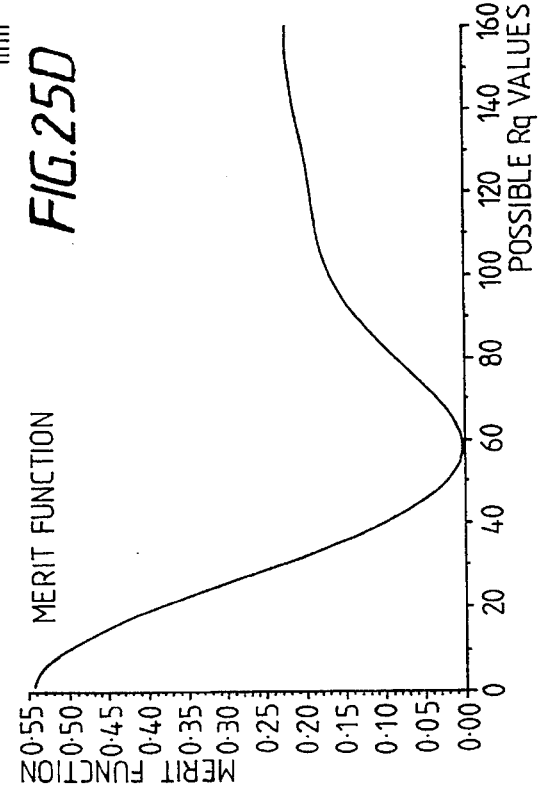
Figure 26A:
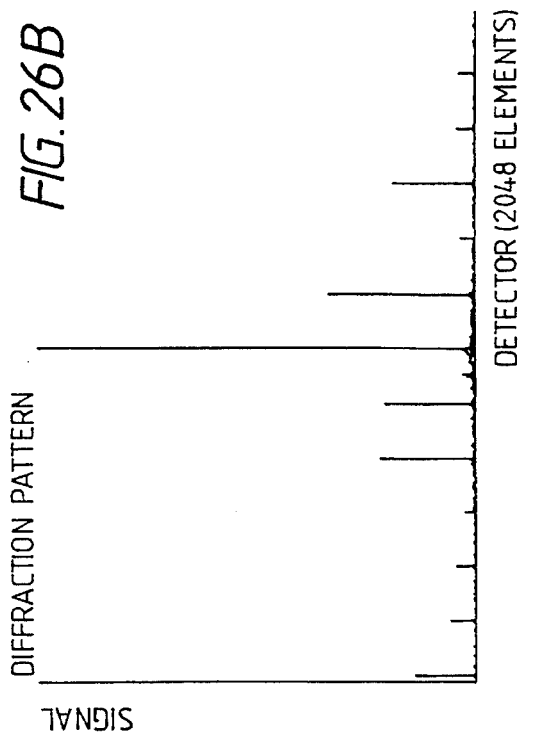
Figure 26B:
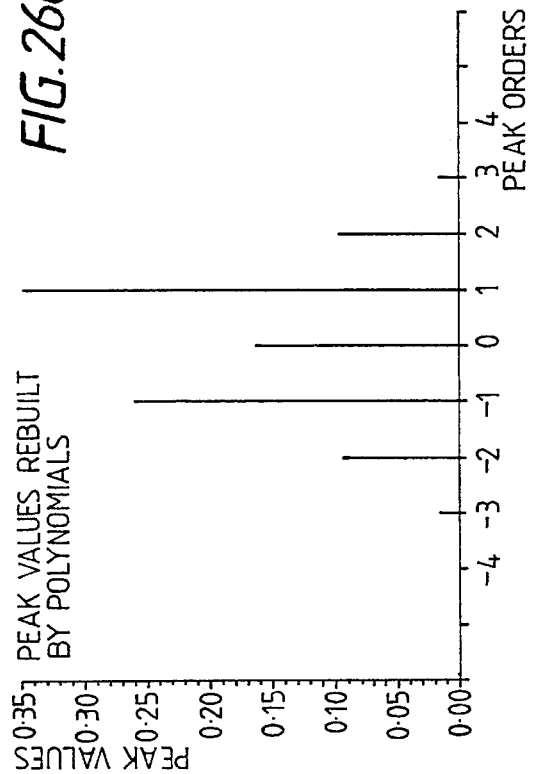
Figure 26C:
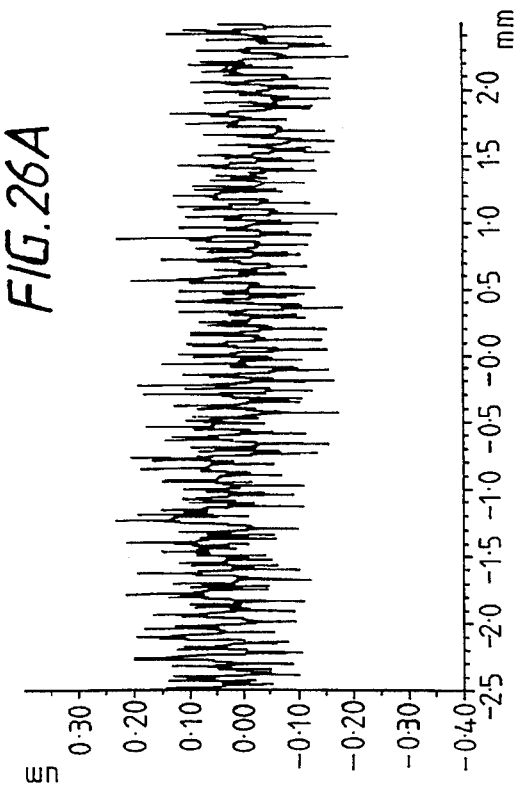
Figure 26D:
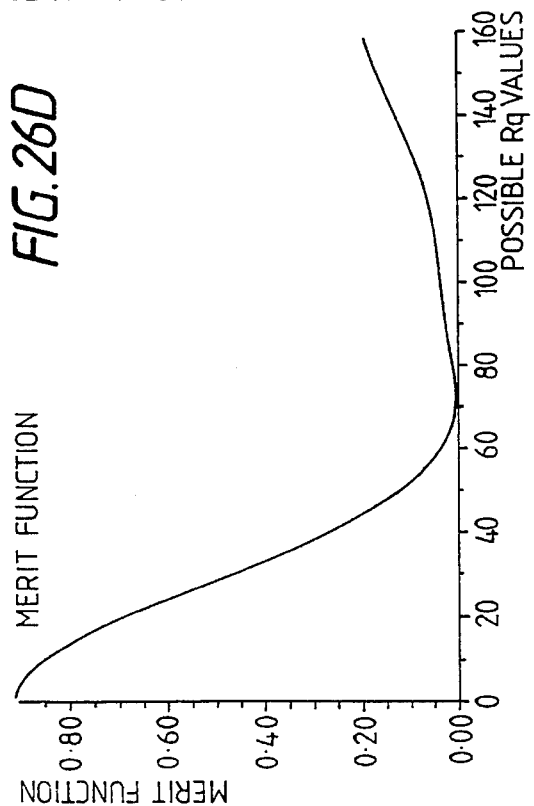
Figure 31:
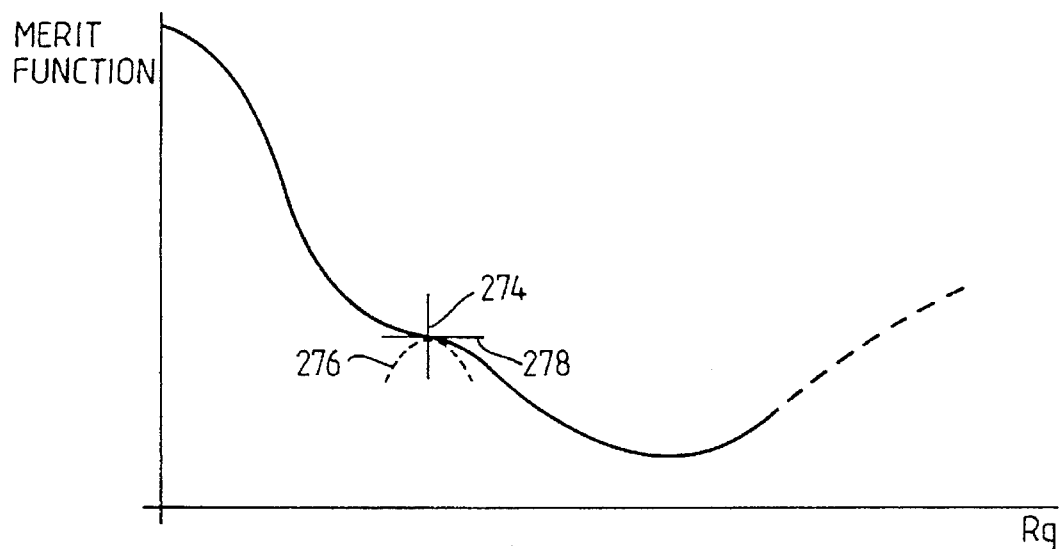
Figure 32:
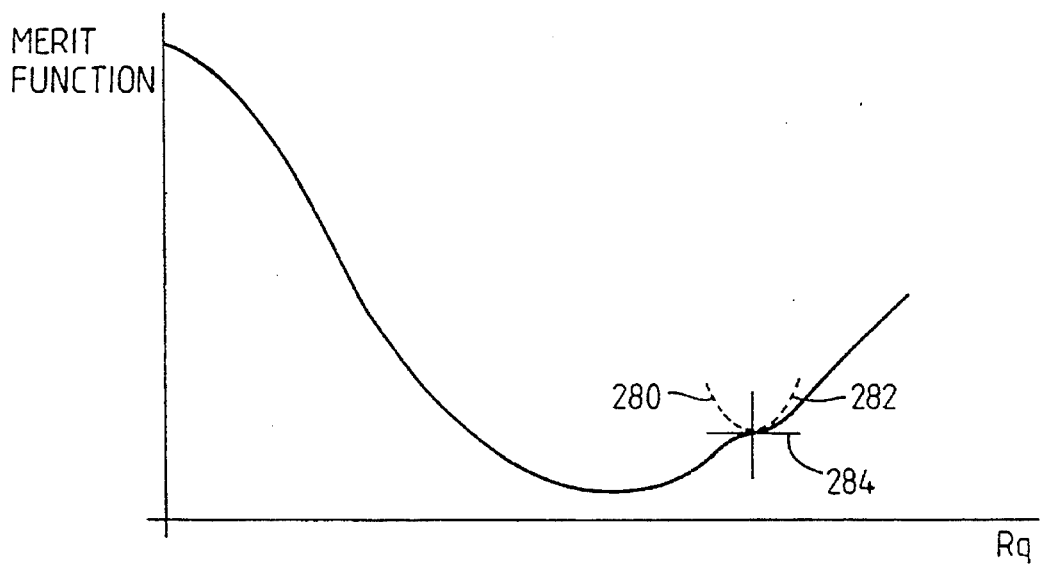
Figure 33A:
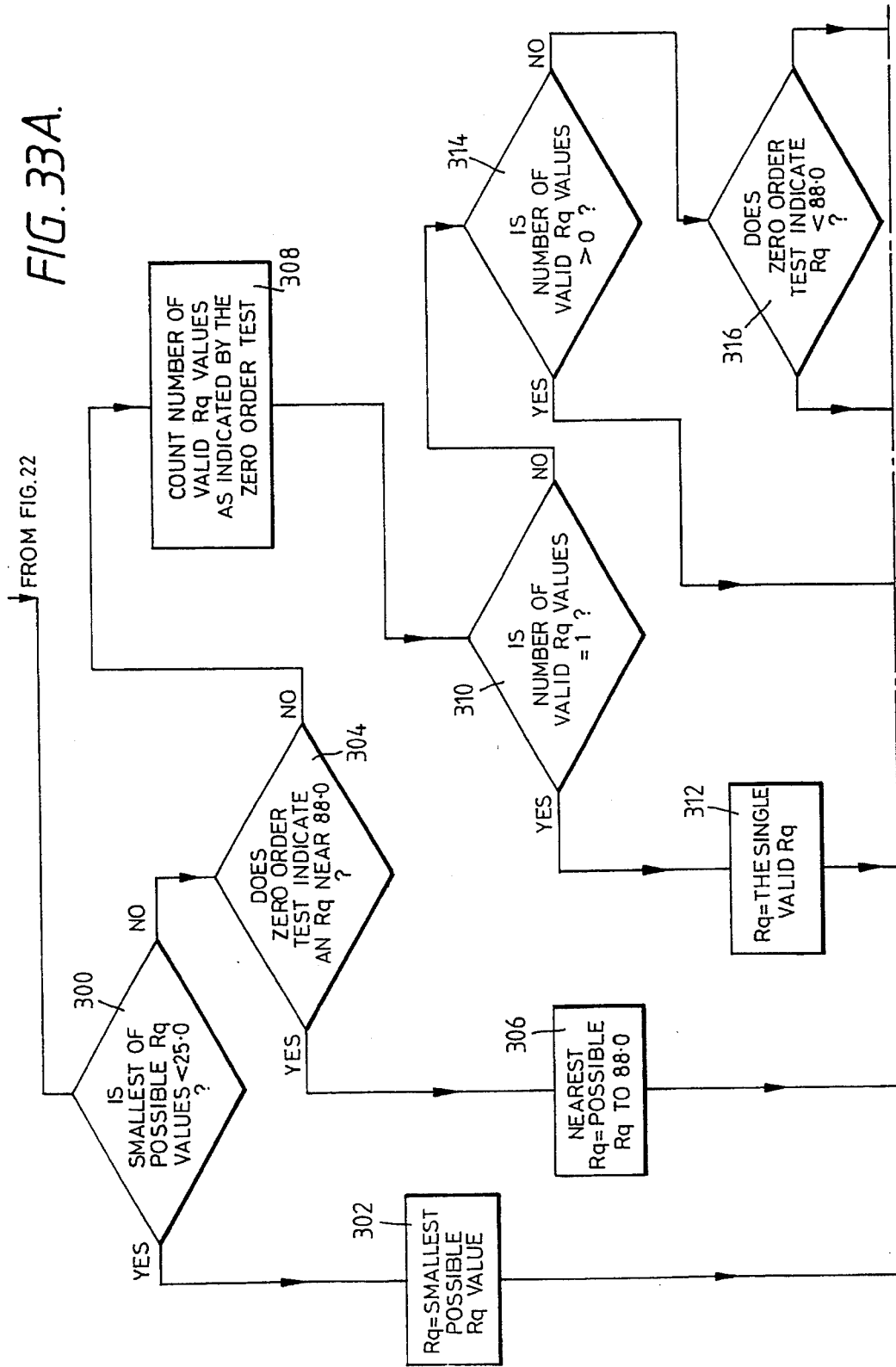
Figure 33B:
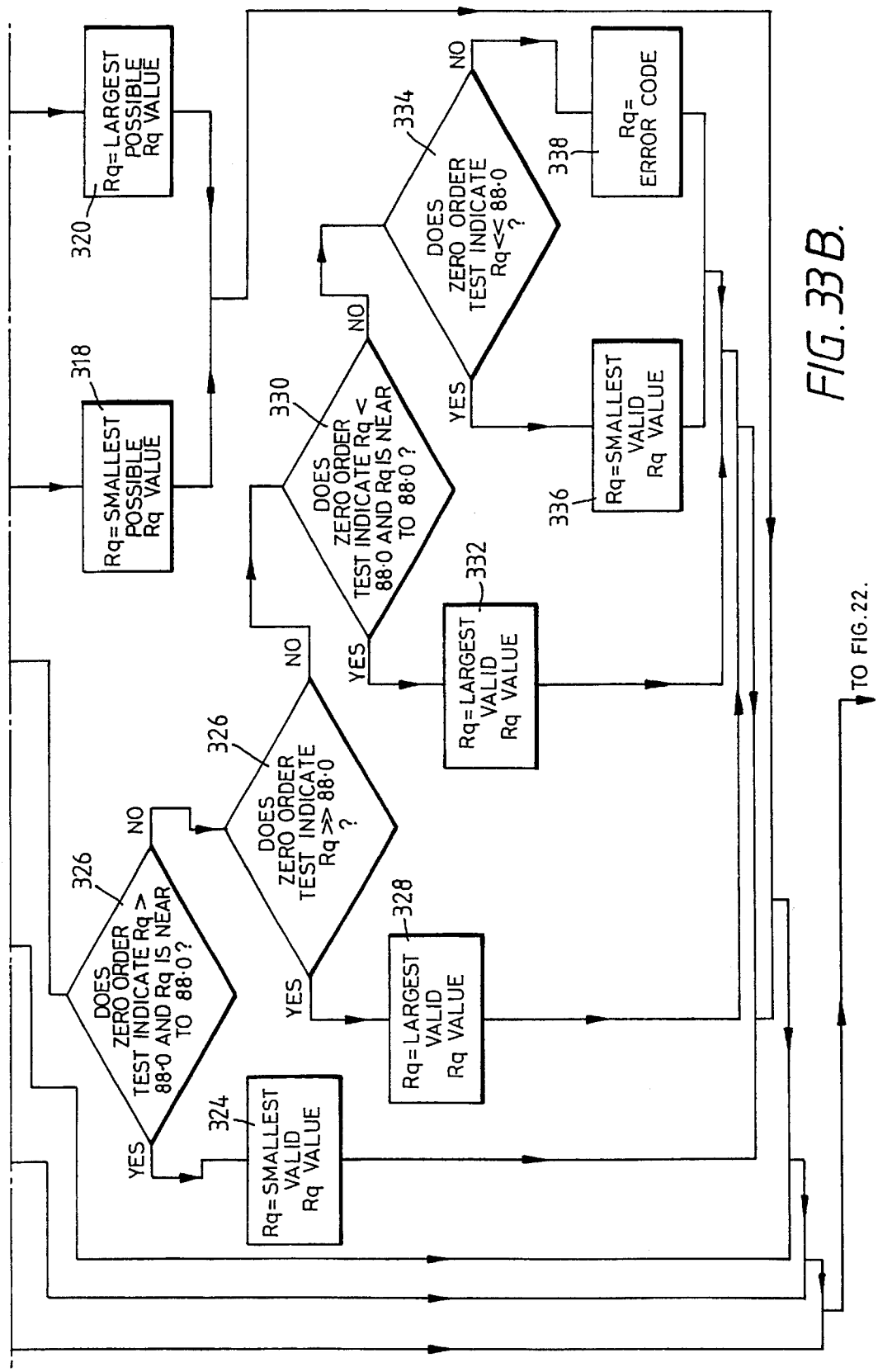
Figure 34:
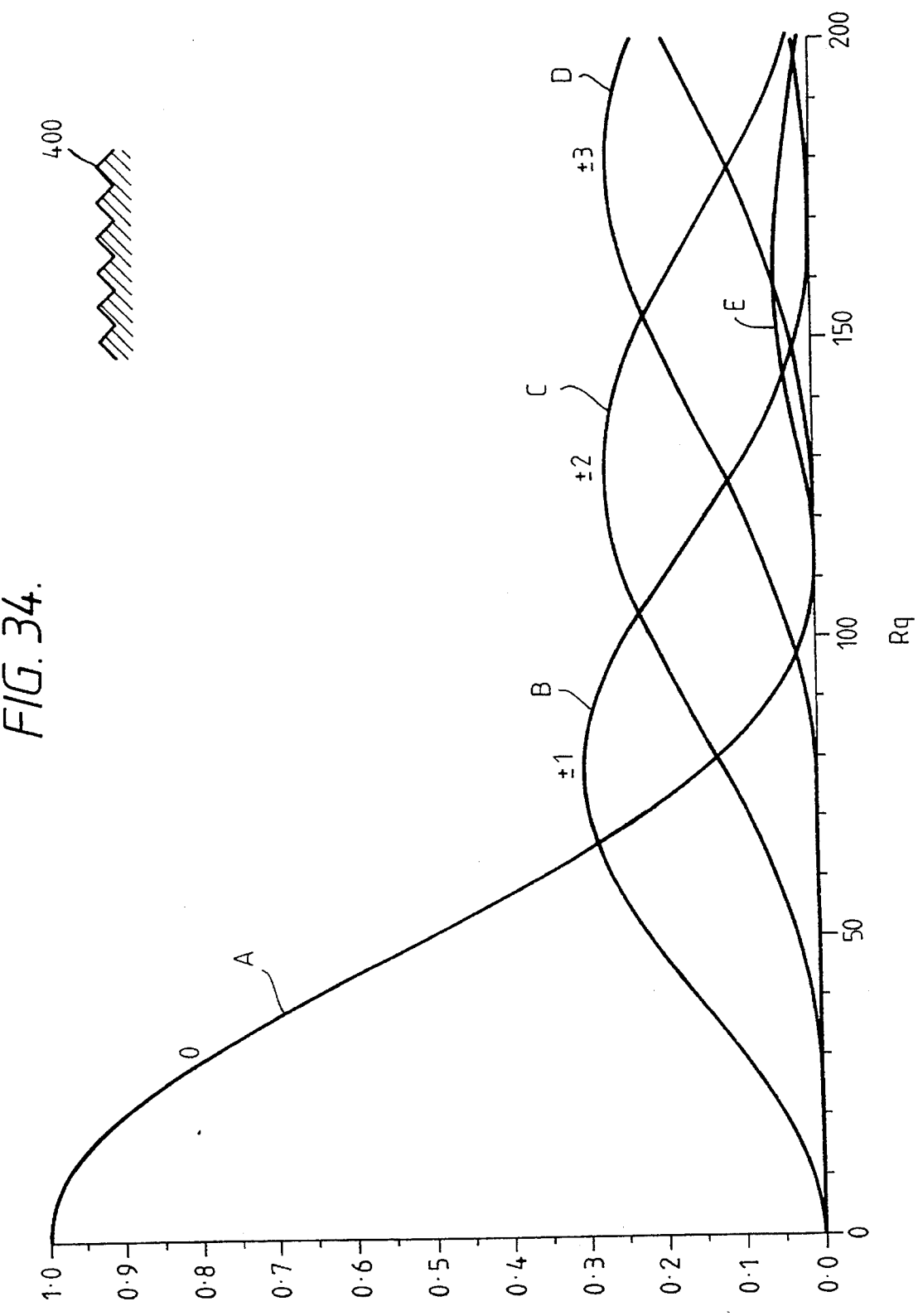
Figure 35:
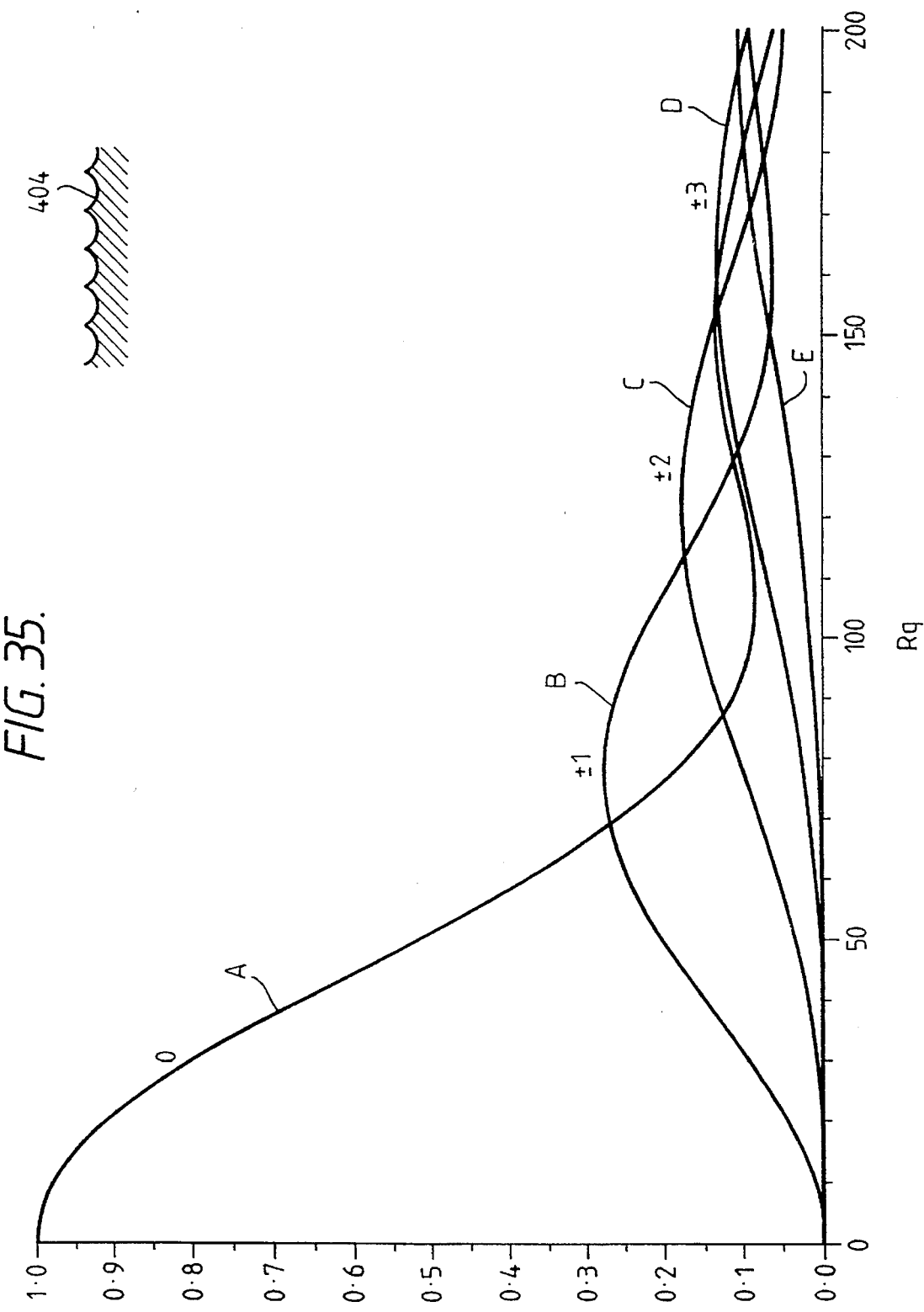

FIGS. 11a–c is a diagram for understanding one of the steps in the flow chart of FIGS. 10A and 10B;

FIG. 12 illustrates two diffraction patterns and is for understanding another of the steps in the flow chart of FIGS. 10A and 10B;

FIGS. 13 to 18 are graphical representations of the energy distribution plotted against Rq for a number of different theoretical surfaces;

FIG. 19 illustrates a reference diffraction pattern;

FIG. 20 is a set of graphs assisting in understanding the derivation of certain equations utilised in a preferred embodiment of the invention;

FIG. 21 is a graph for assisting in understanding a computation performed in one of the steps of the flow chart of FIGS. 10A and 10B;

FIGS. 22B, 22C and 22D show a flow chart showing one of the steps of FIGS. 10A and 10B in more detail; FIG. 22A is a graph for understanding a computation performed in a preferred embodiment;

FIGS. 23a–d to 29a–d, and 30 are diagrams for assisting in understanding the way in which Rq is calculated in the preferred embodiment of the invention;

FIGS. 31 and 32 are diagrammatic graphical representations for understanding how Rq is determined in the preferred embodiment of the present invention in certain circumstances;

FIG. 33A and 33B show a flow chart which continues from one of the branches of the flow chart of FIG. 22; and FIGS. 34 to 35 are graphs for illustrating alternative embodiments of the invention.

Figure 36:
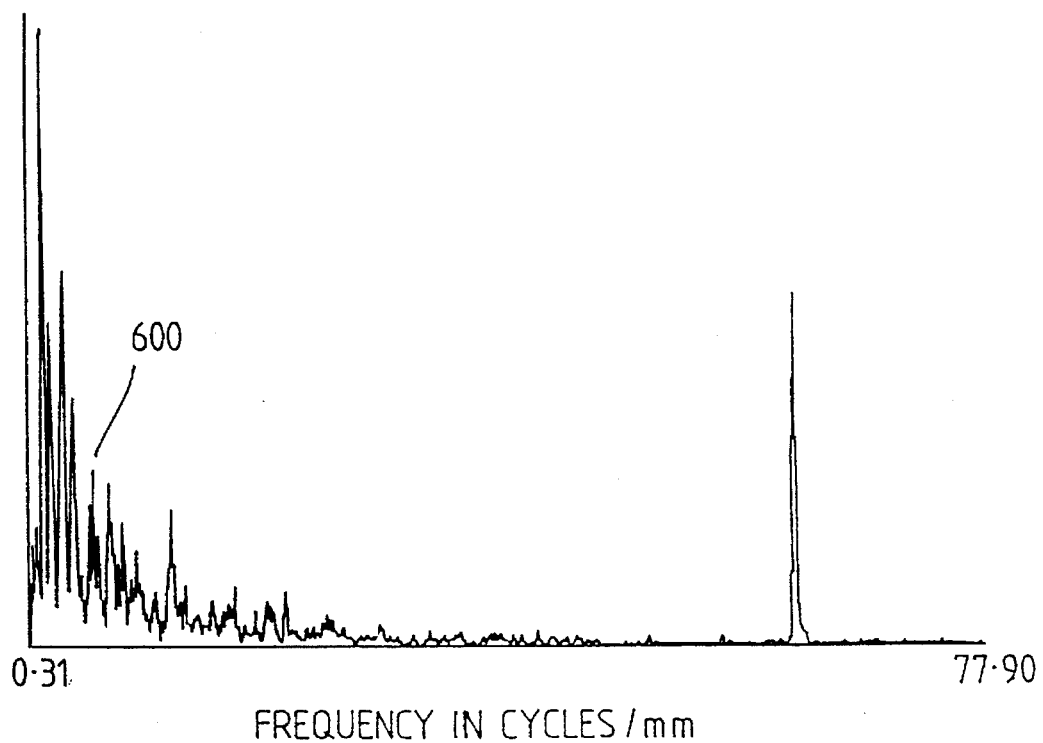
Figure 39:
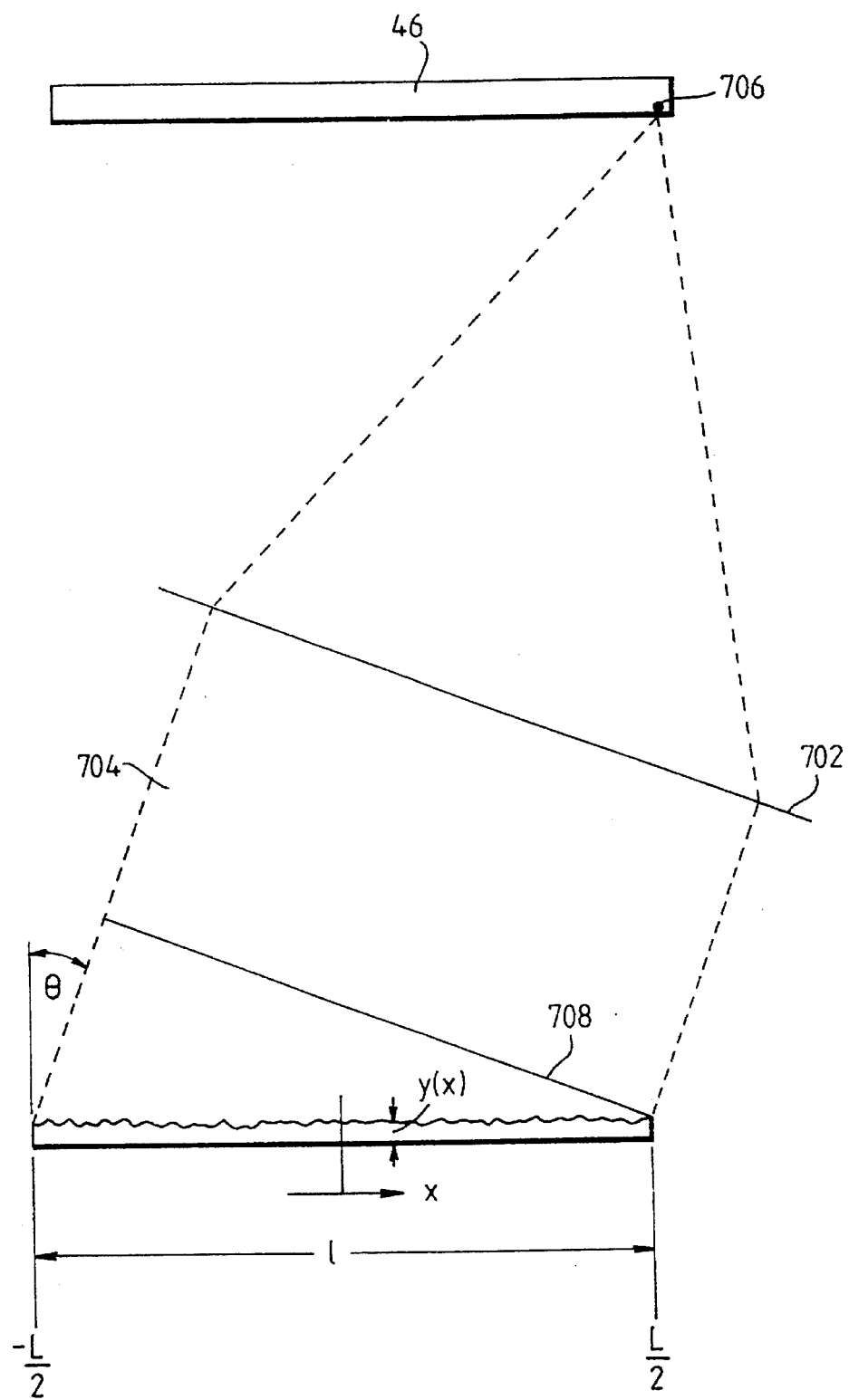
Figure 40A:
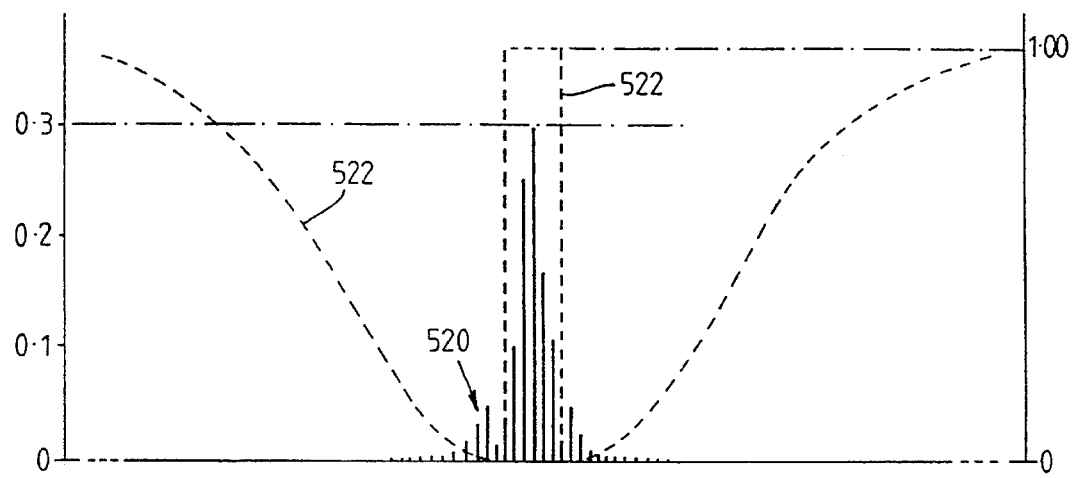

FIG. 36 illustrates a power spectrum obtained with a prototype of the preferred embodiment of the invention;

FIGS. 37a–c is a set of diagrams to assist in understanding how power spectrum is calculated in the preferred embodiment;

FIGS. 38a–d is a set of diagrams for understanding a surface simulation operation;

FIG. 39 is a diagram for understanding computation of a diffraction pattern from a simulation surface;

FIG. 40A is a diagram illustrating a filter function; and

Figure 40B:
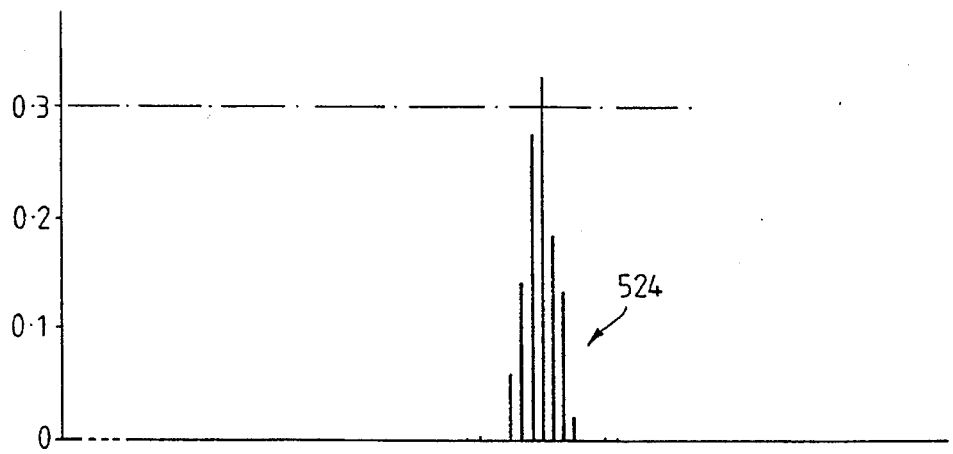

FIG. 40B is a diagram illustrating the effect of applying the function of FIG. 40A.

SYSTEM HARDWARE AND LAY-OUT

Figure 1:
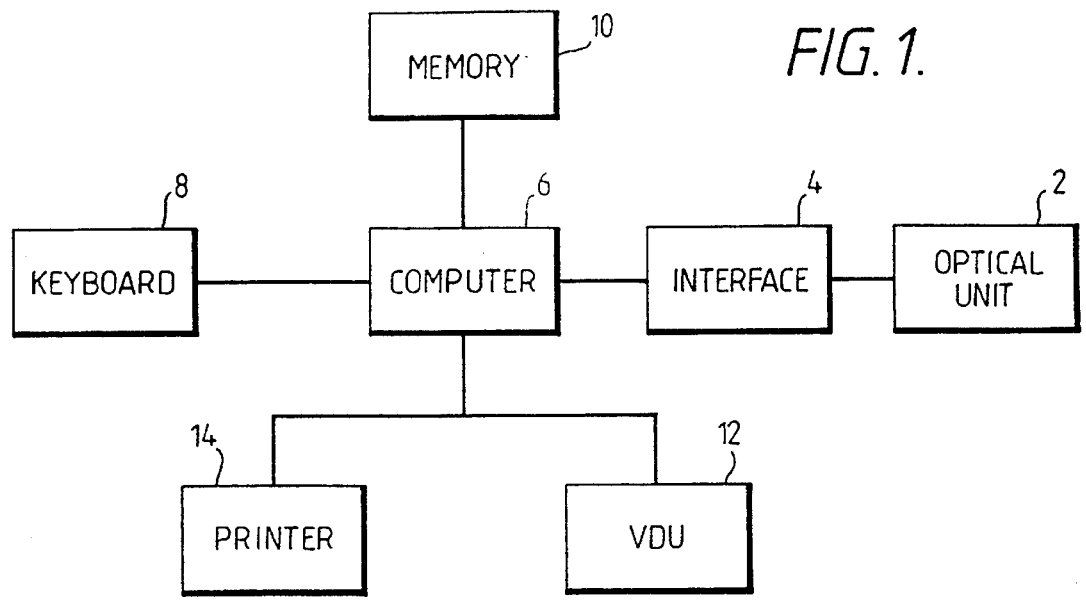
FIG. 1 is a block diagram of an apparatus for measuring surface characteristics according to a preferred embodiment of the invention.

The optical diffractometer shown in FIG. 1 comprises an optical unit (2) connected through an interface (4) to a conventional digital computer (6) having connected to it a conventional key-board (8), memory (10), VDU (12) and printer (14) for input, storing data and output.

Figure 2:
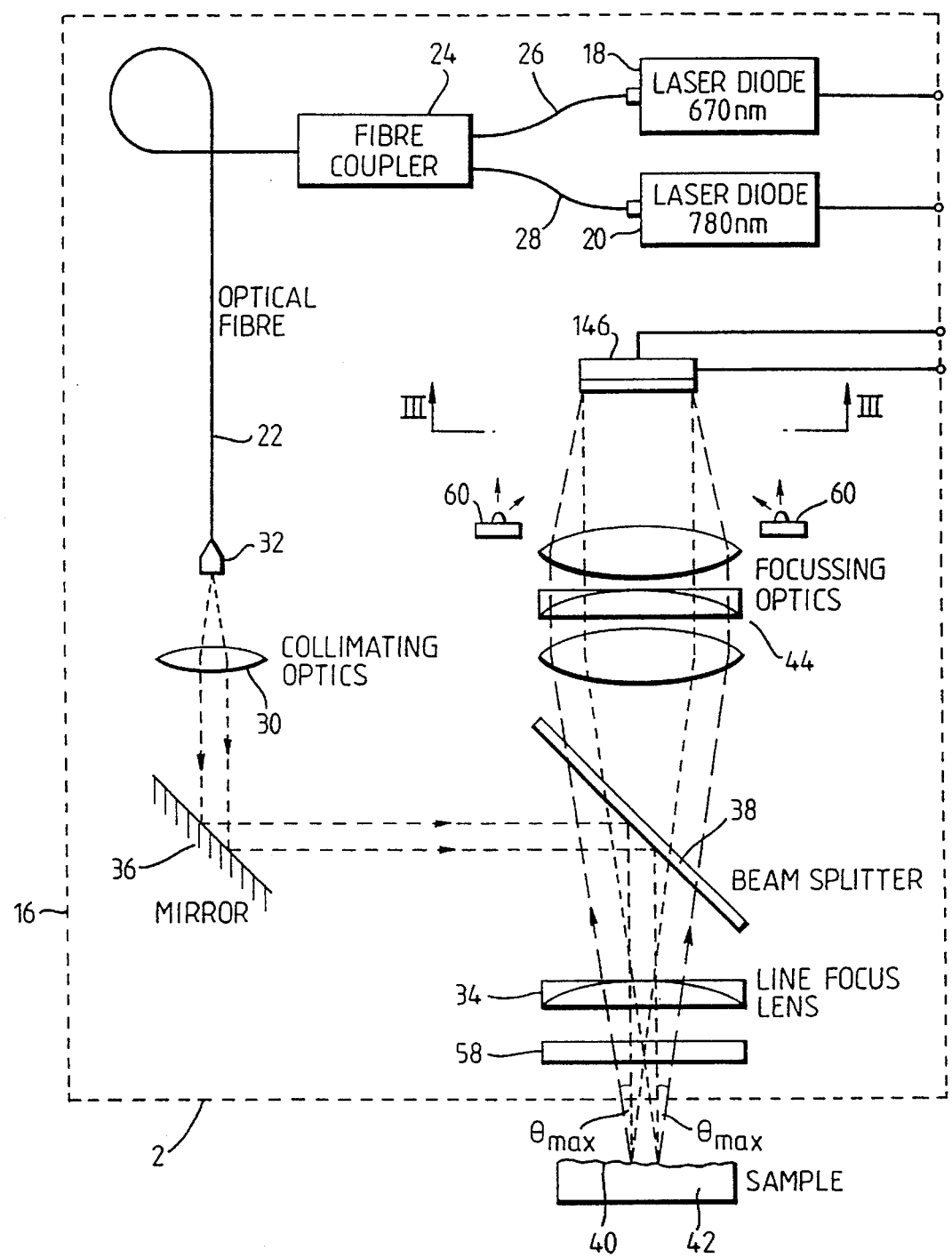
FIG. 2 is a diagram of an optical unit included in the apparatus of FIG. 1.

The optical unit (2), as shown diagrammatically in FIG. 2, comprises a housing (16) (shown in broken lines) containing two laser diodes (18, 20) which produce light at 670 nm and 780 nm respectively which will be referred to herein as red and infra-red light respectively. A single mode optical fibre (22) is arranged to receive light from each laser (18,20) when activated and, for this purpose, is coupled to the lasers (18,20) via an optical fibre coupler (24) and further respective single mode optical fibres (26,28). A collimating lens (30) receives light from the output end (32) of fibre (22) and directs this light to a cylindrical lens (34) via a mirror (36) and beam splitter (38). In use of the apparatus, the cylindrical lens (34) focuses the light into a thin line for example 5 mm in length on the surface (40) of a sample (42) whose RMS surface roughness Rq is to be measured. The preferred embodiment is particularly useful with surfaces which are nominally planar or cylindrical and in the latter case the axis of the cylindrical surface would be arranged parallel to the thin line of light focused thereon.

Figure 3:
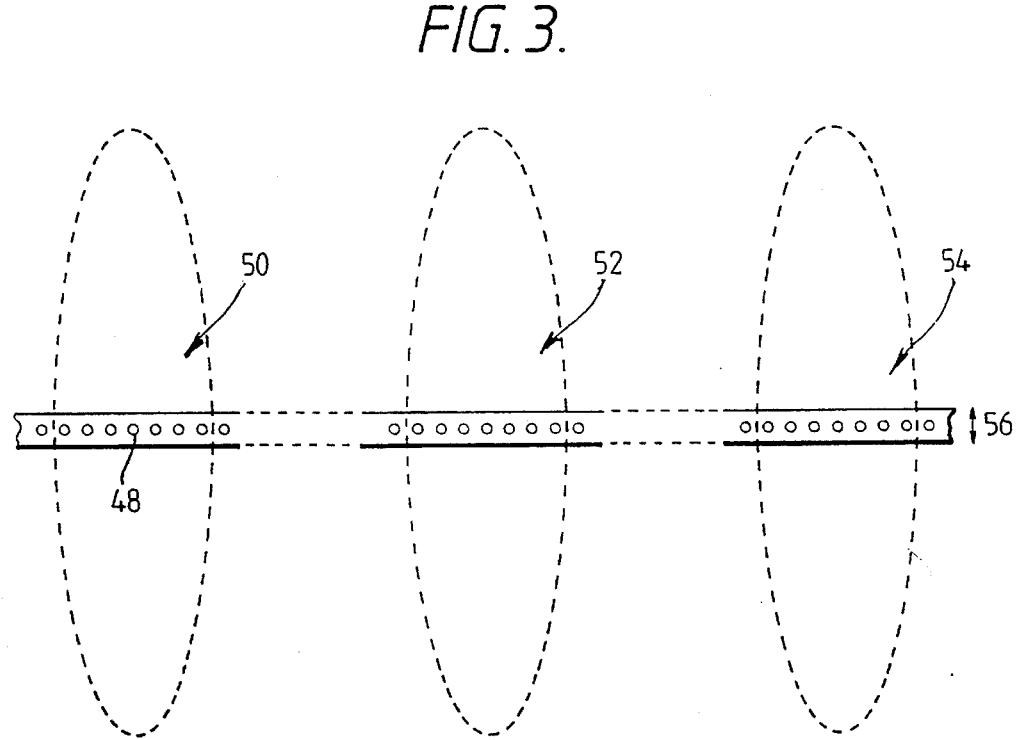
FIG. 3 is a diagrammatic view on the line III—III in FIG. 2 and shows part of the unit of FIG. 2 in more detail.

Light diffracted from the surface (40) is collected by the lens (34) and transmitted through the beam splitter (38) and an optical system (44) to a CCD array (46). The optical system (44) focuses the resulting diffraction pattern onto the CCD array 46. The CCD array 46 and the optical elements shown in FIG. 2 are arranged so that light diffracted from the sample in directions up to a maximum of 3.5° to the optical axis at the CCD array 46. This is illustrated in FIG. 2 in which θmax designates this angle. As can be seen rays at an angle θmax (in this example 3.5°) to the optical axis arrive at the extreme ends of the CCD array. Rays leaving the surface 40 at angles greater than this would miss the array. As shown diagrammatically in FIG. 3, the CCD array 46 comprises a single row (linear array) of photosensitive elements (48) and the array is arranged so that different intensity peaks in the diffraction pattern (i.e. different orders) are distributed along the row of elements (48), the location of three such peaks being indicated in broken lines in FIG. 3 at 50,52 and 54. The optical system is designed so that each order is spread over a number of the elements (48) in the array (46). This ensures that in detecting the order, the effects of any local variation in the response characteristics of the detector elements may be minimised. In the preferred embodiment the arrangement is such that each order is treated as extending over seven elements (48). The optical system (44) has a degree of astigmatism to spread the light in the diffraction pattern laterally of the row (48), i.e. in the direction of arrow 56 in FIG. 3, to ensure that any slight misalignment between the diffraction pattern and the row (48) will not result in some of the orders falling to one side or the other of the row (48) and therefore failing to be detected.

An optical filter (58) is mounted in the housing (16) to inhibit entry thereinto of unwanted light whilst permitting passage of the wavelengths produced by the lasers (18 and 20). Light emitting diodes (60) are mounted in the housing (16) to provide low intensity uniform illumination of the CCD array (46) to ensure that the sensors (48) operate within their linear range of operation in detecting the diffraction pattern.

Figure 4:
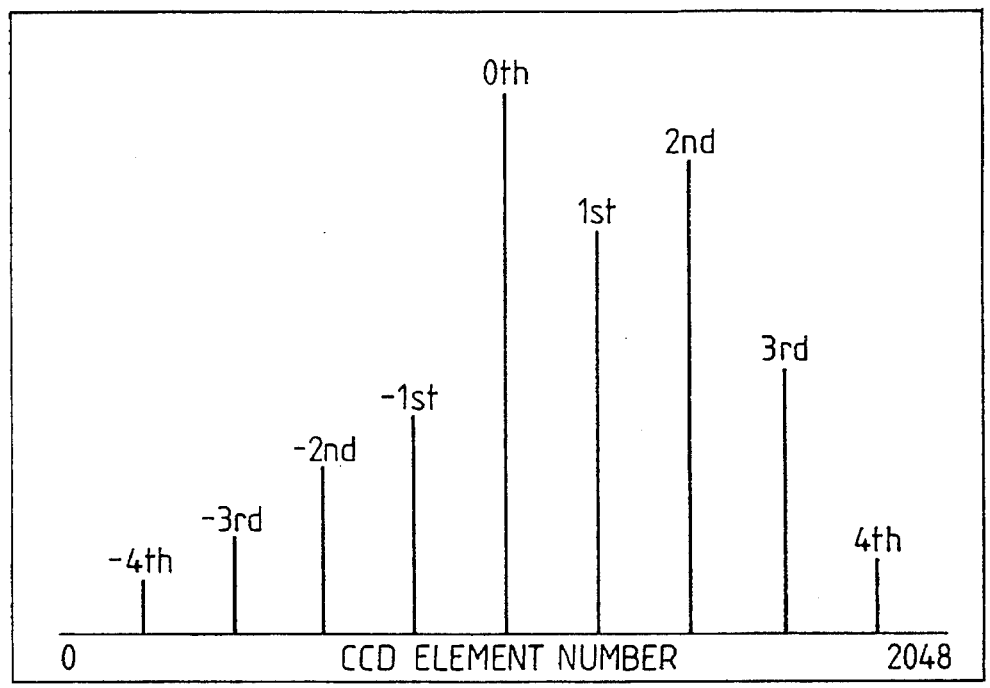
FIG. 4 illustrates one form of diffraction pattern which may be produced in the apparatus of FIGS. 1 to 3.
Figure 5:
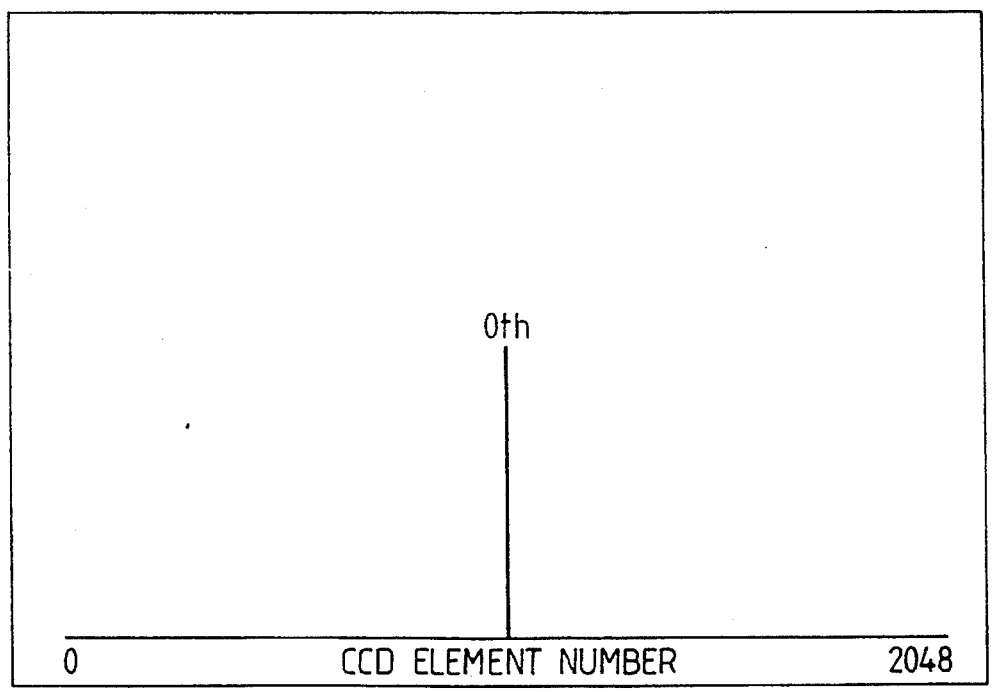
FIG. 5 illustrates another form of diffraction pattern which may be produced in the apparatus of FIGS. 1 to 3.

The structure of the diffraction pattern produced, i.e. the distribution of the light energy amongst the various orders, is dependent upon Rq. The overall function of the preferred embodiment, therefore, is to detect the diffraction pattern utilising the CCD array (46) and, after digitisation thereof, to perform manipulations and calculations on the digitised array to provide a value for Rq. Examples of diffraction patterns produced by two different surfaces are shown in FIGS. 4 and 5 which are plots of the light intensity at the different elements in the CCD array. In FIG. 4, the pattern comprises a zero order and positive and negative first, second, third and fourth orders with considerable asymmetry between the positive and negative orders.

In FIG. 5 only the zero order is visible, the diffracted energy other than the zero order being too low to be visible. As will be discussed below, derivation of Rq from a diffraction pattern such as shown in FIG. 5 requires the use of different algorithms from those used with a diffraction pattern as shown in FIG. 4.

SYSTEM OPERATION

Figure 6A:
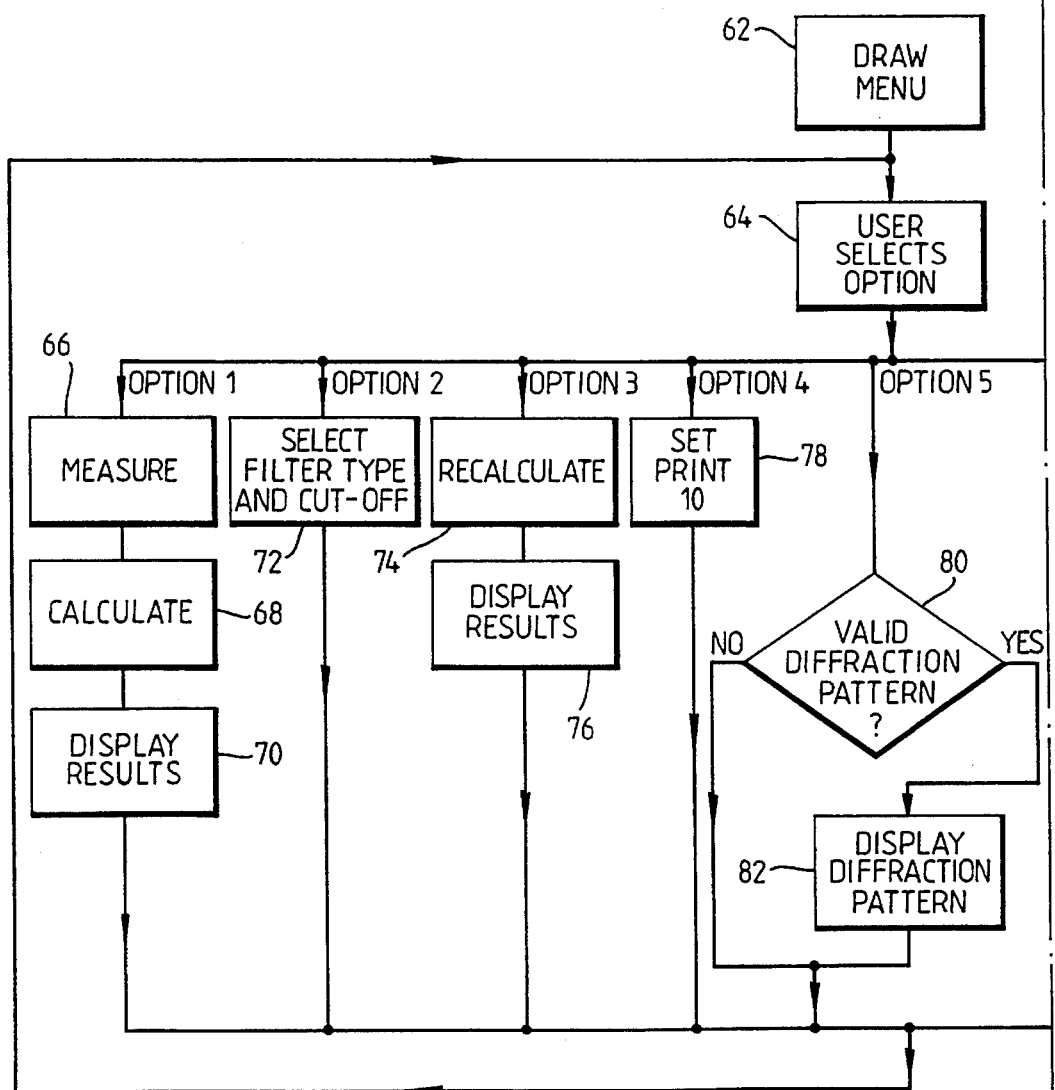
FIG. 6A and 6B show a flow chart illustrating the overall operation of the apparatus of FIGS. 1 to 3.
Figure 6B:
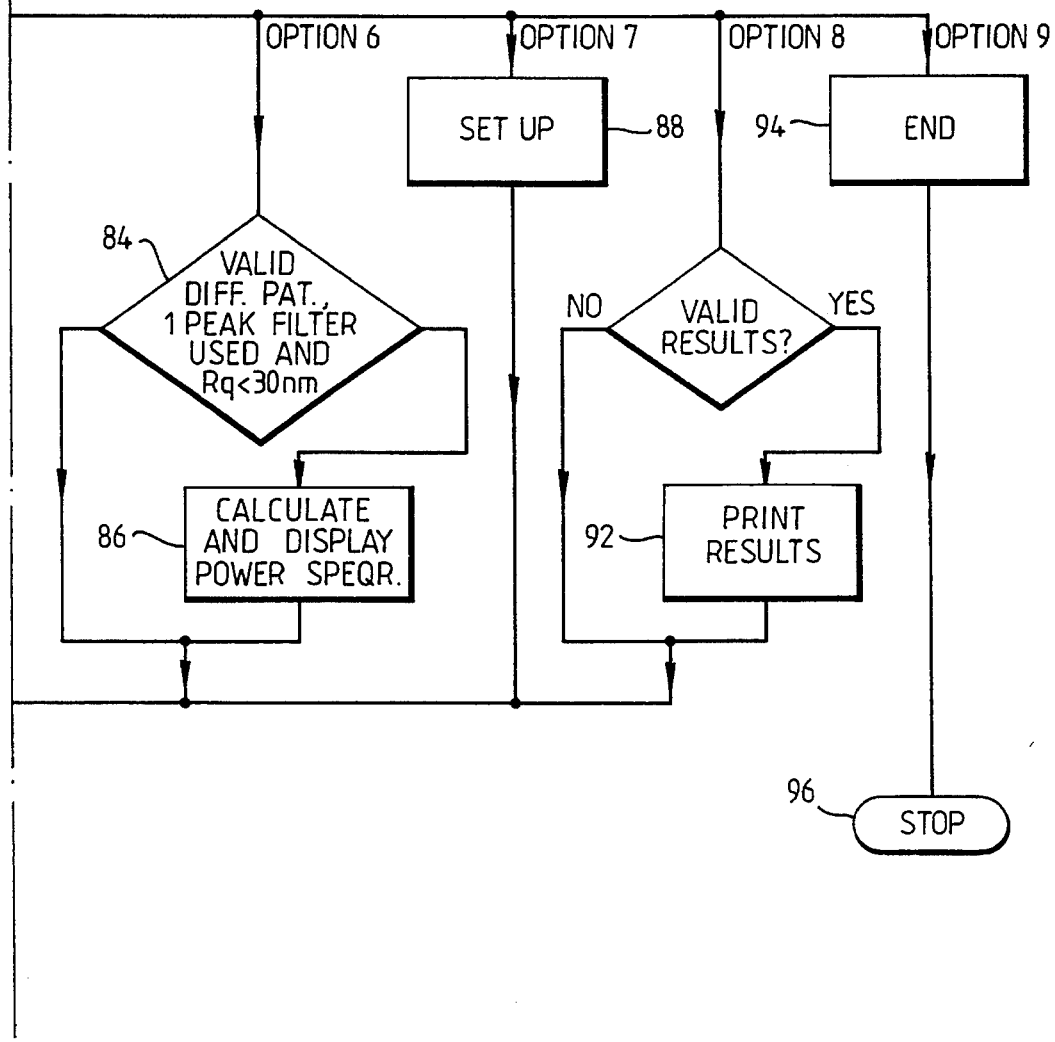

The overall system operation is illustrated in flow chart form in FIGS. 6A and 6B, collectively FIG. 6. Following various conventional initialising procedures, the main system menu is displayed at step 62 in FIG. 6. This menu is drawn on VDU (12) and lists the following options for the user:

1. Measure
2. Select filter type/cut-off
3. Calculate
4. Set print identity
5. View diffraction pattern
6. Calculate and view power spectrum
7. Set up sample 8. Print results
9. End After the user selects an option from the menu, as indicated by step 64 in FIG. 6, the program enters the appropriate one of the branches shown therein. If option 1 is selected, the diffraction pattern focused on CCD array (46) is measured in step (66), digitised and stored in memory (10). In step 68, calculations are performed utilising the stored diffraction pattern in order to obtain Rq and, in certain cases, the pitch wavelength (lamdba s), the RMS surface wavelength (lambda q) and the RMS slope (del q). In step 70 the results are displayed on VDU (12).

Utilising option 2 from the main menu, the user is presented with a subsidiary menu for the selection of a software filter which will operate on the stored diffraction pattern or the calculated Rq depending (as will be shown) upon which algorithm is used. The selected filter acts to attenuate the effects of surface wavelengths larger than the predetermined cut-off values. These are preferably at the international standards of 0.08 mm, 0.25 mm, 0.8 mm and 2.5 mm respectively. Further, two types of software filtering are available, namely a Gaussian filter and a phase-corrected 2RC filter. Thus, at Step 72, the operator choses which filter type and which cut-off wavelength he wishes to utilise.

Option 3 is used to cause the apparatus to recalculate the results using a previously stored diffraction pattern obtained utilising option 1. Thus, in option 3, recalculation takes place at Step 74 and display of the results at Step 76.

In option 4, the user is given the opportunity to name a print of results to be made, i.e. to set an identity for the print. Thus, this option comprises the single step 78.

In option 5, the user is given the facility of displaying a diffraction pattern, that has previously been acquired. Thus, when this option is selected, the software decides at Step 80 whether there is a valid diffraction pattern and, if so, this is displayed on VDU (12) at Step 82. Thus, using this option, diffraction patterns such as those illustrated in FIGS. 4 and 5 might be displayed on VDU (12).

Option 6 is provided to enable the power spectrum of the surface under examination to be calculated and displayed. This can only be achieved if the diffraction pattern has a single peak, i.e. orders other than zero are very small, a cut-off filter has been applied and if Rq has a low value less than say 30 nm or 40 nm. Thus, when this option is selected, a decision is taken at Step 84 as to whether there is a diffraction pattern present having a single peak and Rq is calculated and the decision taken as to whether this is less than 30 nm or 40 nm. If so, the program proceeds to Step 86 in which the power spectrum is calculated and displayed.

Option 7 is provided for assisting the operator in correctly positioning the sample. In this option, the user is presented with a subsidiary menu enabling him to select between continuous energisation of the red laser (18) providing illumination at 670 nm, ie. in the visible spectrum and the second causes the other laser to be energised and a graphical representation of the resulting diffraction pattern displayed on the VDU in real time. Utilising the first of these choices, the operator is able to see which line on the surface of the workpiece will be illuminated by the laser light since visible laser light is produced. Utilising the second of these choices, the operator may finally position the workpiece to produce the best diffraction pattern. These operations are diagrammatically represented in FIG. 6 by Step 88.

Option 8 is for obtaining a print of the results of the measurement. When this option is selected, the software checks at Step 90 whether there are any valid results to be printed and, if so, they are printed at Step 92 utilising printer (14).

When option 9 is selected, operation of the system is terminated, the software being caused to perform conventional routines to close down the system as represented by Steps 94 and 96 in FIG. 6.

Thus, in normal operation of the apparatus, the sample will be correctly positioned and aligned relative to the optical unit (2) utilising option (7) from the main menu, option 2 will be utilised to select the required cut-off filter and measurement will proceed utilising option 1.

DATA ACQUISITION

Figure 7:
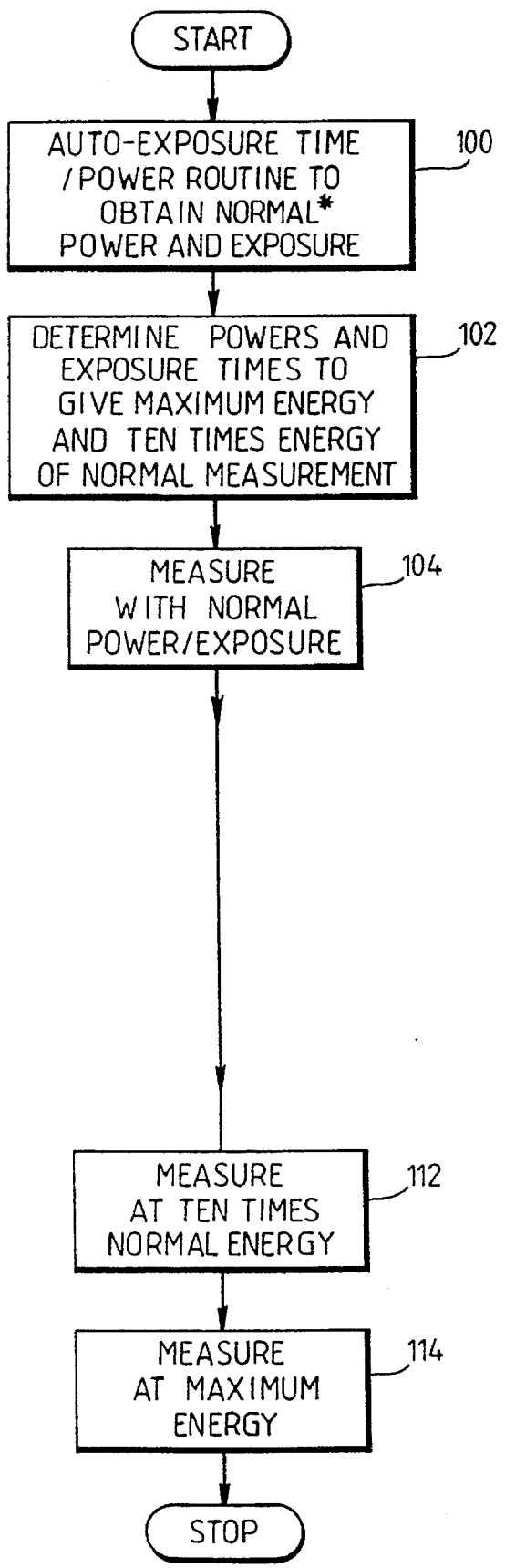

The measuring or data acquisition step 66 of option 1 shown in FIG. 6 is illustrated in more detail in FIG. 7. Firstly, at Step 100, a routine is followed (which will be more fully described below with reference to FIG. 8) to determine automatically the optimum power and exposure settings for the illumination supplied to the sample from the lasers (18 and 20). The exposure is the time for which the laser is energised. The CCD array (46) is an integrating device and set to integrate for a fixed period at least as long as the longest exposure time. The procedure in Step 108 is to ensure that power and exposure levels are chosen which provide sufficient energy in the diffraction pattern to obtain a linear response without saturating the elements of the CCD array.

After determining the optimum power and exposure settings in Step 100, the software calculates, for reasons to be explained more fully later, the power and exposure times necessary for providing ten times more energy than that given by the power and exposure settings determined in Step 100. Step 102 is performed only in relation to the diffraction pattern from the infra-red (780 nm) laser (20).

In Step 104 a diffraction pattern is produced utilising the power and exposure settings determined in Step 100, and measured in a manner which will be more fully described later with reference to FIG. 9. Step 104 is performed separately for both the red and infra-red lasers.

In Step 112, a measurement of the diffraction pattern produced at ten times the energy utilised in Step 104 is performed with the assistance of the results of the calculation carried out at Step 102 and in Step 114 a diffraction pattern produced at maximum power and exposure setting is carried out. The reasons for Steps 112 and 114 will be explained later.

Power and Exposure Determination

The apparatus is arranged so that the power output by each laser can be varied in 16 steps from zero to full power, i.e., there are 15 discrete power levels apart from zero. The apparatus is also arranged to provide four discrete exposure times, these preferably being 16 microseconds, 32 microseconds, 48 microseconds and 176 microseconds. As already mentioned, the manner in which the optimum combination of power level and exposure time is automatically selected is illustrated in the flow chart in FIG. 8.

In Step 116 the minimum exposure time and maximum power level settings are selected and in Step 118 the infra-red laser (20) is energised utilising these settings to illuminate the sample and produce a diffraction pattern on the CCD array (46). The resulting signals produced in the CCD array are read out therefrom, digitised in the interface circuitry (4) and then stored in memory (10). In Step 120, the computer determines from the stored pattern, which element in the CCD array produced the largest signal. In Step 122, determination is made as to whether the magnitude of this signal is greater than the maximum which it is desired to produce having regard to the characteristics of the CCD elements. More particularly, the desired maximum is set at a level somewhat below that at which the CCD element is saturated. If decision 112 discloses that the largest signal from any of the CCD elements is greater than the desired maximum and that the power level is greater than the minimum, the program loops to Step 124 at which the power level is decreased by one step. Steps 118, 120 and 122 are then repeated.

Whenever decision 122 results in a NO the program loops to decision 126. If this discloses that the power level is still at a maximum and the largest signal from any of the CCD elements is less than the desired maximum, the program loops to Step 128 at which the next largest exposure setting is selected, the power level being maintained at maximum. Steps 118, 120, 122 and 126 are then repeated.

Whenever decision 126 results in a NO, the program branches to Step 128 in which the current power and exposure settings are stored. Since this arises only when both of Steps 122 and 126 have resulted in a NO, meaning that the largest signal from any of the CCD elements has a magnitude close to but less than that indicating saturation, the power and exposure settings producing this are optimum.

Figure 8:
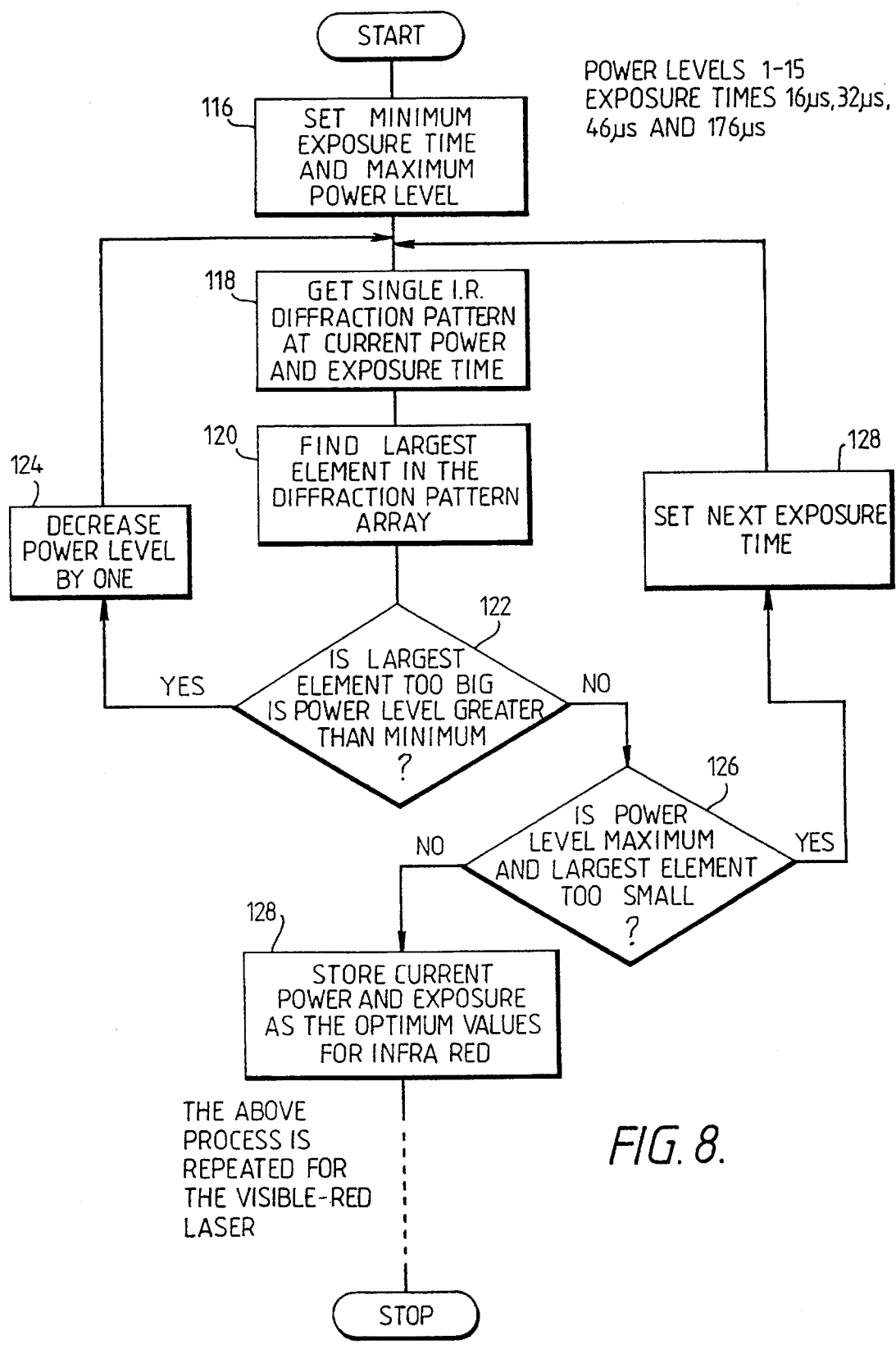

The steps shown in the flow chart of FIG. 8 are then repeated for the red laser (18).

For the infra red laser to give approximately ten times the energy in the diffraction pattern which is given at the normal settings, it has been found that the maximum exposure setting of 176 microseconds can in practice always be used. Also, it has been found that it is unnecessary to know the actual value of the energy output by the laser, as the product of power level (applied to the laser) and exposure time is linearly related to the laser output energy. The laser power setting for giving approximately ten times the energy given by the optimum settings calculated at Step 100 can therefore be obtained as if $P_n$ and $E_n$ are respectively the power and exposure settings determined in Step 100, then $$\text{Energy at optimum settings} = P_n E_n$$

If $P_{10}$ is the required power setting to give ten times the energy at the optimum settings, and assuming an exposure of 176 microseconds is to be used as explained above:

$$176 \, P_{10} = 10 \, P_n E_n$$

and $$P_{10} = \frac{10 \, P_n E_n}{176}$$

Thus, computer 6 performs this calculation at Step 102.

Exposure and Pattern Storage

The software is arranged so that there are a number of specific sets of memory locations designated in memory (10) for storing the diffraction patterns in digitised form. Each cell in the array (46) accordingly has a corresponding memory location in each of these sets. Each location in each set has the capacity to store a multi-bit number representing the energy received by the corresponding cell (48) in the array (46).

Step 104 of FIG. 7 is more fully illustrated in the flow chart of FIG. 9. In Step 130, the locations of memory (10) in which the infra-red diffraction pattern is to be stored are set to zero and in Step 132 the infra-red laser (20) is energised utilising the previously determined optimum power and exposure setting so as to reflect light from the sample and produce a diffraction pattern on the CCD array.

The resulting signals from the CCD array, whose magnitudes depend upon the sum of the background illumination from LEDs 60 which are continuously energised and the energy diffracted from the sample, are read out, digitised and temporarily stored in a buffer zone in memory (10). In Step 134, signals representing the background illumination of the CCD array are derived. This is achieved by permitting the CCD array to integrate for the above mentioned fixed period with both lasers switched off and the LEDs 60 on. The resulting signals, which are referred to herein as the "dark array" are then subtracted element by element (memory location by memory location) from the previously stored signals in the buffer zone representing the diffraction pattern. The results of these subtractions represent the diffraction pattern without the background illumination. Following the subtractions, the multi-bit numbers are converted to floating point format and are added in Step 138 to the contents (initially zero) of the respective memory locations in which the infra-red pattern is to be stored. With the assistance of decision 140, Steps 132 to 138 are repeated until a total of six exposures have been performed. Thereafter, the program loops to Step 142 at which the values of the stored signals are divided by six to obtain the average value of the diffraction pattern over the six readings. This procedure substantially reduces noise.

Thereafter, the steps of the flow chart of FIG. 9 are repeated utilising the red laser but, this time, twelve repeats are performed and the results divided by twelve. This again substantially reduces noise. The reason for performing twelve repeats with the red laser, but only six with the infra red laser, is that in subsequent processing the diffraction patterns derived from the infra red laser will undergo further noise reduction whereas this is not the case with those derived from the red laser. Of course, the signals representing the diffraction patterns from the red laser are stored in the appropriate set of memory locations separate from those representing the diffraction patterns from the infra-red laser.

Measurement at Higher Energies

The measurement of the diffraction pattern at ten times the optimum energy and at maximum energy (Steps 112 and 114 of FIG. 7) is performed in the manner described with reference to FIG. 9. These steps are performed utilising the infra-red laser only. The resulting diffraction patterns are stored in designated sets of memory locations in memory (10) in a manner analogous to that described above with reference to Step 104 of FIG. 7, i.e. six exposures are made and averaged in each case.

Summary of Stored Data

From the above discussion, it will be appreciated that at completion of measurement Step 66 the memory 10 contains the following data:

1. The diffraction pattern produced by the infra-red (780 nm) laser at the determined optimum power and exposure settings, averaged over six readings.

2. The diffraction pattern produced by the red (670 nm) laser at the determined optimum power and exposure settings, averaged over twelve readings.

3. The diffraction pattern produced by illumination of the sample with the infra-red (780 nm) laser at power and exposure settings giving approximately ten times the energy from the optimum power and exposure settings, averaged over six readings.

4. The diffraction pattern produced by the illumination of the sample by the infra-red (780 nm) laser at its maximum power and exposure settings, averaged over six readings.

Each of the four diffraction patterns is stored in a respective different set of the above mentioned memory locations of memory 10. This storage is on an element-by-element basis, i.e as a set of numbers representing respectively the energies (averaged over several readings as above) received by the corresponding cells 48 in array 46.

In the exposures of the CCD array performed at ten times the energy produced in the determined optimum power and exposure settings and at maximum power and exposure, it is to be expected that some of the cells of the array will have saturated. The CCD array is such that upon saturation, the additional charge produced leaks into adjacent cells. The stored patterns obtained during these exposures, therefore, will contain distortions of the orders containing higher energies but will also contain information on diffracted energies in the diffraction pattern of insufficient magnitude to provide useful information when the exposure is performed at the determined optimum.

PRELIMINARY STEPS IN CALCULATION

Calculation Step 68 of FIG. 6 is shown in more detail in the flow chart of FIGS. 10A and 10B, collectively FIG. 10. However, before the required surface characteristics are actually calculated, a number of preliminary steps are carried out. These comprise the formation of a "composite" diffraction pattern array (to be explained more fully below) at Step 105, the normalisation of the composite diffraction pattern array at Step 106, the location of the zero order in that array at Step 108 and the counting of the number of peaks in that array at Step 110. These steps will now be explained in turn.

Composite Array—Step 105

In practice, some of the diffracted energy in the diffraction pattern which has been produced may be of such low intensity that it cannot readily be distinguished from noise. Thus, the optimum power and exposure settings which have been selected in the manner described above, whilst enabling the higher peaks in the diffraction pattern to be detected without saturation of the CCD elements, may be such that low level diffracted energy is undetected. The above described exposures at maximum energy levels and approximately ten times the energy level of the optimum exposure are carried out for the purpose of enabling this low level diffracted energy to be detected.

Diagram A in FIG. 11 illustrates graphically by way of example a diffraction pattern which might arise at normal exposure levels (i.e. the determined optimum levels). The broken line 160 represents the energy level at which the detector elements 48 become saturated and, as can be seen all peaks are below this level. Diagram B in FIG. 11 represents the same diffraction pattern produced at an energy level approximately ten times that of the optimum level and, as can be seen, two of the peaks 162 and 164 have exceeded the level 160 and the other remain below this level. In diagram C in FIG. 11, the same diffraction pattern is again represented but this time with the power and exposure settings at maximum. Diagram C indicates that, under these conditions, peaks 162, 164, 166, 168 and 170 all exceed the level 160 with only peaks 172 and 1.74 now being below the level. The diagrams in FIG. 11 are not to scale.

The preferred embodiment of the invention calculates a composite diffraction pattern based upon portions of the infra red patterns obtained at the optimum, ten times optimum and maximum settings. To create this composite pattern, the computer 6 is programmed to select, for the composite pattern:

a) Firstly the signals from those cells 48 (i.e those memory locations) in which the signal value is less than a threshold level 16 in the diffraction pattern obtained at maximum energy level. This threshold level is selected to be about one twentieth of the level 160 at which saturation takes place. The reason for selecting such a low threshold level is that this will exclude energy which has leaked from saturated elements.

b) Secondly, to select, from the cells remaining after the above selection, any cells having a value less than the same threshold as mentioned above in the diffraction pattern obtained at ten times the optimum energy.

c) Thirdly, to select from the diffraction pattern obtained at optimum energy setting any cells remaining after the above two selections.

The values for the various cells (memory locations) selected as above are then stored in memory (10) in a set of locations for this purpose to provide a composite diffraction pattern which is utilised for subsequent calculations and which, accordingly, has a much higher signal to noise ratio than the diffraction pattern obtained at the optimum settings. Prior to storing the values selected from the diffraction patterns obtained at ten times the optimum energy setting and at the maximum energy setting, these values are scaled down so as to be compatible with the values selected from the diffraction pattern obtained at the optimum energy setting. This scaling for the values selected from the times ten energy pattern involves multiplying those values by the ratio of the optimum energy to the times ten energy. The scaling of the values selected from the diffraction pattern obtained at maximum energy involves multiplying these values by the ratio of the energy of the optimum exposure to the maximum energy. As already indicated, the energy is taken to be the power applied to the laser multiplied by the exposure time.

Normalising—Step 106

Normalisation of the stored composite infra-red diffraction pattern which takes place in Step 106 of FIG. 10 is performed for each memory location in the corresponding set by dividing the number therein by the sum of the numbers in all of the memory locations of that set. The resulting normalised composite infra-red diffraction pattern is stored in a separate set of memory locations from that containing the unnormalised diffraction pattern.

Zero Order Location—Step 108

Although for some surfaces (particularly those of low Rq) the zero order is the largest, this is not always the case. The algorithms to be described for determining Rq require the zero order peak to be identified, for which reason Step 108 of FIG. 10 has been included. This Step is performed utilising the stored infra red and red diffraction patterns obtained at the determined optimum power and exposure settings. The composite pattern is not used in this step.

In order to locate the zero order peak, the computer (6) is programmed to utilise the fact that the peaks of the diffraction pattern produced by the infra-red laser (780 nm) are more widely spaced than those from the shorter wavelength red laser (670 nm) but the zero orders will arise at the same point on the CCD array. This is illustrated in FIG. 12 in which the two zero orders are shown to be coincident but the other orders spaced apart from each other, the solid lines representing the orders of the infra-red laser and the broken lines those of the red laser. To locate the zero order, the computer multiplies the stored signals representing the infra-red and red diffraction patterns together element by element (i.e. memory location by memory location) and defines the location of the zero order as that at which the multiplication gives the highest number.

Peak Counting—Step 110

Counting of the number of the peaks in the diffraction pattern at Step 112 of FIG. 7 is performed utilising the stored normalised composite infra-red pattern. This involves reading the numbers stored in the corresponding set of memory locations in memory (10). The values are examined to determine local maxima and the memory location at which each maximum value occurs is regarded as the centre of a peak.

Having determined the centre of each peak, the total normalised energy in each peak is then calculated during the performance of Step 110. It has already been explained that a peak in the diffraction pattern is regarded as extending over seven cells in the array (46). Accordingly, the total normalised energy in each peak is obtained by adding together the values in the seven memory locations centred at the local maximum. Peaks in which the total normalised energy is less than 10% of the maximum energy in any peak are discarded. The remaining peaks are treated as orders in the diffraction pattern. The total normalised energy in each order is then stored in memory 10. The number of such orders is counted and also stored.

Finally, in Step 110, the total normalised energy in all of the orders in the composite infra red pattern as obtained above is subtracted from unity (the total normalised energy in the composite infra red pattern) to obtain a value N representing the low level diffracted energy lying outside the orders obtained as above. This value N is then also stored.

Summary of Data Available at Completion of Preliminary Calculations

At the completion of Steps 105, 106, 108 and 110, memory 10, as will be appreciated from the above description, contains in addition to the previously described data, the following:

1. The normalised composite infra red diffraction pattern stored on an element-by-element basis, i.e. as a set of numbers each corresponding to a different cell 48 in the array 46.
2. The location of the zero order of the composite diffraction pattern.
3. The total energy in each order of the composite normalised diffraction pattern.
4. The low level diffracted energy N in the composite normalised diffraction pattern.

In the subsequent description, the following symbols will be used:

$T_0$=normalised energy in zero order $T_{+1}$=normalised energy in positive first order $T_{-1}$=normalised energy in negative first order $T_{+2}$=normalised energy in positive second order $T_{-2}$=normalised energy in negative second order $T_{+3}$=normalised energy in positive third order $T_{-3}$=normalised energy in negative third order $T_{+4}$=normalised energy in positive fourth order $T_{-4}$=normalised energy in negative fourth order N=the low level diffracted energy obtained by subtracting total normalised energy in all orders from unity.

In practice, different surfaces will result in composite diffraction patterns containing different numbers of orders.

Algorithms for Rq

At Step 200 in FIG. 10, a decision is made as to whether Step 110 has disclosed that there is only one peak or order in the composite diffraction pattern. Where there is only one peak, which would be the zero order, an algorithm herein termed the "Gaussian" Algorithm is used for obtaining Rq and the program moves to branch 202. Where decision 200 reveals that there is at least one order in addition to the zero order, an algorithm herein called the "Interpolation Algorithm" is used for determining Rq and the program moves to branch 204. Before describing the branches 202 and 204 further, it will be necessary to give a full explanation of the two algorithms. The Interpolation Algorithm will be described first.

INTERPOLATION ALGORITHM FOR DETERMINING Rq

Sinusoidal Profile

Figure 13:
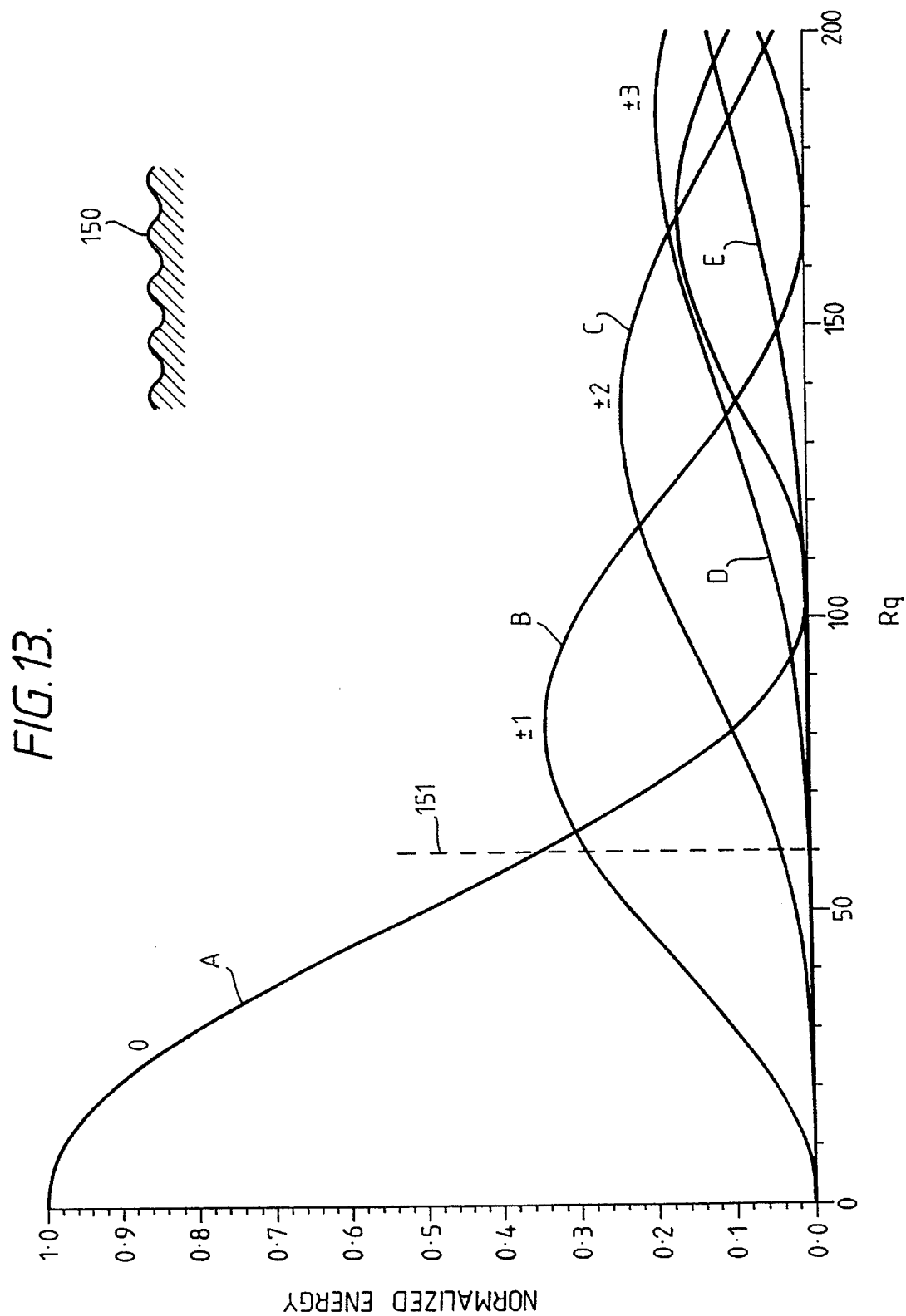

It is well known that the distribution of the energy amongst the different orders in a diffraction pattern produced by diffracting monochromatic light from a surface is a function of the surface roughness and profile. FIG. 13 shows such distribution as a function of surface roughness for a theoretical surface whose profile is a simple sinusoid as indicated by reference number 150 in FIG. 13. Curve A is a plot of the energy (normalised) in the zero order and shows that for an Rq value of zero (a theoretically totally smooth surface) all of the energy is contained in the zero order in the diffraction pattern. As Rq increases, the energy in the zero order decreases until it becomes zero for an Rq value 105.5 nm. Thereafter, as Rq increases further, the proportion of the energy in the zero order peak again increases to some extent reaching a maximum at an Rq value of around 170 nm and thereafter decreasing.

Curve B in FIG. 13 is a plot of the energy (normalised) in each first order as the diffraction pattern for the sinusoidal surface 150 as Rq varies. Thus, as can be seen from FIG. 13, when Rq is zero there is no energy in the first orders of the diffraction pattern but as Rq increases, the energy in the first orders increases to a maximum at an Rq value of 80 nm to 90 nm and thereafter decreases to zero at an Rq value of around 170nm. It can be seen that curves A and B intersect at Rq values of about 60 nm and 130 nm to 140 nm at which points the energies in the zero and two first orders are all equal. Curve B represents the energy in each of the two first orders since, with a sinusoidal surface, these orders always contain equal energy, the diffraction pattern being symmetrical about the zero order.

Curves C, D and E in FIG. 13 similarly represent the energy (normalised) or intensity (normalised) in the two second orders, the two third orders and the two fourth orders respectively. It is well known that the curves in FIG. 11 are functions of the form:

$$Es_j(Rq) = J_j^2\left(\frac{4\sqrt{2}\pi Rq}{\lambda}\right) = \left[\sum_{m=0}^{m=\infty}(-1)^m \frac{1}{m!\,(m+|j|)!}\left(\frac{2\sqrt{2}\pi Rq}{\lambda}\right)^{(2m+|j|)}\right]^2$$

where $Es_j(Rq)$ is the energy in the jth order for a given Rq value corresponding to the sinusoidal symmetrical surface (150), where j is the order of the diffraction pattern, is the wavelength of the light used, $J_j$ is a Bessel function of integer order j, m is an integer, and ! has its usual meaning of factorial.

Utilising these $Es_j(Rq)$ functions, and limiting m to a reasonable value at which the terms in the series function become small enough to be neglected, e.g. the terms have a value less than 0.0005, it would be possible to generate a set of reference values for the distribution of the energy amongst the different orders in the diffraction pattern for each possible value of Rq within the measuring range. For example, reading off from FIG. 13 at the point identified by broken line 151, it can be seen that for an Rq of 60 nm, the energy (normalised) in the various orders is as follows:

| Zero order | Curve A | 0.34 |
| Positive first order | Curve B | 0.29 |
| Negative first order | Curve B | 0.29 |
| Positive second order | Curve C | 0.04 |
| Negative second order | Curve C | 0.04 |
| Positive third order | Curve D | 0.00 |
| Negative third order | Curve D | 0.00 |
| Positive fourth order | Curve E | 0.00 |
| Negative fourth order | Curve E | 0.00 |

Thus, the energy distribution amongst the various orders of the diffraction pattern uniquely defines the Rq value.

It would therefore be possible to obtain from the above Es. (Rq) functions a large number of such sets of reference values, each set being for a different possible value of Rq. For example, a set of reference values could be obtained for each unit value of Rq within the range Rq=0 to Rq=200 nm. Determination of Rq for a theoretical surface having a sinusoidal profile of unknown Rq could then be achieved by obtaining the normalised energies in each of the orders in the diffraction pattern produced by this surface and comparing them in turn with each of the sets of reference values. The best match would indicate the Rq value. In practice, however, this cannot be done successfully with many surfaces because they may exhibit too high a degree of asymmetry in the diffraction pattern.

An important aspect of the preferred embodiment of the present invention concerns the generation of sets of reference values for the energy distribution amongst the different orders of a diffraction pattern which can be utilised for defining the Rq value of a real surface by comparing values obtained from a diffraction pattern resulting from such real surface with the reference values. Before considering how these reference values are generated in the preferred embodiment of the invention, it is first necessary to consider, with reference to FIG. 14, the variations in energy distribution which arise with variations in Rq value of a further theoretical surface which, in this case, has a saw-tooth profile as indicated by reference number 152 in FIG. 14.

Saw-Tooth Profile

The curve A in FIG. 14 again represents the normalised energy in the zero order of the diffraction pattern as a function of Rq and, as can be seen, when Rq is zero (a theoretical totally smooth surface) all the energy is contained in the zero order. As Rq increases, so the energy in the zero order decreases until it becomes zero at an Rq value of 112.6rim. For higher values of Rq, energy again appears in the zero order but only a small amount, as shown by the continuing low values of curve A in FIG. 14. Curves B and B' respectively show the energy contained in the positive and negative first orders of the diffraction pattern. As can be seen, as Rq increases from zero, the energy in the positive first order of the diffraction pattern increases relatively steeply but that in the negative first order increases only slowly so that there is considerable asymmetry in the diffraction pattern. At an Rq value of 112.6 nm, curve B reaches a maximum whilst the other curves become zero indicating that all of the energy is, for this value of Rq, concentrated in the positive first order peak.

Curves C and C' show that, for values of Rq between about and 20 nm and 90 nm there is some, but relatively little, energy in the second orders with more being in the positive order (C) than the negative order (C'). As already indicated, for Rq values around 110 nm to 120 nm all of the energy is concentrated in the positive first order and thus, for these values of Rq, curves C and C' reduce to about zero. For Rq values above about 120 nm, curve C increases sharply whilst curve C' remains at a low value so that for the higher values of Rq, 150 nm to 200 nm, there is substantial asymmetry between the positive and negative second order peaks. Again, it can be seen that if a set of reference values were obtained from the curves shown in FIG. 14, the distribution of the energy amongst the different orders of a diffraction pattern produced from the surface 152 of saw-tooth profile could be compared with the reference values to obtain an indication of Rq. By way of example, reading off from the curves of FIG. 14 at the point corresponding to Rq equals 60 nm as indicated by broken line 153, it can be seen that the energy distribution amongst the various orders of a diffraction pattern produced from a theoretical saw-tooth surface 152 would be as follows:

| Zero order | Curve A | 0.37 |
| Positive first order | Curve B | 0.47 |
| Negative first order | Curve B' | 0.05 |
| Positive second order | Curve C | 0.05 |
| Negative second order | Curve C' | 0.02 |
| Positive third order | Curve D | 0.02 |
| Negative third order | Curve D' | 0.01 |
| Positive fourth order | Curve E | 0.01 |
| Negative fourth order | Curve E' | 0.00 |

Figure 14:
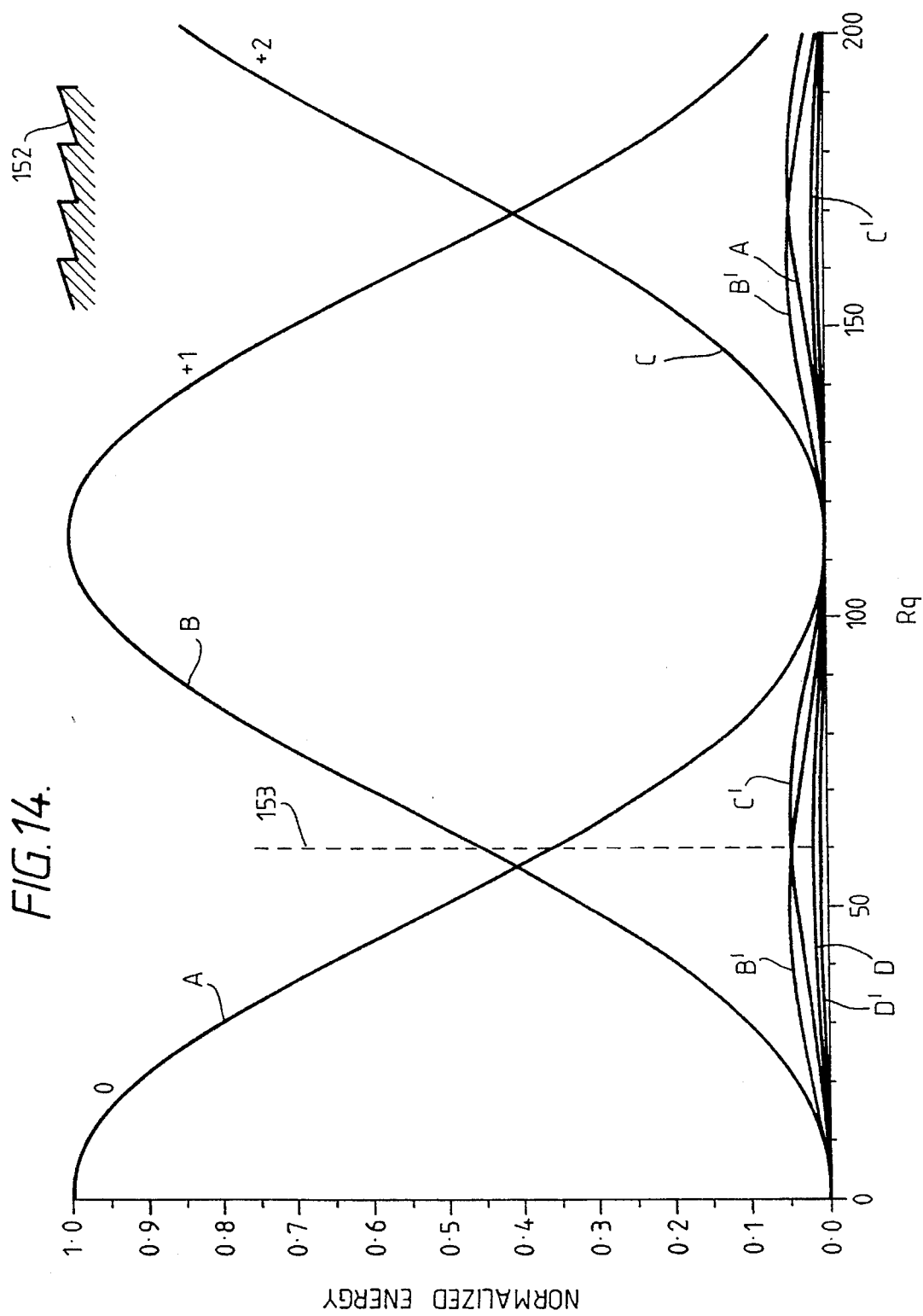

The following function defines the curves shown in FIG. 14:

$$E_{aj}(Rq) = \left[ \frac{\sin\left(\pi \frac{[4\sqrt{3}\ Rq - j]}{\lambda}\right)}{\pi\left(\frac{4\sqrt{3}\ Rq - j}{\lambda}\right)} \right]^2$$

where j is the order of the diffraction pattern $\lambda$ is the wavelength of light used $E_{aj}(Rq)$ is the energy in $j^{th}$ order for a given Rq Rq value corresponding to the saw-tooth (asymmetric) surface 152.

Interpolation

It is unlikely, in practice, that either a truly sinusoidal profile surface 150 or the truly saw-tooth profile surface 152 will be encountered. Accordingly neither the symmetrical diffraction patterns represented by the curves of FIG. 13 nor the extremely asymmetric patterns represented by the curves of FIG. 14 are likely to be produced. Many real surfaces will produce diffraction patterns having multiple peaks with varying degrees of asymmetry. FIG. 4 is an example of such a diffraction pattern which has been produced from a real surface. In accordance with an important aspect of the preferred embodiment of the invention, reference values for the energy distribution amongst the different orders of the diffraction pattern from a real surface are derived by interpolation between the $E_{sj}(Rq)$ functions shown in FIG. 13 and the $E_{aj}(Rq)$ functions shown in FIG. 14. Since different real surfaces will produce diffraction patterns with different degrees of asymmetry, the proportions in which these two functions are combined in the interpolation is dependent upon the asymmetry of the diffraction pattern produced by the particular surface under test. In particular, to obtain the set of reference values, this interpolation is performed for each of the orders to be utilised (this being dependent upon the number of orders present in the diffraction pattern produced by the surface under test) and for values of Rq throughout the range to be measured (for example all unit values of Rq between 0 and 200 nm) utilising the well known linear interpolation formula as follows:

$$\text{RefValue } V_j = \alpha.E_{aj}(Rq) + (1-\alpha).E_{sj}(Rq)$$

In the above formula $\alpha$ is a number dependent upon the asymmetry of the detected diffraction pattern. The manner of calculation of $\alpha$ will be discussed in detail later. At this point, some examples of the curves resulting from interpolation between the $E_{sj}(Rq)$ functions and $E_{aj}(Rq)$ functions with different values of $\alpha$ will be described with reference to FIGS. 15 to 18. In these figures, the different curves shown represent the normalised energy in the different orders of the diffraction pattern against Rq but the horizontal axis is divided into two parts with the value Rq=0 at the centre. The curves to the right of this position represent normalised energy in the positive orders with Rq increasing to the right and the curves to the left of the Rq=0 point represent normalised energy in the negative orders of the diffraction pattern with Rq increasing to the left.

Figure 15:
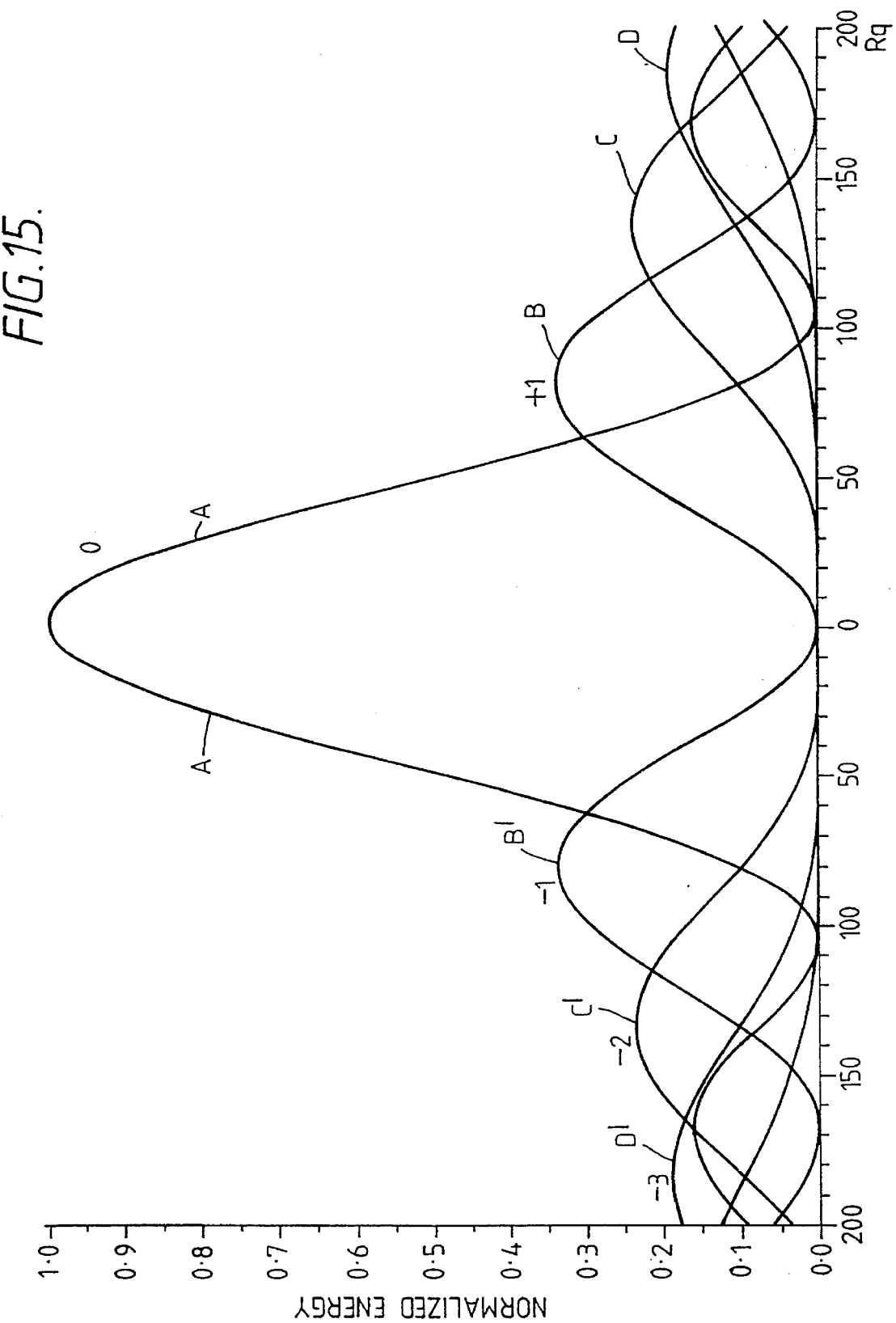

FIG. 15 shows the curves for the value of =0, that is to say these curves are the $E_{sj}(Rq)$ functions alone as shown in FIG. 13 but to a different scale and with the curves for the positive or negative orders on opposite sides of the zero order separated from each other. Thus, in FIG. 15, the horizontal axis is reduced in scale compared to that in FIG. 13. As can be seen each pair of curves B, B'; C, C'; D, D' for the respective first second and third order pairs is symmetrical. FIG. 15 is, therefore, essentially a redrawing of FIG. 13 with the positive and negative orders separately represented as described. These curves would not normally arise in practice since, as described above, they relate to a purely sinusoidal surface.

Figure 16:
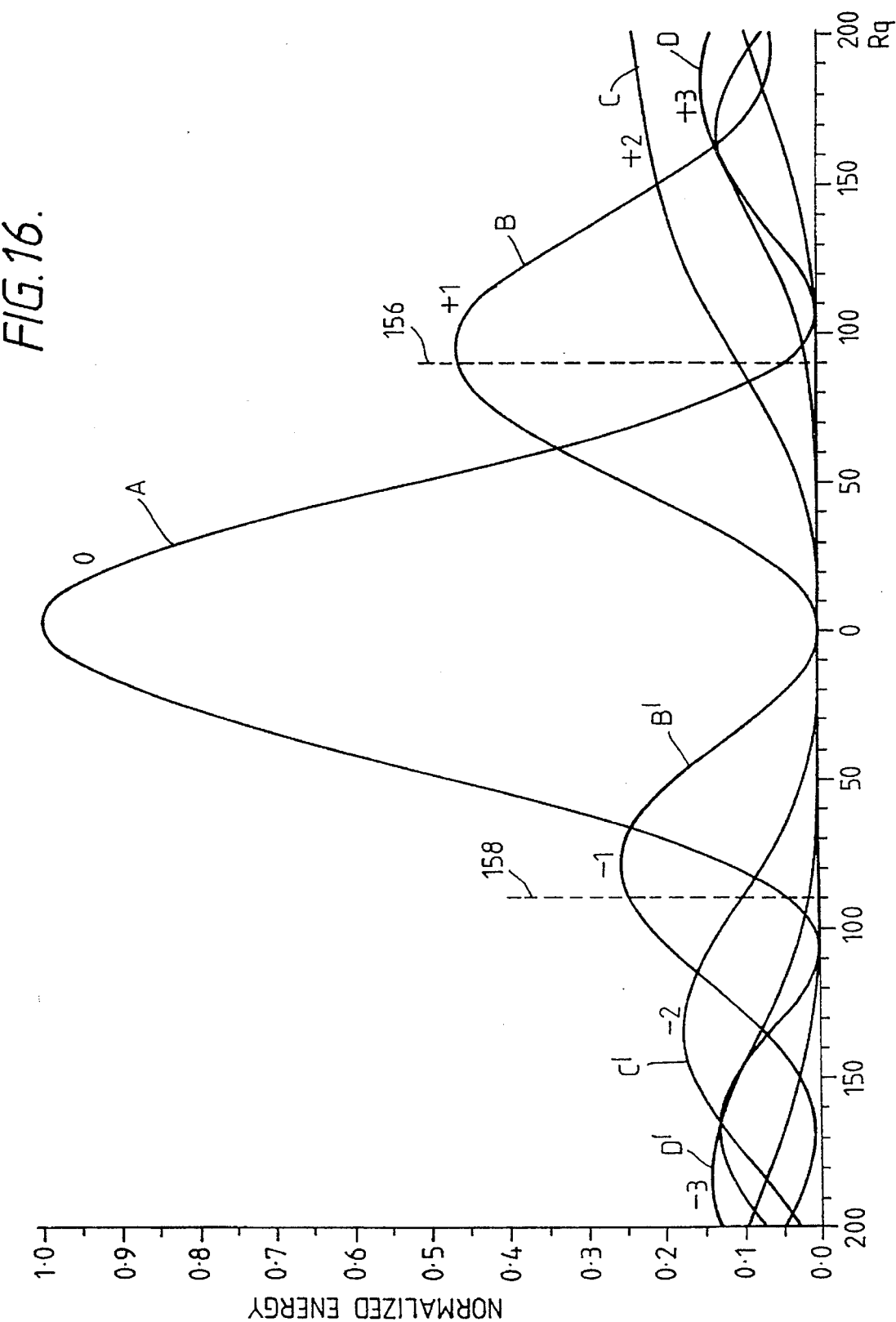

FIG. 16 shows the curves resulting from the above interpolation for the value $\alpha$=0.25. Curve A, for the zero order, remains relatively unchanged. Curves B and B' become asymmetric with the first maximum in the B curve having a higher value than the first maximum in the B' curve although the B and B' curves remain of roughly similar shape. The C and C' curves have substantially changed in shape but there has been relatively little, but some, change in the D and D' curves. The curves of FIG. 16 are characteristic of a surface whose periodic profile is predominantly symmetrical rather than asymmetrical.

Figure 17:
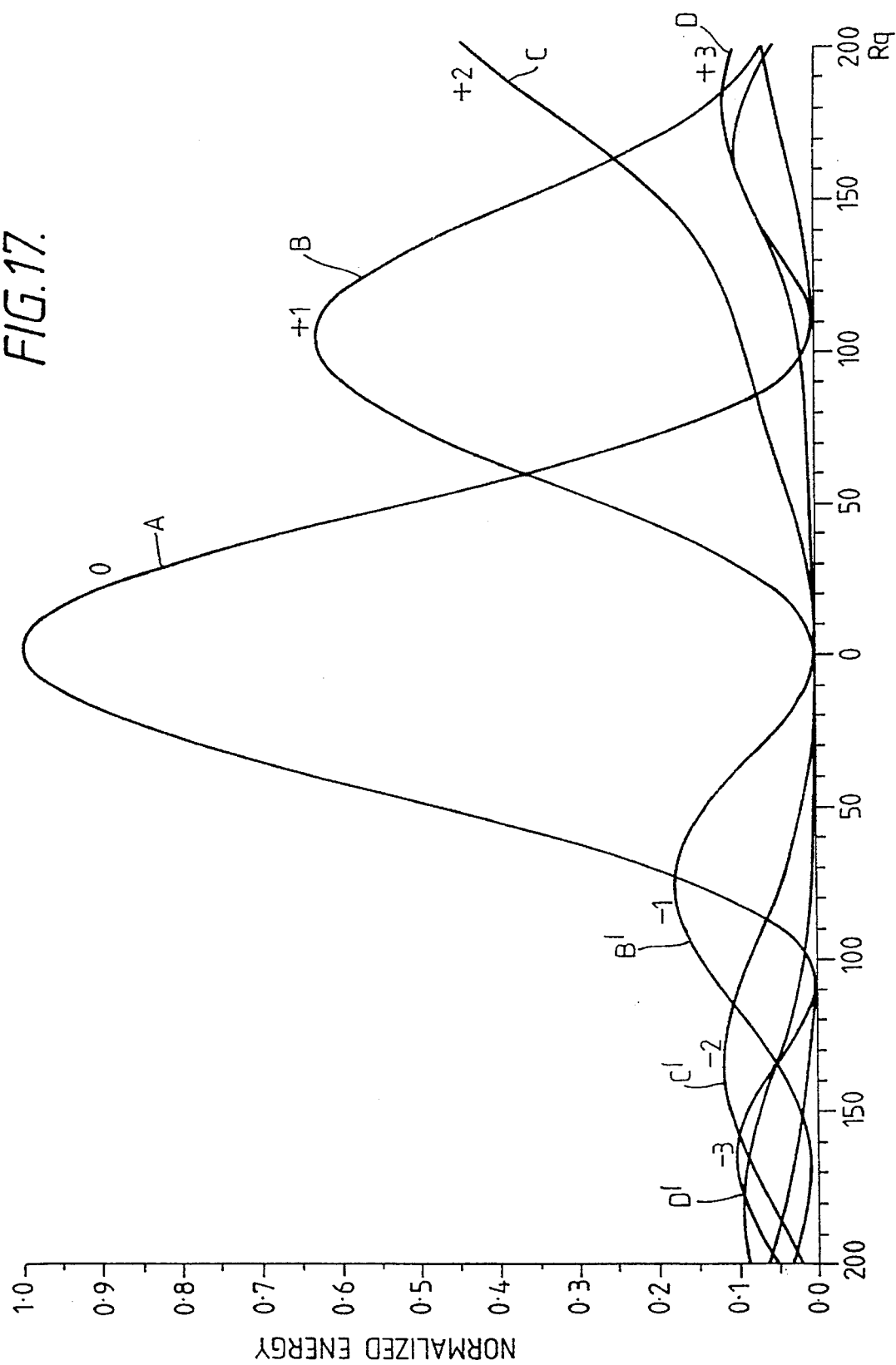

FIG. 17 shows the results of the interpolation when $\alpha$=0.5 i.e. when the surface represented has roughly equal degrees of symmetry and asymmetry in the periodic profile components of surface roughness. As can be seen, there is greater asymmetry in the curves representing the energy distribution between the positive and negative orders in the diffraction pattern.

Figure 18:
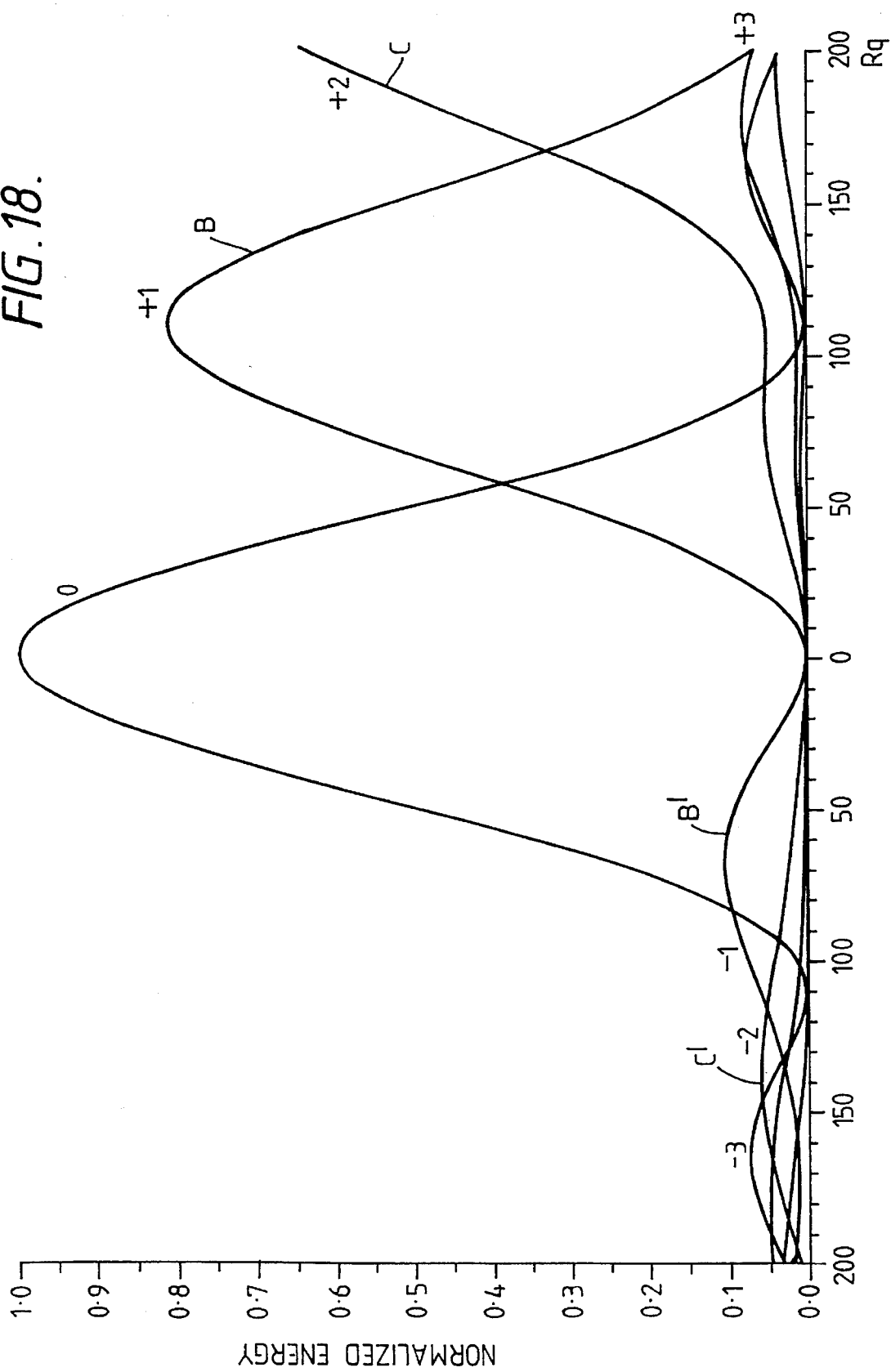

FIG. 18 illustrates the interpolation when $\alpha$=0.75 indicating that its periodic components of surface roughness is highly asymmetric features. In this case there is very substantial asymmetry between the curves representing the first and second orders, i.e the B, B' and C, C' curves.

It has been established, in accordance with an important aspect of the preferred embodiment, that sets of reference values generated from the above described interpolation, such as represented by the curves of FIGS. 16, 17 or 18, can be used for establishing the value of Rq accurately in real surfaces. The following is one example of a set of reference values obtained by reading off the values of the curves of FIG. 16 at the two points corresponding to Rq=90 nm as indicated by broken lines 156 and 158:

| | | |
|---|---|---|
| Zero order | Curve A | 0.04 |
| Positive first order | Curve B | 0.46 |
| Negative first order | Curve B' | 0.24 |
| Positive second order | Curve C | 0.12 |
| Negative second order | Curve C' | 0.12 |
| Positive third order | Curve D | 0.01 |
| Negative third order | Curve D' | 0.01 |

FIG. 19 represents the above reference values graphically and may be considered a reference diffraction pattern for a surface in which $\alpha$=0.25 and Rq=90 nm.

Before a set of reference values can be generated for a particular surface under test, it is necessary to determine the appropriate value of $\alpha$ for that surface. A description of this derivation will now be given.

Calculation of $\alpha$

Reference has already been made to the asymmetry in the diffraction pattern shown in FIG. 4, which is an example of a pattern obtained from a real surface. The pattern in FIG. 4 comprises a zero order and pairs of first, second, third orders. Calculation of $\alpha$ first involves summing the absolute value of the differences in energies between the positive and negative orders in each pair. That is to say, the energy differences between the two first orders is calculated, that between the two second orders and so on and the modulus of these differences summed. The result of this calculation is herein termed the diffraction pattern symmetry factor (DPSF) and is a measure of the asymmetry of the diffraction pattern. DPSF may be expressed mathematically as follows:

$$DPSF = \sum_{j=1}^{n} |T_{+j} - T_{-j}|$$

where j=order number $T_{+j}$=energy in the upper $j^{th}$ order $T_{-j}$=energy in the lower $j^{th}$ order n=1 if at least one of the pair of first orders is present with no second, third or fourth orders n=2 if at least one of the pair of second orders is present with no third or fourth orders n=3 if at least one of the pair of third orders are present without the fourth orders being present, and n=4 if at least one of the pair of fourth orders are present.

Diffraction patterns in which n has the value 1, 2, 3, will be referred to as diffraction patterns of Type 1, Type 2, Type 3, and Type 4 respectively.

It will be recalled that the energy $T_0$, $T_{+1}$, $T_{-1}$ ... etc. in each of the orders in the composite infra red diffraction pattern derived from the surface under test is stored in memory (10) at Step 110 in FIG. 10 and is therefore available for calculation of the DPSF. As already explained, the energy in an order is computed as the sum of the energy received by seven adjacent cells of the array (46) centred at an energy maximum.

In practice, the numbers of orders present will differ from surface to surface. Calculation of $\alpha$ from DPSF is carried out in the preferred embodiment utilising one of four polynomials according to "type" of the composite diffraction pattern stored at Step 110. The polynomials for calculating $\alpha$ from DPSF are as follows:

Type 1:

$$\alpha = 0.1979377 \times DPSF - 0.026245692 \times DPSF^2$$
Polynomial (1)

Type 2:

$$\alpha = 0.76577747 \times DPSF + 0.12269209 \times DPSF^2$$
Polynomial (2)

Type 3:

$$\alpha = 1.0171813\ DPSF - 0.26088479 \times DPSF^2$$
Polynomial (3)

Type 4:

$$\alpha = 0.86530004\ DPSF + 0.01546745 \times DPSF^2$$
Polynomial (4)

$\alpha$ must be within the range 0 to 1 for the interpolation to be effective. It has been found in practice, using a prototype of the preferred embodiment of the invention, that $\alpha$ has always fallen within this range. The calculated value of $\alpha$ cannot be less than 0. As a safeguard against the calculated value exceeding 1, the software includes a constraint which sets $\alpha=1$ in the event that the calculated value should exceed this.

The above polynomials 1 to 4 for calculating were derived as follows:

1. First, an initial value of $\alpha$ within the range 0 to 1 was chosen.

2. Using the above interpolation formula and the chosen value of $\alpha$, a set of reference values $V_j$ for each value of Rq between 0 and 200 nm was calculated. In other words:

$$V_j(Rq) = \alpha Ea_j(Rq) + (1-\alpha)Es_j(Rq)$$

FIG. 20A is a set of curves representing these reference values obtained for $60 = 0.25$. Curve A represents the values for the zero order, curves B and B' represent the reference values for the positive and negative first orders respectively, curves C and C' represent the reference values for the positive and negative second orders respectively, curves D and D' represent the reference values for the positive and negative third orders respectively and curves E and E' represent the reference values for the positive and negative fourth orders respectively.

3. As indicated in FIG. 20A, the curves are divided up in to ranges of Rq value according to the diffraction pattern "type". Broken lines 500, 502, 504 and 506 in FIG. 20A indicate the boundaries between the different types. Boundary 500 is at the Rq value at which curves B reaches a value of 10% of curve A at that point. Boundary 502 is the Rq value at which curves C reaches a value of 10% of curve A at that point (curve A being the curve with the highest value at the relevant point). Boundary 504 is at the Rq value at which curve D has a value of 10% of curve B (this being the curve with the highest value at that point). Boundary 506 is at the point at which curve E has a value of 10% of that of curve B at that point.

4. The mean DPSF (diffraction pattern symmetry factor) is calculated for each Type through the Rq range over which the Type exists. By way of example, in the Type 1 range, between boundaries 500 and 502, the difference between the values of curves B and B' for each Rq value is calculated and then the mean of these differences is obtained. To illustrate this, vertical line 508 has been drawn between curves B and B' at the Rq=40 nm point and the length of this line, i.e. the distance between the two curves at that point represents the mean DPSF. It will be recalled from the above discussion of DPSF that it is the absolute value of the differences which are taken.

After completion of the above steps for a given value of $\alpha$, $\alpha$ is then incremented and these steps repeated. This is repeated for each value of $\alpha$ between 0 and 1 at say steps of 0.1. However, when a point is reached at which the reference values no longer result in diffraction pattern Types 1 to 4 following each other in sequence as Rq increases as illustrated in the example given in FIG. 20A, the process is terminated without increasing $\alpha$ any further.

The polynomial for calculating $\alpha$ for each different diffraction pattern type is then obtained as follows.

A first Type is selected and each value of $\alpha$ related to its corresponding mean DPSF value by the following polynomial:

$$\alpha = c_1 DPSF + c_2(DPSF^2) \ldots \text{Polynomial (5)}$$

This is assumed to hold true for each of the pairs of values of $\alpha$ and mean DPSF for the diffraction pattern Type, of which there will be no more than say 10 pairs. The optimum values of the coefficients $c_1$ and $c_2$ are then obtained by a least mean squares method.

This is then repeated for each other diffraction pattern Type to obtain all of the values of the required coefficients. The numbers which have been obtained in making a prototype of the invention have already been given in polynomials 1 to 4 above. These values are dependent upon the wavelength of the light used for producing the diffraction pattern but are otherwise independent of the design of the instrument. They are, of course, dependent upon the above interpolation formula.

After $\alpha$ has been calculated, for a given surface under test, reference values can be calculated for that surface utilising the above described interpolation.

However, the normalised energy values in the orders obtained from a real surface under test cannot be directly compared with these reference values because the reference values are obtained by interpolation between theoretical diffraction patterns produced by "ideal" surfaces having only periodic surface profiles, whereas the surface profile of a real workpiece includes random components in addition, which random components affect the diffraction pattern produced, giving rise to a continuum of low level diffracted energy. There is no such low level diffracted energy in the theoretical diffraction patterns utilised for the generation of the reference values. Also, even in the absence of any such random surface component, the actual diffraction pattern may depart significantly from the reference values obtained by interpolation.

In the preferred embodiment of the invention, this is taken into account by modifying the values of the energy in the orders stored at Step 110 of FIG. 10 prior to comparing the energy in orders with the reference values, to determine Rq. Such modification of the orders energy structure will now be described.

Modification of Order Energy Structure

Modification of the order energy structure of the composite diffraction pattern obtained from the surface under test (i.e. the energy values stored at Step 110), prior to comparison with the reference values determined by the above interpolation, is performed utilising a large body of precalculated coefficients stored in memory (10). The modification involves replacing the energy value for each order with a new value which is the sum of proportions of the energy from each order in the structure and of the low level diffracted energy N. For a diffraction pattern having nine orders (Type 4), which is the maximum utilised in the preferred embodiment of the invention, this may be expressed mathematically by the following polynomials:

$$S_j = A_j T_o + B_j T_1 + C_j T'_1 + D_j T_2 + E_j T'_2 + F_j T_3 + G_j T'_3 + H_j T_4 + I_j T'_4 + M_j N \quad \text{Polynomial (6a)}$$

$$S'_j = A'_j T_o + B'_j T_1 + C'_j T'_1 + D'_j T_2 + E'_j T'_2 + F'_j T_3 + G'_j T'_3 + H'_j T'_4 + I'_j T'_4 + M'_j N \quad (6b)$$

where $S_j$ is the modified value of the larger of the $j^{th}$ order pair.

$S_j$ is the modified value of the smaller of the $j^{th}$ order pair.

$T_0$, $T_1$, $T_1'$, $T_2$, $T_2'$ etc are the normalised energies in the nine orders as defined above, with the prime (') indicating that order of each pair which has the smaller amount of energy. Thus, if the positive first order contains more energy than the negative first order, $T_1$ represents the energy in the positive first order and $T_1'$ that in the negative first order and vice versa.

N is the low level diffracted energy in the diffraction pattern as defined above.

$A_j$ to $I_j$ and $M_j$ and $A'_j$ to $I'_j$ and $M'_j$ are coefficients defining the proportions in which the energies in the orders and low level energy respectively are linearly combined to give the new value $S_j$ and $S'_j$.

Many such sets of coefficients are stored; which particular set is used in modifying a given order in a given diffraction pattern from a real surface depends upon:

(a) the diffraction pattern Type (b) the range within which the value of $\alpha$ for that pattern falls; and (c) the particular order being modifed.

Thus, before modifying a diffraction pattern obtained from a real surface, and after having calculated $\alpha$, the step of quantising $\alpha$ is carried out to obtain a number herein called the asymmetry number. The quantisation is dependent upon the diffraction pattern Type. Quantisation of $\alpha$ for the four different Types of diffraction pattern is as follows:

| Alpha Range | Asymmetry Number |
| --- | --- |
| Type 1 | |
| $0.0 \leq \alpha < 0.001$ | 0 |
| $0.001 \leq \alpha < 0.003$ | 1 |
| $0.003 \leq \alpha < 0.007$ | 2 |
| $0.007 \leq \alpha < 1.0$ | 3 |
| Type 2 | |
| $0.0 \leq \alpha < 0.06$ | 0 |
| $0.06 \leq \alpha < 0.1$ | 1 |
| $0.1 \leq \alpha < 0.16$ | 2 |
| $0.16 \leq \alpha < 1.0$ | 3 |
| Type 3 | |
| $0.0 \leq \alpha < 0.1$ | 0 |
| $0.1 \leq \alpha < 0.151$ | 1 |
| $0.151 \leq \alpha < 0.22$ | 2 |
| $0.22 \leq \alpha < 0.301$ | 3 |
| $0.301 \leq \alpha < 1.0$ | 4 |
| Type 4 | |
| $0.0 \leq \alpha < 0.12$ | 0 |
| $0.12 \leq \alpha < 0.17$ | 1 |
| $0.17 \leq \alpha < 0.21$ | 2 |
| $0.21 \leq \alpha < 0.27$ | 3 |
| $0.27 \leq \alpha < 0.36$ | 4 |
| $0.36 \leq \alpha < 1.0$ | 5 |

Accordingly, a separate set of coefficients is stored for each order in each different diffraction pattern Type and for each different asymmetry number relating to that Type. When modifying a diffraction pattern prior to comparison with the above mentioned reference values for determining Rq, the Type of the pattern is determined according to the number of orders, this already being stored in memory (10) as described above, the asymmetry number is determined by quantising $\alpha$ as described above and then the appropriate sets of coefficients (one set for each order) accessed from memory (10) and each order energy is "rebuilt" utilising the relevant set of coefficients.

The manner in which the coefficients are calculated will now be described.

Calculation of Coefficients

Calculation of coefficients for the above Polynomial (6) involves following steps:

1. A large number of simulated surfaces, e.g. about 2000 are generated by computer and stored as a set of numbers defining the profile of the surface (this set of numbers being analogous to a digitised signal).

2. Rq for each simulated surface is calculated and stored.

3. The diffraction pattern that such a surface would produce at the CCD array (46) if a workpiece having such a surface were exposed to the infra-red laser light of the preferred embodiment is calculated and stored as a set of numbers representing the normalised energy that would be received at each element of the array. At this point the simulated surface itself can be discarded.

4. The values $T_0$, $T_1$, $T_1'$, $T_2$, $T_2'$ . . . etc. and N as defined above are calculated for this stored pattern. That is to say, local maxima in the stored pattern are located, the total energy in the seven cells centred at each maximum is calculated, any resulting peaks having energy less than 10% of that in the biggest are discarded and the remaining peaks are treated as the orders $T_0$, $T_1$, $T_1'$ etc. in the diffraction pattern described above. These values $T_0$, $T_1$... etc., N together with the previously calculated Rq are called the "characterisation data set" (CDS) for the surface. Havinh obtained the CDS for a given surface, the diffraction pattern can be discarded.

5. $\alpha$ as defined above is calculated from the stored CDS for the corresponding calculated diffraction pattern.

6. The asymmetry number is calculated.

7. The stored CDS's are sorted into groups according to firstly the corresponding diffraction pattern Type and secondly to the asymmetry number.

On completion of the above preliminary steps, there will therefore be stored a number of groups of characterisation data sets. The CDS's patterns in any given group will all relate to surfaces which produce the same diffraction pattern Type with the same asymmetry number. Typically, in practice, there might be CDS's relating to about 100 surfaces in each group. Thereafter, the coefficients for the above mentioned polynomials are obtained separately for each group. This is done as follows:

1. A first group is selected, say a group in which the diffraction patterns are of Type 1 (zero and at least one first order, and have an asymmetry number of 0.

2. The CDS corresponding to a surface of the selected group is selected.
3. Utilising the Rq value in the selected and the α value calculated for that CCD a set of reference reference values $V_0$, $V_1$, $V_1'$ ... etc is calculated for that surface using the above linear interpolation formula.
4. Steps 2 and 3 are then repeated for the CDS's of each other surface in the selected group.

At this point, there will be available for each order energies $T_0$, $T_1$, $T_1'$ etc and the set of surface in the selected group its set of calculated reference values $V_o$, $V_1$, $V_1'$ etc the latter having being obtained by the interpolation formula. These will differ from each other (a) because the low level diffracted energy term, N, exists only in the calculated values of the CDS and (b) because even in the absence of such random surface contributions the mean interpolation model per se is an idealised model of the diffraction pattern. However, continuing with the example of a Type 1 diffraction pattern, each reference value can be related to the energies in the orders of the calculated diffraction pattern by a respective one of the following polynomials:

$$V_0 = A_0 T_0 + B_0 T_1 T C_0 T_1' + M_0 N \quad \text{Polynomial (7)}$$

$$V_1 = A_1 T_0 + B_1 T_1 + C_1 T_1' + M_1 N \quad \text{Polynomial (8)}$$

$$V_1 = A_1 T_0 + B_1 T_1 + C_1 T_1 + M_1 N \quad \text{Polynomial (9)}$$

$V_o$, $V_1$ and $V_1'$ are the zero and the two first order reference values obtained from the interpolation formula.

$T_o$, $T_1$ and $T_1'$ are the zero and two first order values for the energy in the calculated diffraction pattern.

N represents the low level diffracted energy in the calculated diffraction pattern as previously defined.

$A_o, B_o, C_o, M_o$ ... etc are all coefficients and are the only unknown in the above polynomials.

It is considered that for surfaces which give rise to diffraction terms of the same type and the same asymmetry number the coefficients used in the polynomial for rebuilding a given order in each surface in the group will be substantially identical. Taking the zero order, the polynomial $$V_o = A_0 T_0 + B_0 T_1 + C_0 T_1' + M_0 N$$

is assumed to hold true for all of the surfaces in the selected group. The values of $T_o$, $T_1$, $T_1'$, and N will be different for each different surface in the selected group, as will be the value $V_o$, but the values of of the coefficients $A_0$, $B_0$, $C_0$ and M will be the same. The optimum value for the coefficients is then calculated by an appropriate mathematical technique, such as a Least Mean Squares method. Such methods are well known. The values for the coefficients thus obtained are then stored in memory (10) for use in rebuilding the zero order in the selected group. It will be recalled that all diffraction patters in a selected group are of the same Type, also have the same asymmetry number.

The above is then repeated for the next order, say the larger of the first orders and the polynomial $$V_1 = A_1 T_0 + B_1 T_1 + C_1 T_1' + M_1 N$$

is assumed to hold true for all of the surfaces in the selected group and again in optimum values for the coefficients $A_1$, $B_1$, $C_1$, and $M_1$ calculated by a Least Mean Squares method.

The above is repeated for each other order in the selected group and is then repeated for all of the other groups. There is then available in the memory (10) a set of coefficients for rebuilding each order of the diffraction pattern derived from a real surface, with different coefficients being provided for diffraction patterns of different Type and asymmetry number. Each set of coefficients also includes a coefficient relating to the low level diffracted energy content of the diffraction pattern.

After the above has been completed, the following coefficients will be available and will be stored in memory 10 in a look up table:

| For diffraction patterns of Type 1: | |
| --- | --- |
| Order to be rebuilt | Coefficient Set |
| Zero | $A_0, B_0, C_0, M_0$ |
| Larger First | $A_1, B_1, C_1, M_1$ |
| Smaller First | $A_1', B_1', C_1', M_1'$ |

There is such a set of twelve coefficients for each different asymmetry number of Type 1 patterns.

| For Type 2 diffraction patterns: | |
| --- | --- |
| Order to be rebuilt | Coefficients Set |
| Zero | $A_0, B_0, C_0, D_0, E_0, M_0$ |
| Larger First | $A_1, B_1, C_1, D_1, E_1, M_1$ |
| Smaller First | $A_1', B_1', C_1', D_1', E_1', M_1'$ |
| Larger Second | $A_2, B_2, C_2, D_2, E_2, M_2$ |
| Smaller Second | $A_2', B_2', C_2', D_2', E_2', M_2'$ |

There is such a set of thirty coefficients for each different asymmetry number for Type 2 diffraction patterns.

| For Type 3 diffraction patterns: | |
| --- | --- |
| Order to be rebuilt | Coefficients Set |
| Zero | $A_0, B_0, C_0, D_0, E_0, F_0, G_0, M_0$ |
| Larger First | $A_1, B_1, C_1, D_1, E_1, F_1, G_1, M_1$ |
| Smaller First | $A_1', B_1', C_1', D_1', E_1', F_1', G_1', M_1'$ |
| Larger Second | $A_2, B_2, C_2, D_2, E_2, F_2, G_2, M_2$ |
| Smaller Second | $A_2', B_2', C_2', D_2', E_2', F_2', G_2', M_2'$ |
| Larger Third | $A_3, B_3, C_3, D_3, E_3, F_3, G_3, M_3$ |
| Smaller Third | $A_3', B_3', C_3', D_3', E_3' F_3', G_3', M_3'$ |

Such sets of 56 coefficients are stored for each different asymmetry number for Type 3 diffraction patterns.

| For Type 4 diffraction patterns: | |
| --- | --- |
| Order to be rebuilt | Coefficients Set |
| Zero | $A_0, B_0, C_0, D_0, E_0, F_0, G_0, H_0, I_0, M_0$ |
| Larger First | $A_1, B_1, C_1, D_1, E_1, F_1, G_1, H_1, I_0, M_0$ |
| Smaller First | $A_1', B_1', C_1', D_1', E_1', F_1', G_1', H_1', I_1', M_1'$ |
| Larger Second | $A_2, B_2, C_2, D_2, E_2, F_2, G_2, H_2, I_2, M_2$ |
| Smaller Second | $A_2', B_2', C_2', D_2', E_2', F_2', G_2', H_2', I_2', M_2'$ |
| Larger Third | $A_3, B_3, C_3, D_3, E_3, F_3, G_3, H_3, I_3, M_3$ |
| Smaller Third | $A_3', B_3', C_3', D_3', E_3', F_3', G_3', H_3', I_3', M_3'$ |
| Larger Fourth | $A_4, B_4, C_4, D_4, E_4, F_4, G_4, H_4, I_4, M_4$ |
| Smaller Fourth | $A_4', B_4', C_4', D_4', E_4', F_4', G_4', H_4', I_4', M_4'$ |

Such sets o f 90 coefficients are stored for each different asymmetry number in Type 4 diffraction patterns.

From the above, it will be appreciated that there are 48 coefficients stored for Type 1 diffraction patterns, 120 for Type 2 diffraction patterns, 224 for Type 3 diffraction patterns and 360 for Type 4 diffraction patterns.

All of these are precalculated and stored in memory 10 in the form of a look up table at the time of manufacture of the apparatus.

As indicated above, in calculating these coefficients, it is necessary to generate a large number of simulated surfaces, to calculate their Rq values and to calculate the diffraction pattern that each surface would produce at the CCD array (46). The manner in which these operations may be performed will now be described later in Appendix I with reference to FIGS. 38 and 39.

Appendix II which follows Appendix I sets out actual values for all of the above coefficients as derived for a prototype of the preferred embodiment.

GAUSSIAN ALGORITHM FOR DETERMINING Rq

Where the composite diffraction pattern obtained as described above has only a zero order the interpolation algorithm cannot be utilised. In these circumstances, the following formula is used for determining Rq:

$$Rq = \frac{\lambda}{4\pi} \sqrt{-\log_e(S_7)}$$

where $\lambda$=laser wavelength in nm=780

$S_7$=sum of the seven elements which make up the zero order in the normalised composite diffraction pattern The above formula can be used with a value for $S_7$ obtained from the composite diffraction pattern stored at Step 105. In this case the result obtained is likely to give an Rq value higher than the true value because of form error in the surface. To obtain a result in which the effect of such form error on the value of Rq obtained is reduced or eliminated is proposed in accordance with an important preferred feature of the invention to modify the diffraction pattern obtained at Step 105 by filtering operation. An appropriate filter may therefore be selected by the operator at Step 72 in FIG. 6. The selected filter may comprise either a Gaussian cut-off filter or a phase-corrected 2RC cut-off filter. Each filtering operation involves multiplying each value making up the composite diffraction pattern obtained at Step 105 by a member which varies with distance from the centre of the zero order.

The Gaussian cut-off filter function is:

$Filt = 1.0$ for $|k| \leq 3$ $$Filt = \left[ 1 - \exp\left[ -\log_e 2 \cdot \left( \frac{\lambda c \cdot k \cdot 2\sin\theta_{max}}{\lambda \cdot DPTS} \right)^2 \right] \right]^2$$ for $|k| > 3$ where $\lambda_c$=filter cut-off in um $\lambda$=laser wavelength in um =0.78 k=distance from centre of zero order in number of detector elements

DPTS=total number of CCD elements=2048

$\theta_{max}$ has the value explained with reference to FIG. 2 and in the preferred embodiment is 3.5 degrees.

It will be appreciated, utilising the above filter function, no changes made in the value of element centred at the zero order nor in the value of the three elements on either side thereof, since (as indicated in the formula ) for values , $|k| \leq 3$ the filter function is 1. The values of other elements however, i.e. elements where $|k|>3$ are modified by the computation shown. However, the filtering operation is followed by renormalisation. This involves, as previously described, dividing the energy value in each cell by the total energy value in all cells. When this step is performed, after applying the above Gaussian cut-off filter function there is an effective redistribution of the energy in the diffraction pattern. This arises because the application of the filter function reduces the values in the cells other than the seven which represent the zero order and the normalising operation which therefore causes the energy in the seven cells representing the zero order to constitute a greater portion of the total energy.

To illustrate this FIG. 40A shows diagrammatically at 520 the energy distribution at the CCD array which might arise in the central portion of an unfiltered diffraction pattern where there are low frequency components in the surface. Curve 522 which is superimposed on curve 520 is a plot of the filter function.

In FIG. 40B, 524 indicates diagrammatically the energy distribution after filtering and renormalising as just described. As can be seen the energy in the zero order in FIG. 40B is greater than that in FIG. 40A.

The Phase-Corrected 2RC cut-off filter function is:

$Filt = 1.0$ for $|k| \leq 3$ $$Filt = \left[ 1 + \frac{1}{3} \left( \frac{\lambda \cdot DPTS}{\lambda c \cdot k \cdot 2\sin\theta_{max}} \right)^2 \right]^{-2}$$ for $|k| > 3$ The symbols in this formula have the meanings given above. After application of the phase-corrected 2RC cut-off filter function, the diffraction pattern is renormalised and the results are similar to those obtained using the Gaussian cut-off function and as illustrated by curves 520 and 524 in FIGS. X and Y. It will be understood from the above that where a filter function is applied to the diffraction pattern the value of $S_7$ in the formula for calculating Rq given above is obtained from a diffraction pattern after application of the filter function and renormalisation.

Having now explained the Interpolation Algorithm and the Gaussian Algorithm, the remaining steps in the flow chart of FIG. 10, subsequent to decision 200, will now be described, these steps enabling Rq and other values to be calculated.

CALCULATION

As already stated, at Step 200 in FIG. 10 a decision is taken as to whether there is only one order. If here is only one order, the program moves to branch 202 in which the Gaussian algorithm will be utilised and if there is more than one order the program moves to branch 204 in which the interpolation algorithm will be utilised.

Gaussian Algorithm

Branch 202 comprises determining at Step 206 whether a cut-off filter has been selected. If so, the diffraction pattern is filtered at Step 208 using the appropriate filter function described above, and the program then proceeds to Step 210 at which the diffraction pattern is renormalised as described above. In Step 212, Rq is calculated utilising the Gaussian algorithm described above. At Step 214, a determination is again made as to whether a cut-off filter has been selected, and, if so, lamq and delq are calculated at Step 216. These are calculated as follows:

$$lam_q = \frac{\lambda \cdot DPTS}{2\sin(\theta_{max})} \cdot \sqrt{\left[ \frac{S}{S_w} \right]} \; um$$

where

S=sum of all elements of composite array except the seven in the zero order $S_w$ = sum of all the terms ($k^2$.element value) except for the seven elements in the zero order. (k as defined in connection with Gaussian algorithm)

$$del_q = \frac{2\pi \cdot Rq \cdot 2\sin(\theta_{max})}{\lambda \cdot DPTS} \cdot \sqrt{\left[\frac{S_w}{S}\right]} \text{ degrees}$$

Interpolation Algorithm

In branch 204, surface wavelength is calculated at Step 218 using the following formula:

$$\text{Surface wavelength, } \lambda_s = \frac{\lambda \cdot DPTS}{2\sin(\theta_{max})} \cdot \frac{1}{SPC}$$

SPC = average peak spacing

In this context, surface wavelength, $\lambda_s$, means the wavelength of periodic features of the surface such as produced by repeated passes over the surface of a cutting tool.

$\alpha$ for the composite diffraction pattern is calculated at Step 220 in the manner described above and quantised in the manner described above at Step 222 to obtain the asymmetry number.

At Step 224, a test is made to determine the difference between the energy in the zero orders in the normalised composite infra red diffraction pattern obtained at Step 106 and the red diffraction pattern obtained at Step 104 in FIG. 7, but after normalisation thereof (which normalisation of the red pattern has not previously taken place). Since the location of the zero order was obtained at Step 108 in FIG. 10, the energy in the zero order of the normalised red diffraction pattern can be obtained. Accordingly, in performing Step 224, the seven elements centred at the identified zero order position in the infra red and red diffraction patterns are respectively summed and then the difference between the two sums is obtained to provide a measure of the normalised energy difference in the two zero orders.

The reason for performing Step 224 is that the result of the test enables certain ambiguities which may arise in the results of the calculation utilising the interpolation algorithm to be resolved. This is because of the energy difference between the two zero orders is indicative of the range within which Rq falls. This can be understood by reference to FIG. 21 in which curve 221 is a plot of the energy difference in the zero orders of two calculated diffraction patterns derived from a theoretical surface of sinusoidal profile, such as surface 150 shown in FIG. 13. Curve 223 is a similar plot for a theoretical saw-tooth surface such as surface 152 of FIG. 14. The energy difference is obtained by subtracting the normalised energy of the zero order in the infra red pattern from that in the zero order of the red pattern. As can be seen, curve 221 shows that this energy difference is initially at a small negative value for low values of Rq, the magnitude of the negative value increases to a maximum at an Rq of around 60 nm, this being represented by a minimum point 225 in the curve 221, and thereafter the magnitude of the difference decreases and becomes zero at about Rq=95 nm The difference then increases in a positive sense to a maximum at about Rq=125 nm and thereafter begins to decrease.

FIG. 21 shows that curve 223 closely follows curve 221 for values of Rq up to about 80 nm and thereafter begins to diverge.

Step 224, therefore performs the following calculation $$Z = T_o\text{red} - T_o$$

where $T_o$ red = sum of the seven elements in the zero order of the normalised red diffraction pattern array $T_o$ = sum of the seven elements in the zero order of the normalised composite infra red diffraction pattern array (as previously defined)

Thereafter, determination is made as to whether Z has a value below or above a threshold selected as −0.05 and indicated by horizontal line 227 in FIG. 21. This threshold corresponds to an Rq value of approximately 88 nm. Although the curves 221 and 223 assume values above −0.05 in region 229 corresponding to low values of Rq below about 25 nm, such a low value of Rq would normally only occur with a single order diffraction pattern or a Type 1 diffraction pattern. In both these cases, the zero order test, Step 224, would not be used. This will be further explained later.

At Step 226, the orders in the composite diffraction pattern are rebuilt as discussed above. This involves accessing the appropriate sets of coefficients $A_0, B_0, \ldots A_1, B_1 \ldots$ etc. from the look up table described above and stored in memory 10, accessing of the table to obtain the required coefficients being by reference to the diffraction pattern Type and the asymmetry number as described above. Each order is then rebuilt individually utilising the coefficients obtained for that order, the normalised energies $T_0, T_1, T_1', T_2 \ldots$ etc and and low level diffracted energy N in the orders of the composite diffraction pattern and the polynomials 6A and 6B given above.

Of course, the number of terms of these polynomials which are used depends upon the diffraction pattern Type.

Thereafter, in Step 228, Rq is determined by comparing the rebuilt order energies $S_j, S_j$ obtained in Step 226 with reference values $V_j, V'_j$ obtained utilising the above interpolation formula and in a manner to be more fully described below.

At Step 230, determination is made as to whether a cut-off filter has been selected and, if so, this is applied at Step 232 to the value of Rq which has been obtained. As will already be clear, the operator may choose between phase-corrected 2RC and Gaussian filters and the application of the filter involves scaling the determined value of Rq by a filter factor to obtain a new value Rq':

$$Rq' = \text{Filter factor} \cdot Rq$$

The filter factor depends upon the selected cut-off wavelength c and the surface wavelength s which has been calculated above. Further the filter factor should ideally also depend upon the nature of the periodic component of the surface roughness and in particular the degree of asymmetry of the components. It will be well understood from the above detailed description of the Interpolation algorithm that the degree of asymmetry of the surface characteristics has been determined from the asymmetry in the resulting diffraction pattern and the quantity $\alpha$ has been calculated to represent this asymmetry. Accordingly, in accordance with an important preferred feature of this invention, the filtering factor used at Step 232 is calculated by the interpolation between values appropriate to a relatively symmetrical surface such as the sinusoidal surface 150 and values appropriate to a relatively asymmetrical surface such as the saw-tooth surface 152.

For the phase-corrected 2RC filter, the filtering factors $F_s$ and $F_a$ appropriate to the sinusoidal (symmetrical) and the saw-tooth (asymmetrical) surfaces are as follows:

$$F_s = \cfrac{1}{1 + \cfrac{1}{3}\left[\cfrac{\lambda_s}{\lambda_c}\right]^2}$$

$$F_a = \left[\frac{6}{\pi^2} \sum_{n=1}^{m} \frac{1}{n^2} \cdot \frac{1}{\left(1 + \frac{1}{3n^2}\left[\frac{\lambda_s}{\lambda_c}\right]^2\right)^2}\right]^{\frac{1}{2}}$$

For the Gaussian filter, the filtering factors $G_s$ and $G_a$ appropriate to the sinusoidal (symmetrical) and the sawtooth (asymmetrical) surfaces are:

$$G_s = 1 - \exp\left[-\log_e^2 \left(\frac{\lambda_c}{\lambda_s}\right)^2\right]$$

$$G_a = \left[\frac{6}{\pi^2} \sum_{n=1}^{m} \frac{1 - \exp\left(-\log_e^2 \cdot n^2 \left[\frac{\lambda_c}{\lambda_s}\right]^2\right)}{n^2}\right]^{\frac{1}{2}}$$

where $\lambda_s$=dominant surface wavelength (um)
$\lambda_c$=cut-off wavelength (um)
m=integer
n=integer In the above summations, m is constrained to a value at which the value of the summation term becomes negligible.

Thus, in obtaining the value of the filtering factor at Step 232 by interpolation dependent upon the asymmetry at the surface characteristics, the following interpolations are performed:

Phase-corrected 2RC:

Filter factor=$(1-\alpha).F_s+\alpha.F_a$

Gaussian:

Filter factor=$(1-\alpha).G_s+\alpha.G_a$

Preferably the terms $F_a$ and $G_a$ are pre-calculated for for a range of values for the ratio $(\lambda_s,\lambda_c)$ and stored in a look up table. Since it is unlikely that when making a real measurement, the value of the ratio $(\lambda_s,\lambda_c)$ will correspond precisely to a value of this ratio for which the terms $S_a$ and $G_a$ have been precalculated and stored in the look-up table, the software is arranged to interpolate between the stored values of $F_a$ (or $G_a$ as the case may be) utilising the value of c selected by the operator and the value of $\lambda_s$ obtained at Step 218. This may be a linear interpolation.

Performing Interpolation Algorithm

FIGS. 22B and 22C, and 22D collectively FIG. 22, show 22 shows in more detail the way in which the interpolation algorithm of Step 226 in FIG. 10 is performed for the determination of Rq.

A set of reference values is generated for each unit value of Rq between Rq=0 and Rq=200 nm. At Step 240 a counter for recording the value of Rq for which the reference values are being computed is first set to zero. At Step 242, the set of reference values for the Rq value stored in the Rq counter is generated utilising the interpolation formula:

Ref Value $V_j(Rq)=\alpha E_{aj}(Rq)+(1-\alpha)E_{sj}(Rq)$

A ref value $V_j(Rq)$ is calculated for each order in the diffraction pattern.

The symbols in these equations have the values previously explained.

In practice, it is preferable that the terms should be precalculated for all unit values of Rq between Rq=0 and Rq=200 nm and for all orders. Thus, performance of the calculation would then simply involve accessing this lookup table to obtain the appropriate values for these two functions and to perform the interpolation between the two values utilising $\alpha$ and the interpolation formula.

This calculation is performed for each order in the diffraction pattern to obtain a set of reference values as follows:

$V_0$–Ref Value for Zero Order
$V_1$–Ref Value for Positive First Order
$V_1'$–Ref Value for Negative First Order
$V_2$–Ref Value for Positive Second Order
$V_2'$–Ref Value for Negative Second Order
$V_3$–Ref Value for Positive Third Order
$V_3'$–Ref Value for Negative Third Order
$V_4$–Ref Value for Positive Fourth Order
$V_4'$–Ref Value for Negative Fourth Order It will be apparent that in each order pair, the reference value for the positive order is larger than the reference value for the negative order for all non-zero values of $\alpha$.

The number of reference values obtained will depend upon composite diffraction pattern Type.

At Step 244 the reference values obtained at Step 242 are compared with the rebuilt order energies $S_0$, $S_1$, $S_1'$ ... etc obtained at Step 226 in FIG. 120 by making the following calculation:

$$\begin{aligned}M = &\ (S_0-V_0)^2 + (S_1-V_1)^2 + (S_1'-V_1')^2 + (S_2-V_2)^2 +\\ &\ (S_2'-V_2')^2 + (S_3-V_3)^2 + (S_3'-V_3')^2 +\\ &\ (S_4-V_4)^2 + (S_4'-V_4')^2\end{aligned}$$

Of course, the number of terms of the above equation which are used depends upon the diffraction pattern Type. The quantity M is herein called the "merit" function since it quantifies the similarities for a given Rq value, between the reference values and the rebuilt order energy values obtained at Step 226 of FIG. 10. The value M together with its corresponding Rq value is stored. Step 248 will be explained below and, after Step 248, determination is made in Step 250 as to whether the value of the Rq counter is equal to 200. If not, the Rq counter is incremented by at Step 252 and the program loops back to Step 242.

Thus, as Steps 242, 244 and 246 are repeated for successive values of Rq, memory 10 contains as a result of Step 246 a set of values for M each being stored together with its corresponding value of Rq. This may be regarded as a plot of M against Rq. Step 248 involves, each time a new value of M is determined, checking whether this indicates that there is a local minimum in the plot of M against Rq. Whenever such a minimum is detected, the location thereof is stored since such a minimum may indicate a close or "best" match between the rebuilt order energies obtained at Step 226 and the corresponding reference values and thus the value of Rq at which such a minimum occurs is a possible true value of Rq for the surface under test.

When decision 250 indicates that all unit values of Rq from Rq=0 to Rq=200 nm have been dealt with by Steps 242 to 248, the program proceeds to determine Rq utilising function M. Before this part of the program is described however reference will be made to FIGS. 23 to 30 which illustrate some results obtained from a computer simulation of the preferred embodiment utilising simulated surfaces obtained in the manner previously described.

Diagram A of FIG. 23 is a trace, of a simulated surface and diagram B illustrates graphically a simulated infra-red diffraction pattern derived therefrom As can be seen from diagram B, the diffraction pattern is of Type 1. Diagram C illustrates the diffraction pattern after it has undergone its order energy rebuild utilising polynomials 6A and 6B in accordance with Step 226 of FIG. 10. Diagram D is a plot of M against Rq as obtained at Step 246 of FIG. 22.

Diagrams A to D of FIG. 24 correspond to those of FIG. 23 but for a different simulated surface. Although diagram B of FIG. 24 indicates a number of orders, only the positive first order is actually greater than the 10% of the zero order. This diffraction pattern is therefore of Type 1.

FIG. 25 is again similar, but this time for a simulated surface producing a diffraction pattern of Type 2.

FIGS. 26 and 27 are again similar to FIGS. 23 to 25 but correspond to two simulated surfaces producing diffraction patterns of Type 3.

FIGS. 28 and 29 are again similar, but relate to two simulated surfaces producing diffraction patterns of Type 4.

Figure 30:
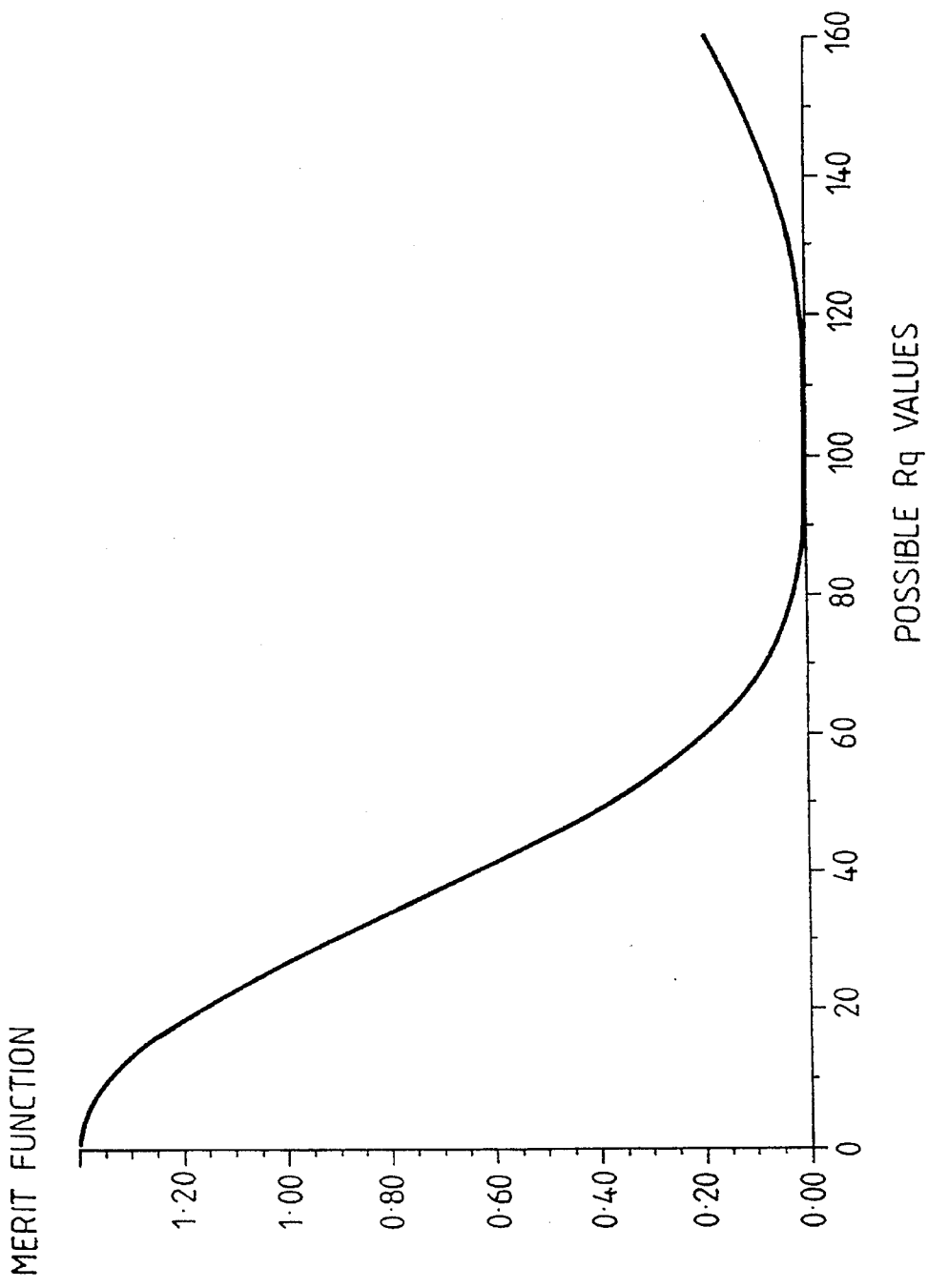

FIG. 30 shows just function M obtained from yet a further simulated surface.

From each of FIGS. 23D, 24D, 25D, 26D, 27D, 28D, 29D and 30 it will be clear that the plot of function M against Rq will, in practice, have a variety of shapes. The processing which takes place subsequent to decision 250 takes this into account so that Rq may be reliably determined for a variety of different surfaces.

When decision 250 indicates completion of performance of Steps 242 to 248 for all unit values of Rq between 0 and 200 nm, the program moves to Step 256. At this step it is determined if the composite diffraction pattern is of Type 1, and there is at least one minimum in the merit function. If the result of this decision is YES, the program moves to Step 258 at which the computer treats that value of Rq which gives the smallest value of M in the plot of M against Rq as the true Rq for the surface under test. In other words, the Rq of the surface under test is regarded as that which gives the "best fit" in the comparison of the values $S_0$, $S_1$ and $S_1'$ obtained at Step 226 with the values $V_0, V_1$ and $V_1'$ obtained during the repeated performance of Step 242.

If decison 256 results in NO, meaning that the composite diffraction pattern is not of Type 1, that is to say it must be of Type 2, Type 3 or Type 4, and/or that there is no minimum in the merit function, the program branches to decision 260. This decision checks from the data obtained at Step 248 whether the number of possible values of Rq i.e. the number of minima in the plot of M against Rq, is equal to 1. If decision 260 reveals that there is only one possible value of Rq, the program moves to decision 262 to determine whether function M has a "flat bottom" portion, such as, for example, shown in FIG. 30 between the Rq values from about 85 nm to about 115 nm. The merit function is defined as having a flat bottom if consecutive values of M vary by less than 0.001 over an Rq range of at least 30 nm.

If such a flat bottom is found, the programme moves to Step 263 at which it is determined if the minimum in the curve of M against Rq is in the Rq range 70 nm to 120 nm. If it is not, then an error code is generated at Step 265. If the minimum is within this range, the programme moves to Step 264 and calculates Rq with the assistance of the following expression:

$$Rq = 100.82 + 253.0 * Z$$

where Z is the value obtained in the zero order test of Step 224 in FIG. 10.

The derivation of this expression is explained with reference to FIG. 22A which shows the results of the zero order tests for a large number of simulated surfaces. As can be seen the large number of points 530 obtained are distributed roughly in accordance with the curve shown in FIG. 21 between values of Rq=70 nm and Rq=120 nm roughly follow straight line 532. Utilising a "least mean squares" method, the linear expression Rq=100.8+253.0 * Z is derived.

If decision 262 indicates that there is no flat bottom portion in the merit function, the program moves to decision 268 at which a decision is taken as to whether the single possible Rq value which has been disclosed by the previous decisions and processing is in agreement with the zero order test of Step 224. It will be recalled from the discussion of FIG. 21 that the zero order test discloses information as to the likely range within which Rq will fall, in particular whether it is above or below a value of 88 nm. If decision 268 reveals that the single possible value of Rq agrees with the zero order test, this value is stored at Step 270 as the actual value of Rq for the surface under test.

If decision 268 indicates that the single possible value of Rq determined by the earlier steps in the program does not agree with the zero order test carried out at Stem 224, that is to say the single value of Rq determined in the program illustrated in FIG. 22 is less than 88 nm whereas the zero order test indicates that it should be greater than 88 nm, or vice versa , the program moves to Step 272 at which the merit function M against Rq is differentiated and the first derivative thereby obtained is stored. The purpose of this step is to identify any points of inflection, since at such points there will be a maximum or minimum in the first derivative of the curve.

FIG. 31 illustrates diagrammatically an example of a merit function having a point of inflection 274 in a portion of the curve where the slope is negative and has superimposed thereon in broken lines a curve 276 indicating the shape of the first derivative in the region of point 274. The small axes 278 represents the co-ordinate axes for the curve 276 and as can be seen, curve 276 has a value close to zero at point 274 and negative values at either side thereof. Thus, the first derivative of the merit function shown in FIG. 31 shows a maximum corresponding with the point of inflection 274.

FIG. 32 shows diagrammatically another example of a merit function having a point of inflection but, in this example, the point of inflection 280 is in a portion of the curve where the slope is positive. Superimposed on FIG. 32 is a broken line curve 282, drawn on co-ordinate axes 284, and representing the first derivative of the merit function shown in FIG. 32. As can be seen, curve 282 includes a minimum at a point corresponding to the point of inflection 280. The maximum in curve 276 in FIG. 31 and the minimum in curve 282 in FIG. 32 will, of course, only equal zero where the slope of the corresponding merit function M is zero at the point of inflection. Nevertheless, other points of inflection will still produce a maximum or minimum in the first derivative of the merit function.

It will be seen from consideration of FIGS. 23 to 30, all of which illustrate merit functions obtained from simulated surfaces, that the merit function in general begins at a high value for zero and low values of Rq and then decreases as Rq increases. At some point, the merit function will reach a minimum and thereafter increase in value as Rq increases further. It has been found in experiment with a prototype of the preferred embodiment and in computer simulation such a prototype that most surfaces produce merit functions of this general shape. It is therefore considered that if the zero order test of Step 224 in FIG. 10 indicates a relatively low value of Rq, i.e. Rq less than 88 nm, and no merit function minimum has been found in this range of Rq then a point of inflection, of the type shown in FIG. 31, in the merit function in which the slope is negative, is likely to correspond to the correct Rq value, provided that the point of inflection is in a portion of the merit function where the slope is negative and that portion corresponds to a range of Rq values less than 88 nm as in FIG. 31.

Similarly, it is considered that if the zero order test indicates that Rq is at a high value i.e. Rq greater than 88 nm, and no merit function minimum has been found in this range of Rq then a point of inflection in a portion of the merit function where the slope is positive, is likely to represent the correct value of Rq, provided that the relevant portion of the merit function does correspond to a range of Rq values greater than 88 nm.

Accordingly, after generation of the first derivative of the merit function in Step 272, a decision is taken at Step 286 as to whether the zero order test of Step 224 indicates Rq greater than 88 nm. If the answer to decision 286 is YES, the program proceeds to Step 288 in which the first derivative of the merit function for values of Rq greater than 88 nm is examined with a view to locating a minimum such as the minimum 282 shown in FIG. 32 where the minimum has a value greater than or equal to zero. This indicates a point of inflection in a portion of the merit function having a positive slope. If such a minimum is located, the corresponding Rq value is stored.

If decision 286 discloses that the zero order test did not indicate Rq greater than 88 nm, the program moves to Step 290, instead of Step 288 and in Step 290 the first derivative of the merit function for Rq values less than 88 nm is examined with a view to locating a maximum such as the maximum 276 indicated in FIG. 31. Where the maximum has a value less than or equal to zero. This indicates a point of inflection and a portion of the merit function having a negative slope. If such a maximum is located, the corresponding Rq value is stored.

After Step 288 or 290, as the case may be, the program moves to decision 292 in which a decision is taken as to whether a minimum was found in Step 288 or a maximum found in Step 290. If the result of decision 292 is YES, the value of Rq which was stored at decision 288 or 290 as the case may be is taken as the correct value of Rq for the surface under test and stored at Step 294.

If decision 292 indicates that a maximum or minimum was not found in Step 288 or 290 as the case may be, the program generates an error code at Step 296 indicating that Rq cannot be calculated.

It is now necessary to return to decision 260 in FIG. 22 and to describe the routine which is followed if this results in a NO rather than a YES (the latter having already been described).

If decision 260 results in a NO, decision 298 determines whether the number of possible Rq values (i.e. the number of minima in the merit function) is greater than 1. If decision 298 results in a NO, this means that there are no possible values of Rq (no minima in the merit function) and an error code is generated at Step 299 to indicate that Rq cannot be calculated.

If decision 298 results in a YES the routine illustrated in the flow chart of FIG. 33 is entered to resolve, if possible, the ambiguity in Rq values.

When the routine illustrated in FIG. 33A and 33B, collectively FIG. 33 is entered, a decision is taken at Step 300 as to whether the smallest possible Rq value is less than or equal to 25 run. This decision is inserted on the basis of simulation experience in accordance with the preferred embodiment of the invention, such experience showing that with Type 2, 3 and 4 diffraction patterns derived from simulated surfaces, the smallest of several possible Rq values is likely to be the correct one if that smallest value is less than or equal to 25 nm. Accordingly, if the result of decision 300 is YES, the program proceeds to Step 302 at which the smallest of the possible Rq values is stored as the correct Rq value for the surface under test. In fact, surfaces in which this condition arise are unusual since, normally, a surface with an Rq value of less than 25 nm would produce either a composite diffraction pattern having only a zero order, in which case the Gaussian Algorithm would be utilised, or a composite diffraction pattern of Type 1 in which case the routine of FIG. 33 would not be entered.

If decision 300 results in a NO, the program proceeds to decision 304 in which the result of the zero order test 224 of FIG. 10 is examined to determine whether this indicates an Rq value near 88 nm. In other words, decision 304 determines whether the value Z is in the region of $-0.05$.

If the answer to decision 304 is YES, the program proceeds to Step 306 in which that value of Rq closest to 88 nm is taken as the correct Rq value and is output as the Rq value of the surface under test.

If decision 304 results in a NO, the program proceeds to Step 308 in which the number of Rq values which are in agreement with the results of the zero order test 224 are counted. That is to say, if the zero order test indicates that Rq is greater than 88 nm, the number of possible Rq values which have been identified in Steps 242 to 248 and which have a value greater than 88 nm is counted whereas if the result of the zero order test indicates that Rq is less than 88 nm, the number of possible Rq values less than 88 nm, resulting from Steps 242 to 248 is counted.

At Step 310, determination is made as to whether the number of Rq values identified in Step 308 as possibly valid is equal to 1. If the answer to decision 310 is YES, the single Rq value which has been identified is regarded as the correct Rq value for the surface under test and this is stored as the correct value at Step 312.

If the result of decision 310 is NO, a decision is taken an Step 314 as to whether the number of Rq values identified at Step 308 is greater than zero. If the result of this decision is NO, this indicates that zero order test 224 has indicated an Rq value greater than 88 nm but Steps 242 to 24E-have disclosed a number of possible Rq values less than 88 nm, or vice versa. In these circumstances, that value of Rq which is closest to 88 nm is taken as the correct one. This is implemented by decision 316 and Steps 318 and 320. Decision 316 determines whether the zero order test indicates an Rq value of less than 88 nm and, if so, the smallest of the possible Rq values is selected at Step 318 and stored as the correct Rq value for the surface under test. If decision 316 results in NO, meaning that the zero order test 224 indicates that the Rq value is greater than 88 nm, the largest of the possible Rq values is selected at Step 320 and stored as the correct Rq value for the surface under test.

If decision 314 results in YES, indicating that there are several possible Rq values counted at Step 308 and in agreement with the zero order test 224, the program moves to decision 322 at which the result of the zero order test 224 is examined and it is determined whether Z indicates a value of Rq which is greater than but near to 88 nm, e.g. $-0.05<Z<0$. If the decision 322 results in a YES, the smallest of the several possible Rq values is taken at Step 324 since this is the value closest to 88 nm, and this value is stored as the correct Rq value of the surface under test.

If decision 322 results in a NO, a decision is taken at Step 326 as to whether the result of the zero order test indicates that Rq is very much greater than 88, i.e. Z has a value substantially more than −0.05, e.g. Z>0. If decision 326 results in a YES, the program proceeds to Step 328 at which the largest of the possible values of Rq is taken, this being furthest from the value 88 nm. This value is then stored as the correct value of Rq for the surface under test.

If decision 326 results in a NO, the program proceeds to Step 330 at which it is determined whether the value of Z obtained in the zero order test 224 indicates both that Rq is less than 88 nm and is close to 88 nm, e.g. −0.075<Z<−0.05.

If the result of decision 330 is YES, the largest of the possible Rq values is taken at Step 332, this being the one closest to 88 nm and this is stored as the correct value of Rq for the surface under test.

If decision 330 results in a NO, the program proceeds to decision 334 at which it is determined whether the value of Z obtained in the zero order test indicates that Rq is very much less than 88 nm, i.e. ZT has a value substantially less than −0.05, e.g. Z<−0.075. If the result of decision 334 is YES, the smallest of the possible Rq values is taken at Step 336 and is stored as the correct value of Rq for the surface under test.

If decision 334 results in a NO, 88 nm, Rq cannot be calculated and an error code is generated at Step 338.

SUMMARY OF CALCULATION OF Rq

From the above description it will be appreciated that following the derivation of the normalised diffraction pattern and the counting of the number of orders therein, calculation of Rq is performed utilising the above described Gaussian Algorithm if there is only one order or the above described Interpolation Algorithm if there is more than one order.

The Interpolation Algorithm involves:

1. Determination of the asymmetry in the energy distribution in the composite diffraction pattern (determination of $\alpha$ and the asymmetry number).
2. Determination of the difference in energy between the zero orders in the red and infra red diffraction patterns (the value Z).
3. Rebuilding of the energy distribution within the orders in the composite diffraction pattern utilising polynomials whose coefficients are stored in a look-up table to obtain new values for the orders $S_0, S_1, S_1'$ etc, the coefficients selected being dependent upon the asymmetry number and diffraction pattern Type which is dependent upon the number of orders in the diffraction pattern.
4. Generation of a set of reference values $V_0, V_1, V_1'$ etc for each value of Rq between Rq=0 and Rq=200 mm utilising the linear interpolation formula.
5. Generation of the merit function by comparison of the modified order structure $S_0, S_1, S_1'$ etc with the reference values $V_0, V_1, V_1'$, etc.
6. Identification of minima in the merit function and the storage, as possible Rq values of the surface under test, of those Rq values which correspond to the minima.

Having completed the above steps, the processing which takes place as illustrated in the flow charts of FIGS. 22 and 33 may be summarised as follows:

1. If the diffraction pattern has only zero and one or both first orders (Type 1) the Rq value corresponding to the smallest minimum value identified in the merit function is taken as the correct one, i.e. the best fit Rq value.

2. If at least a second, third or fourth order is present (Type 2, 3 or 4 diffraction patterns) and there is only one possible value of Rq:
   a) That value is taken as the correct value provided it agrees with the result of the zero order test and that it is not a value corresponding to a portion of the merit function having a flat bottom.
   b) If this one value does not agree with the zero order test, the merit function is differentiated to locate a point of inflection in the merit function. If such a point of inflection is located, the corresponding Rq value is taken as the correct value if that corresponding value agrees with the zero order test, subject to the conditions described above.
   c) If the single possible Rq value identified as a minimum in the merit function is within the range 70 to 120 nm and is in a portion of that function having a flat bottom, a calculation is performed to obtain Rq within that flat portion.

3. If several minima are present in the merit function, indicating several possible values of Rq, the routine shown in FIG. 33 is utilised and:
   a) If the smallest of the possible Rq values is less than or equal to 25 nm, this is taken as the correct value.
   b) If the value of Z obtained in the zero order test indicates that Rq is near 88 nm, that value of Rq which is closest to 88 nm is taken as the correct value.
   c) If the value of Z does not suggest that Rq is close to 88 nm, the number of possible values of Rq which are in agreement with the zero order test is determined. If there is only one, this is taken as the correct value.
   d) If there are several possible values of Rq which agree with the zero order test, the one closest to 88 nm is taken as the correct value if the zero order test indicates that Rq is close to 88 nm and the one furthest from 88 nm is taken as the correct one if the zero order test indicates that the correct value of Rq is remote from 88 nm.
   e) If there are a number of possible values of Rq none of which agree with the zero order test, then that which is closest to 88 nm is taken as the correct one.
   f) If none of the above conditions hold, an error code is generated.

RESULTS

Some of the results obtained by computer simulation of the prototype of the preferred embodiment with simulated surfaces are illustrated in FIGS. 23 to 29.

In FIG. 23, the merit function has a single minimum indicating an Rq value of 41 nm. The Rq value of the surface utilised in FIG. 23 when calculated from the simulated profile was 39 nm.

In FIG. 24, the merit function has two minima, one at 49 nm and the other at about 135 nm. However, the diffraction pattern is of Type 1 and accordingly decision 256 in the routine shown in FIG. 22 will cause the "best fit" Rq value to be selected, i.e. the minimum which represents the lowest value of the merit function. This is the Rq value of 49 nm. Calculation of the Rq value from the surface profile gave a value of 48.6 nm.

In FIG. 25, the merit function has a single minimum at 58 nm. The surface gives a diffraction pattern of Type 2 and the minimum in the merit function does not have a flat bottom.

Accordingly decisions 256, 260, 262, 268 and Step 270 in the routine in FIG. 22 cause this value of Rq to be selected. The value of Rq calculated from the surface profile was at 54.1 nm.

In FIG. 26, the merit function again has a single minimum. The diffraction pattern is of Type 3 and again decisions 256, 260, 262, 268 and Step 270 cause the single minimum to be selected as indicating the value of Rq. This was 74 nm compared to a value of 75.6 nm calculated from the surface profile.

In FIG. 27, the merit function has two minima, one at an Rq value of 59 nm and the other at an Rq value of about 130 nm. The value Z determined in the zero order test was found to be −0.104 which implies an Rq value of less than 88 nm. Accordingly, the value of 59 nm was selected to be the correct value for Rq by decision 298 in FIG. 22 and decisions 300, 304, Step 308, decision 310 and Step 312 in FIG. 33. The value of Rq calculated from the surface profile was 56.9 nm.

FIG. 28 again shows a surface which produces a merit function having two minima, one at an Rq value of 77 nm and the other at a value of about 120 nm. The zero order test indicated a value of Z as −0.07 which implies a value of Rq less than 88 nm. The value of Rq was therefore selected as 77 nm with the decisions and steps described in the preceding paragraph. Calculation of Rq from the surface profile gave a value of 79.9 nm.

FIG. 29 shows a merit function having a single minimum at an Rq value of 77 nm. This is derived from a Type 4 diffraction pattern and accordingly decisions 256, 260, 262, 268 and Step 270 in FIG. 22 indicated that the value of Rq=77 nm was correct. Calculation of Rq from the surface profile gave a value of 75.5 nm.

Good agreement with the above variety of surfaces was therefore obtained.

MODIFICATIONS

Various modifications are possible within the scope of the invention. A number of examples will be described.

Although in the preferred embodiment which has been described with reference to FIGS. 1 to 33, the reference values $V_0$, $V_1$, $V_1'$ etc have been obtained by interpolation between the functions $E_{sj}(Rq)$ shown in FIG. 13 and functions $E_{aj}(Rq)$ shown in FIG. 14, interpolation between other functions could be employed. For example, instead of the functions $E_{sj}'(Rq)$ functions as illustrated in FIG. 34 could be used. These are derived from a theoretical surface having a triangular profile as indicated at 400 in FIG. 34. Such a surface is symmetrical, as is a sinusoidal surface which gives rise to the Bessel functions $E_{sj}(Rq)$ and accordingly the diffraction pattern produced by such a surface will be symmetrical. Thus, curve A in FIG. 34 represents the variation in the energy in the zero order with variation in Rq, and curves B, C, D and E represent respectively the energy in each of the, first, second, third and fourth orders. These curves have the function $$E_{sj}'(Rq) = \left[ \frac{1}{1000} \cdot \sum_{m=0}^{1000-1} \cos\left(\frac{\pi j \cdot m}{1000}\right) \cos\left[ \frac{8\sqrt{3}}{\lambda} \pi Rq \left(\frac{1000-m}{1000}\right) \right] \right]^2 + \left[ \frac{1}{1000} \cdot \sum_{m=0}^{1000-1} \cos\left(\frac{\pi j \cdot m}{1000}\right) \sin\left[ \frac{8\sqrt{3}}{\lambda} \pi Rq \left(\frac{1000-m}{1000}\right) \right] \right]^2$$

A further possibility would be to replace the $E''_{sj}(Rq)$ functions by functions as shown in FIG. 36 representing the variations in energy distribution in a diffraction pattern derived from a theoretical surface having a cusp like profile 404 as shown in FIG. 36. Such profile, again, is symmetrical, and thus the energy distribution is symmetrical in the diffraction pattern produced. Again, curves A, B, C, D and E represent the energy in the zero, first, second, third and fourth orders in the diffraction pattern produced from such a theoretical surface, as a function of variation in Rq. Such curves are of the following function:

$$E''_{sj}(Rq) = \frac{1}{2000} \left[ \sum_{m=0}^{2000-1} \cos\left( \pi \left( \frac{6\sqrt{5} Rq}{\lambda} \cdot \left[ \frac{m-1000}{1000} \right]^2 - j\left[ \frac{m-1000}{1000} \right] \right) \right) \right]^2 + \left[ \frac{1}{2000} \sum_{m=0}^{2000-1} \sin\left( \pi \left( \frac{6\sqrt{5} Rq}{\lambda} \cdot \left[ \frac{m-1000}{1000} \right]^2 - j\left[ \frac{m-1000}{1000} \right] \right) \right) \right]^2$$

As a further alternative the functions $E_{sj}(Rq)$ could be replaced with functions obtained by combining the functions $E_{sj}(Rq)$ representing a sinusoidal surface and $E''_{sj}(Rq)$ representing a cusp-like surface. This would involve replacing the function $E_{sj}(Rq)$ in the above mentioned detailed description of the interpolation algorithm by the function:

$$E'''_{sj}(Rq) = \beta.E_{sj}(Rq) + (1-\beta). E''_{sj}(Rq)$$

where β is chosen to have a particular value between zero and one, thereby determining the proportion of the sinusoidal and cusp-like functions taken in the combination. Although the inventors have not tested this combined function at the time of filing this application, would be more representative of real surfaces produced by certain machining operations, for example, diamond turning.

It is preferred that the zero order test be performed in all cases. The dotted curve 406 in FIG. 2 indicates that this test remains valid for theoretical surfaces of a cusp like profile as illustrated in FIG. 36 and curve 223 is applicable both to saw-tooth surface (which are asymmetrical) and to triangular profile surface (which are symmetrical) as indicated at 400 in FIG. 34.

The preferred embodiment described in detail with reference to FIGS. 1 to 33 provides an instrument capable of measuring a wide range of Rq values for a wide range of surfaces. Where an instrument of more limited utility is required, considerable simplification is possible. For example, if it were only desired to test surfaces which produce a diffraction pattern of Type 1, such as for specific quality control of a specific product, the zero order test could be omitted and the whole of the programming following the NO result from decision 256 in FIG. 22 could be omitted.

Although in the preferred embodiment, Step 226 is included to rebuild the energy values $T_0$, $T_1$, $T_1'$ etc in the composite diffraction pattern to obtain values $S_0$, $S_1$, $S_1'$, etc which can be compared with the reference values $V_0$, $V_1$, $V_1'$, etc obtained by interpolation, it would, instead, be possible to modify the values $V_0$, $V_1$, $V_1'$, by appropriate polynomials so as to make it possible to compare the modified reference values directly with the energy values $T_0$, $T_1$, $T_1'$, obtained from the composite diffraction pattern.

Although it is preferred, as has been described, to produce a composite diffraction pattern from diffraction patterns obtained at different energy values for the laser light, this is not essential. However, improved results are obtained by use of the composite diffraction pattern.

Further, where it is not required to measure low values of Rq, the programming whereby Rq is calculated utilising the Gaussian Algorithm could be omitted.

Although the Interpolation Algorithm has been found extremely valuable and accurate in obtaining a wide range of value of Rq, alternatives to this are possible, for example, where the instrument is only required for measuring surface roughness of surfaces having a substantially symmetrical periodic profile, Rq could be determined by generating sets of reference values utilising one of the symmetrical functions $E_{sj}(Rq)$, $E'_{sj}(Rq)$ $E''_{sj}(Rq)$ or $E'''_{sj}(Rq)$ and comparing the energies in the orders of the detected diffraction pattern with these reference values after rebuilding the order energies utilising polynomials derived in a manner similar to that described above with reference to the interpolation algorithm.

An example of a further alternative to the interpolation algorithm would be to calculate Rq utilising polynomials in which a number of terms are added, the terms comprising functions of the energy in the different orders of the diffraction pattern and coefficients obtained from a large body of data related to a large number of simulated and/or real surfaces. Preferably, such polynomials would utilise the energies in both the infra-red and red diffraction patterns, preferably after the formation of the composite infra-red diffraction pattern as described and the formation, in a similar manner, of a composite red diffraction pattern. Examples of polynomials for this purpose are:

For Type 1 diffraction pattern:

$$Rq = c0 + c1 \cdot t_0 + c2 \cdot T_0 + c3 \cdot t_0^2 + c4 \cdot T_0^2 + c5 \cdot t_0 \cdot T_0 +$$
$$c6 \cdot t_{-1} + c7 \cdot T_{-1} + c8 \cdot t_{+1} + c9 \cdot T_{+1} +$$
$$c10 \cdot t_{-1}^2 + c11 \cdot T_{-1}^2 + c12 \cdot t_{+1}^2 + c13 \cdot T_{+1}^2 + c14 \cdot N$$

For Type 2 diffraction pattern:

$$Rq = c0 + c1 \cdot t_0 + c2 \cdot T_0 + c3 \cdot t_0^2 + c4 \cdot T_0^2 + c5 \cdot t_0 \cdot T_0 +$$
$$c6 \cdot t_{-1} + c7 \cdot T_{-1} + c8 \cdot t_{+1} + c9 \cdot T_{+1} +$$
$$c10 \cdot t_{-1}^2 + c11 \cdot T_{-1}^2 + c12 \cdot t_{+1}^2 + c13 \cdot T_{+1}^2 +$$
$$c14 \cdot t_{-2} + c15 \cdot T_{-2} + c16 \cdot t_{+2} + c17 \cdot T_{+2} +$$
$$c18 \cdot t_{-2}^2 + c19 \cdot T_{-2}^2 + c20 \cdot t_{+2}^2 + c21 \cdot T_{+2}^2 + c22 \cdot N$$

For Type 3 diffraction pattern:

$$Rq = c0 + c1 \cdot t_0 + c2 \cdot T_0 + c3 \cdot t_0^2 + c4 \cdot T_0^2 + c5 \cdot t_0 \cdot T_0 +$$
$$c6 \cdot t_{-1} + c7 \cdot T_{-1} + c8 \cdot t_{+1} + c9 \cdot T_{+1} +$$
$$c10 \cdot t_{-1}^2 + c11 \cdot T_{-1}^2 + c12 \cdot t_{+1}^2 + c13 \cdot T_{+1}^2 +$$
$$c14 \cdot t_{-2} + c15 \cdot T_{-2} + c16 \cdot t_{+2} + c17 \cdot T_{+2} +$$
$$c18 \cdot t_{-2}^2 + c19 \cdot T_{-2}^2 + c20 \cdot t_{+2}^2 + c21 \cdot T_{+2}^2 +$$
$$c22 \cdot t_{-3} + c23 \cdot T_{-3} + c24 \cdot t_{+3} + c25 \cdot T_{+3} + c26 \cdot N$$

For Type 4, Rq is expressed by a polynomial of the same form as for Type 3 (i.e. the same terms but with different coefficients).

In these polynomials, $T_0$, $T_{+1}$, $T_{-1}$, etc. are the energies in the different orders of the composite infra-red diffraction pattern (with the suffix indicating the order) and $t_0$, $t_{+1}$, $t_{-1}$ etc. are the energies in the different orders of the composite diffraction pattern obtained from the red laser (with the suffixes again indicating the order). The coefficients $c_0$, $c_1$, $c_2$ etc. are obtained by simulating a large number of surfaces, calculating the Rq values thereof from their profiles, calculating the red and infra-red diffraction patterns which would be produced thereby and then obtaining the coefficients by a "least mean squares method". Although in the above polynomials, the same symbols $c_0$, $c_1$ etc have been used for the coefficients in the polynomials for the different types of diffraction pattern, this does not indicate that those coefficients will have the same values as each other. They will of course have different values.

In applying these polynomials, the "Type+ of diffraction pattern is determined by the "Type+ of the infra-red diffraction pattern regardless of the "Type+ of the corresponding red diffraction pattern.

The Rq value which is obtained by these polynomials is the value corresponding to the infra-red light. That is to say, the wavelength of the light used for producing the diffraction pattern affects the Rq value obtained since this wavelength affects the bandwidth of the system and this is true of all algorithms described herein.

It is considered that calculation of Rq utilising polynomials as above may be useful in many circumstances but the results are highly dependent upon the data base used for obtaining the coefficients. It is considered that a very large data base should be generated for this purpose, comprising both a large number of simulated surfaces and a large number of real surfaces in order to ensure that the polynomials will provide an accurate value of Rq in most real situations. The interpolation algorithm is less dependent on the data base and, as has already been described, the derivation of coefficients for polynomials for rebuilding the energy orders in the interpolation algorithm from a data base of only about 2000 simulated surfaces has been found to be adequate.

It should be clearly understood that the above quoted polynomials for calculating Rq are merely by way of example and polynomials of many different forms could be utilised.

The zero order test described herein is particularly useful in combination with the interpolation algorithm. However, this test has wide utility for providing an indication of the range within which Rq falls and the use of this test is not restricted to the interpolation algorithm.

Further, the concept of determining which algorithm should be used for calculating Rq dependent upon the number of orders in the diffraction pattern produced has wide application and thus it is not restricted to use with the interpolation algorithm or the Gaussian Algorithm. It will be already apparent that this test is used in determining which of the above polynomials for calculating Rq should be selected (where these polynomials are used in place of the interpolation algorithm) since different polynomials are used for diffraction patterns of different Type.

Although the Interpolation Algorithm preferably utilises the linear interpolation formula, this is not essential. Other means of obtaining reference values intermediate to those derived from a relatively symmetrical and a relatively asymmetrical surface could be used.

The preferred embodiment employs a means for detecting the zero order in a diffraction pattern by producing two patterns from light of different wavelengths. This has wide application and is not restricted to use in combination with the Gaussian and/or Interpolation Algorithms. This may be used in any apparatus or method in which it is desired to detect the zero order of a diffraction pattern whether for measuring surface roughness or whether for other purposes.

Although the preferred embodiment utilises two lasers for producing the light of different wavelengths, this is not essential, a single wider band source could be utilised with appropriate filters for passing light of the required different wavelengths.

Although in the preferred embodiment the location of the zero order has been determined utilising diffraction patterns from two sources (the red and infra-red lasers) which produce substantially monochromatic light, it would be possible to detect the location of the zero order in a diffraction pattern produced from monochromatic light by producing a further pattern from an incoherent source which, as a result, would produce a specularly reflected image coincident with the zero order in the diffraction pattern.

The filtering process utilised in connection with the Gaussian Algorithm, whereby the diffraction pattern is modified to eliminate or reduce the effects of surface waviness and/or wave-front distortion has application in any method or apparatus in which it is desired to improve the quality of a stored diffraction pattern prior to carrying out processing thereon. For example, this technique may permit use in an optical system of a diffraction grating of lower quality that would otherwise be required.

Although in the preferred embodiment a CCD (charge coupled device) array is used for detecting the diffraction patterns and, in the present state of technology, is much to be preferred since such arrays are economical and accurate, the invention is not limited to the use of CCD arrays. Other forms of photosensor could be employed and it is not essential that the sensor employed should be an integrating device as is the case with a CCD.

In the preferred embodiment, the light sources used comprise lasers producing light of 670 and 780 nm respectively. Other wavelengths could be employed.

POWER SPECTRUM

As has been described with reference to FIG. 6, option 6 enables the operator to cause the apparatus to calculate power spectrum. In the preferred embodiment, the power spectrum can only be calculated provided that the composite diffraction pattern consists of only a zero order (as a result of which Rq will have been calculated using the Gaussian algorithm), that prior to selecting option 1 the operator utilised option 2 in FIG. 6 to select a filter as a result of which Rq will have been calculated from the filtered diffraction pattern as explained in the detailed description above of the Gaussian algorithm, and that the Rq value obtained is less than 30 nm. Decision 84 in the flow chart of FIG. 6 accordingly tests for these conditions. If they are satisfied, the program moves to Step 86 at which power spectrum is calculated.

After calculation of power spectrum, the spectrum itself is displayed on VDU 12 add FIG. 36 is a representation of an actual power spectrum obtained in this way in a prototype of the preferred embodiment. In that drawing, the horizontal axis represents frequency in cycles per mm and the vertical axis represents power normalised to one. Accordingly, the curve 600 in FIG. 36 is a plot of the normalised "power" against the spatial frequency of the surface characteristics and with this plot the relative powers at the different frequencies can be observed. This provides valuable information to those skilled in the art of metrology, as is well known.

Although those skilled in metrology are well familiar with the expression "power spectrum", it may be helpful to the less skilled reader to explain at this point that this term is used to describe the function shown in FIG. 36 because that function is analogous to the "power spectrum" of an electrical signal, that is to say the distribution of power amongst the various frequency components in the signal. Thus, the surface of the workpiece under test may be considered as analogous to an electrical signal when considering the meaning of the term "power spectrum" in the field of metrology.

Figure 37:
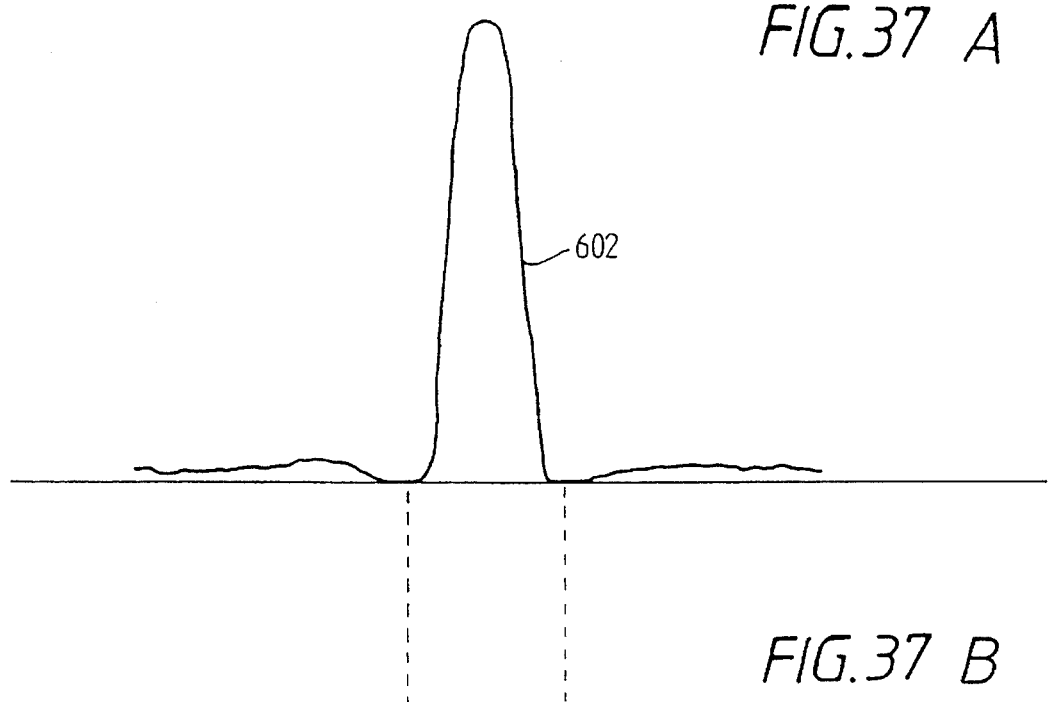
Figure 37:
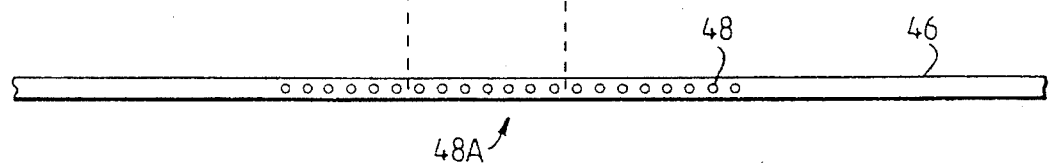
Figure 37:
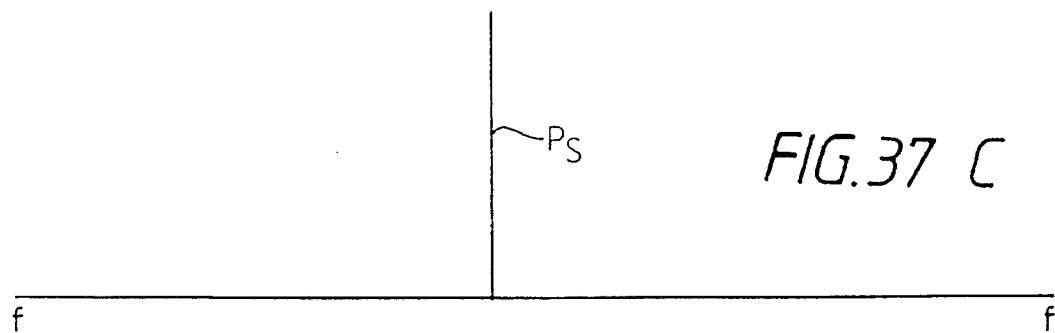

In the preferred embodiment, calculation of the power spectrum is performed from the energy in each cell in the filtered renormalised diffraction pattern obtained at Step 210 in FIG. 10. Diagram A in FIG. 37 illustrates, very diagrammatically, the form that such a filtered diffraction pattern might take. Diagram B in FIG. 37 is a representation of the CCD array 46 and the elements 48 and is positioned so that the energy represented by the curve in diagram A can be related to the individual cells 48 in the array 46. Thus, the seven cells indicated by reference number 48a in diagram B correspond to the zero order peak 602 in the curve of diagram A.

Diagram C in FIG. 37 comprises a horizontal axis labelled f representing frequency in the power spectrum and a vertical axis Ps representing power. The horizontal axis f is positioned relative to diagram B to represent the linear relationship which exists between the cells in array 48 and frequency, this relationship being defined by the formula:

$$f_k = \frac{k}{\lambda} \cdot \frac{2 \sin(\theta max)}{DPTS} \times 1000$$

where $f_k$ is the frequency corresponding to an element k in cycles per min.

$\lambda$ is the wavelength of the light used to produce the diffraction pattern in microns.

θmax is as defined above.

DPTS is the number of elements in the array 46.

Since k is the only variable in the right hand term of the equation, it can be seen that frequency is linearly related to k.

In view of the above linear relationship, the power at each frequency can be calculated as follows:

$$P_f = Rq^2 \frac{(L_k + L_{-k})}{2(1 - To)}$$

where $P_f$ is the power at a given frequency f which corresponds (due to the above linear relationship) to an element k.

$L_k$ is the energy in the element k $L_{-k}$ is the energy in element $-k$

To is the normalised energy in the zero order such as 602.

The symbol k means the element, counted in numbers of elements, to the right of the centre of the zero order and the symbol $-k$ means the corresponding numbered element to the left of the zero order.

Since the power spectrum required only need show relative power at the different frequencies, the formula for $P_f$ given above can be simplified for the purposes of calculation in the preferred embodiment to:

$$P_f = L_k + L_{-k}$$

Accordingly, at Step 86 in FIG. 6, the power spectrum is calculated by this simplified formula for $p_f$ by adding the value stored for each cell to one side of the zero order (outside the seven elements making up the zero order) to the corresponding cell on the other side, the results being displayed as the plot shown in FIG. 36. As will be appreciated from the above description, the plot 600 has been obtained simply by adding together the values of the $k^{th}$ and $-k^{th}$ cells. Since the energies in these cells (outside the seven making up the zero order) is low, it will be understood that substantial expansion of the vertical scale has taken place prior to displaying the power spectrum as shown in FIG. 36.

As has been explained, the power spectrum is derived from the diffraction pattern subsequent to application thereto of the Gaussian or phase-corrected 2RC filter function described in detail in connection with the Gaussian algorithm. This provides a substantial advantage. More particularly, the application of these filter functions, as has been described, eliminates the effects, such as the energy indicated at 520 in FIG. 40A resulting from long wavelengths in the surface characteristics. Thus, derivation of the power spectrum from the filtered diffraction pattern provides a substantially improved plot free of the substantial distortion which would otherwise be present as a result of the effects of the long wavelength.

APPENDIX 1

Simulation of Surfaces and Diffraction Patterns

As has been explained in the detailed description of the interpolation algorithm, sets of coefficients for rebuilding the order energies in the composite diffraction pattern obtained at Step 106 prior to comparison with the reference values have been derived utilising a large number of simulated surfaces and the diffraction patterns which would result therefrom. Those skilled in the art may be able to simulate surfaces and calculate the diffraction patterns which would be produced thereby in a variety of ways. The following description will give an example of how this may be done.

Surface Simulation

It is necessary to simulate, by computer, a large number of surfaces which differ from each other. In order to simulate a first surface, a single cycle of a sine wave is selected with a wavelength one sixty fourth of the length of the illumination produced on the surface under test with the optical unit of FIG. 2. Thus, where this has a length of 5E as in the preferred embodiment, the selected wavelength is 5/64 mm. Diagram A of FIG. 38 illustrates such a cycle. This cycle is stored in a computer memory in digitised form as a set of sixteen samples.

The next step is to add some "noise" to the stored cycle. Thus, a randomly selected number is added to each of the sixteen stored samples so that the stored wave may then, for example, take a form such as that shown at diagram B in FIG. 38. Each of the numbers added as "noise" in this step should not, however, be completely random. First, the values of these numbers are constrained to fall within limits based on the basis of experience so that the simulated surface which results may faithfully represent a real surface which may be encountered in practice. Second, the sequence of numbers is not purely random in that they are generated with a correlation factor within a predetermined range within the wider range 0 to 1 for example as described in the article entitled "The Time Series Modelling of Non-Gaussian Engineering Processes" by W. Watson and T. A. Spedding which appeared in Wear, 83(1983) 215-231.

A full length (in this example 5 mm) surface is then generated by repeating the waveform obtained in the last step (illustrated in diagram B of FIG. 38) 64 times. Thus, as indicated very diagrammatically at C in FIG. 38 the full length surface is obtained.

Finally, further noise is added to the full length surface so as to reduce the repetitiveness created by repeating the waveform shown at B throughout the length of the surface. The final noise just mentioned is again created in the manner described above in the reference by Watson and Spedding. Diagram D in FIG. 38 is an approximate diagrammatic representation of the final surface which might result.

The above is repeated with different randomly selected amplitudes and noise in order to obtain the large number of simulated surfaces already referred to.

Each time a surface is generated, a diffraction pattern corresponding to that surface is calculated.

Diffraction Pattern Calculation

One method of diffraction pattern calculation will be understood with reference to FIG. 39 which shows diagrammatically a simulated surface at 700, a notional optical system at 702 and the detector array 46 notionally positioned at the opposite side of the optical system 702 to the simulated surface 700. A parallel wave 704 is shown as leaving the surface 700 and being focused to a point 706 on the array 46. The plane wavefront associated with this light is indicated at 708 and as can be seen is moving at an angle θ (not greater than θ max) to the optical axis. The energy arriving at point 706 on the detector array is given by the following equation:

$$E(\theta) = \frac{1}{l^2} \left| \int_{-l/2}^{l/2} \exp\left[ \frac{\tau 4\pi y(x)}{\lambda} \right] \cdot \exp\left[ \frac{-\tau 2\pi x \sin\theta}{\lambda} \right] \cdot dx \right|^2$$

where l is the length of the simulated surface,

λ is the wavelength of light, $Y_x$ is the surface height at location x and is marked on FIG. 39 at one point, x is the distance from the centre of the surface, θ has the meaning shown in FIG. 39.

Repeating this equation for each value of θ will provide the energy distribution in the diffraction pattern produced by the simulated surface.

Calculation of Rq

Having obtained the simulated surface it is necessary, in addition to calculating the diffraction pattern, to calculate Rq for that surface since this value is needed for generating the polynomial coefficients discussed above in connection with the interpolation algorithm. Calculation of Rq involves the following steps:

1. Fast Fourier Transform the simulated surface.
2. Sum the squares of the magnitudes of the terms in the Fourier Transform which lie within the bandwidth of the instrument.
3. Take the square root of the number obtained in Step 2 and this is equal to Rq.

Alternative Method of Calculating Diffraction Pattern

Although the method of calculating the diffraction pattern described above gives satisfactory results, it involves lengthy calculations and is therefore relatively expensive in computer time. An alternative, faster method would be to:

1. Obtain the electrical field strength close to the simulated surface, this computation being within the competence of those skilled in the art. The result of this calculation will be called the "near field array".
2. Fast Fourier Transform the near field array to produce the far field Fraunhoffer diffraction electrical field. This field may be regarded as a set of complex valued delta functions lying at discrete positions along the CCD array.
3. Sub-divide each detector in the array into a number of sections and then for the location corresponding to each sub-division evaluate the net electrical field by convolving the electrical field line spread function of the optical system of the instrument with the above mentioned far field array.
4. For each detector element, sum the squares of the magnitudes of the net field strengths obtained for each sub-division thereof to obtain the total diffracted energy for that cell.

The result of this step provides the energy distribution in the diffraction pattern which can then be normalised as is required.

APPENDIX II

As indicated in the detailed description of the interpolation algorithm, this Appendix sets out the coefficients which have been derived for the different diffraction types and different asymmetry numbers in prototype of the preferred embodiment. In the following tables the symbol E and the digits which follow it have the conventional meaning, namely that the number preceeding the E should be multiplied by ten raised to the power represented by the digits which follow the E (taking into account the sign shown).

TYPE 1

| | $T_0$ | $T_1$ | $T_1'$ | N |
|---|---|---|---|---|
| ASYMMETRY NUMBER 0 | | | | |
| $S_0$ | .100466E+01 | .257360E+01 | -.258382E+01 | -.207165E+00 |
| $S_1$ | .244100E-02 | .256474E+00 | .620367E+00 | .551331E+00 |
| $S_1'$ | .244100E-02 | .256474E+00 | .620367E+00 | .551331E+00 |
| ASYMMETRY NUMBER 1 | | | | |
| $S_0$ | .101355E+01 | .127037E+00 | -.148481E+00 | -.207417E+00 |
| $S_1$ | .550329E-02 | .541551E+00 | .325253E+00 | .531853E+00 |
| $S_1'$ | .562691E-02 | .542061E+00 | .322687E+00 | .530720E+00 |
| ASYMMETRY NUMBER 2 | | | | |
| $S_0$ | .103979E+01 | -.120367E+01 | .124339E+01 | -.176948E+00 |
| $S_1$ | .288879E-02 | .918129E+00 | -.662560E-01 | .509378E+00 |
| $S_1'$ | .355672E-02 | .910725E+00 | -.647041E-01 | .505810E+00 |
| ASYMMETRY NUMBER 3 | | | | |
| $S_0$ | .101530E+01 | .168192E+00 | -.924243E-01 | -.310145E+00 |
| $S_1$ | .466904E-01 | .106333E+00 | .805735E+00 | .536785E+00 |
| $S_1'$ | .571213E-01 | .629763E-01 | .798325E+00 | .493731E+00 |

TYPE 2

| | $T_0$ | $T_1$ | $T_1'$ | $T_2$ | $T_2'$ | N |
|---|---|---|---|---|---|---|
| ASYMMETRY NUMBER 0 | | | | | | |
| $S_0$ | .976473E+00 | -.120364E+00 | .186370E+00 | .443856E+00 | -.433149E+00 | -.261573E+00 |
| $S_1$ | .121877E+00 | .625426E+00 | .178979E+00 | -.370484E-01 | .409095E+00 | .463039E+00 |
| $S_1'$ | .132399E+00 | .607860E+00 | .152354E+00 | -.612932E-01 | .357058E+00 | .428144E+00 |
| $S_2$ | -.950379E-01 | -.236690E-01 | .192790E+00 | .245242E+00 | .294784E+00 | .164832E+00 |
| $S_2'$ | -.959744E-01 | -.270947E-01 | .193752E+00 | .247656E+00 | .294869E+00 | .163825E+00 |
| ASYMMETRY NUMBER 1 | | | | | | |
| $S_0$ | .991489E+00 | -.225462E+00 | .290590E+00 | -.216825E+00 | .244103E+00 | -.134395E+00 |
| $S_1$ | .131293E+00 | .355044E+00 | .508199E+00 | .353133E+00 | .344888E+00 | .407012E+00 |
| $S_1'$ | .170777E+00 | .223714E+00 | .526653E+00 | .221053E+00 | .310544E+00 | .321524E+00 |
| $S_2$ | -.123420E+00 | .284656E+00 | -.137158E+00 | .285720E+00 | .414928E-01 | .169007E+00 |
| $S_2'$ | -.127123E+00 | .286808E+00 | -.146682E+00 | .288294E+00 | .387847E-01 | .167826E+00 |
| ASYMMETRY NUMBER 2 | | | | | | |
| $S_0$ | .965618E+00 | .956829E-01 | -.114247E+00 | -.842277E-01 | -.266435E-02 | -.132358E+00 |
| $S_1$ | .116219E+00 | .322481E+00 | .605338E+00 | .540234E+00 | .189783E+00 | .396606E+00 |
| $S_1'$ | .166861E+00 | .225880E+00 | .491312E+00 | .428027E+00 | -.193245E+00 | .243701E+00 |
| $S_2$ | -.997171E-01 | .130860E+00 | .443732E-01 | .714752E-01 | .337918E+00 | .198717E+00 |
| $S_2'$ | -.104597E+00 | .128380E+00 | .354148E-01 | .648756E+00 | .351664E+00 | .198698E+00 |

—continued

| | | | | ASYMMETRY NUMBER 3 | | | |
|---|---|---|---|---|---|---|---|
| $S_0$ | .909946E+00 | .114153E+00 | .486955E-01 | -.234080E+00 | .184438E+00 | .125430E+00 | -.196655E+00 |
| $S_1$ | .126956E+00 | .270436E+00 | .269232E+00 | .112889E-01 | .140718E+00 | .563764E-01 | .614923E+00 |
| $S_1'$ | .237306E+00 | .526256E-01 | .203477E+00 | .809667E+00 | -.558489E-01 | .119742E+00 | .245643E+00 |
| $S_2$ | -.100386E+00 | .184978E+00 | .236833E+00 | -.148732E+00 | -.223053E+00 | .116535E+00 | .146953E+00 |
| $S_2'$ | -.105828E+00 | .150089E+00 | .242257E+00 | -.108446E+00 | .190359E+00 | .214583E+00 | .146583E+00 |

TYPE 3

| | $T_0$ | $T_1$ | $T_1'$ | $T_2$ | $T_2'$ | $T_3$ | $T_3'$ | N |
|---|---|---|---|---|---|---|---|---|
| | | | | ASYMMETRY NUMBER 0 | | | | |
| $S_0$ | .911715E+00 | .394534E-02 | .486955E-01 | -.162596E+00 | .132894E+00 | .130076E+00 | .545817E+00 | -.198098E+00 |
| $S_1$ | .265685E+00 | .613808E+00 | .269232E+00 | .496251E+00 | -.285156E+00 | -.438276E+00 | -.463573E-01 | .417170E-01 |
| $S_1'$ | .283896E+00 | .597400E+00 | .203477E+00 | .461140E+00 | -.375707E+00 | -.484639E+00 | -.865099E-01 | .359987E+00 |
| $S_2$ | -.155577E+00 | -.744756E-01 | .236833E+00 | .701540E-01 | .568228E+00 | .508935E+00 | .226016E+00 | .177588E+00 |
| $S_2'$ | -.156833E+00 | -.819297E-01 | .242257E-01 | .647394E-01 | .577970E+00 | .503620E+00 | .229546E+00 | .176200E+00 |
| $S_3$ | -.643065E-01 | -.312375E-01 | .103518E-01 | .251607E-01 | .173946E+00 | .316689E+00 | .602111E-01 | .300429E-01 |
| $S_3'$ | -.647875E-01 | -.331347E-01 | .116486E-01 | .238210E-01 | .176435E+00 | .315896E+00 | .612288E-01 | .297344E-01 |
| | | | | ASYMMETRY NUMBER 1 | | | | |
| $S_0$ | .894870E+00 | .676272E+00 | -.804789E+00 | .259574E+00 | -.448856E+00 | .135534E+00 | .290008E+00 | -.254698E+00 |
| $S_1$ | .194677E+00 | .231399E+00 | .824326E+00 | .134399E+00 | .458326E+00 | -.105597E+00 | .451602E+00 | .473027E+00 |
| $S_1'$ | .241524E+00 | .231556E+00 | .604639E+00 | .292036E+00 | .257524E+00 | -.255537E+00 | .413110E+00 | .315543E+00 |
| $S_2$ | -.123207E+00 | -.464115E-01 | .195733E+00 | .206486E+00 | .291134E+00 | .404800E+00 | -.395666E-01 | .194751E+00 |
| $S_2'$ | -.129578E+00 | -.508094E-01 | .189266E+00 | .211017E+00 | .292796E+00 | .413865E+00 | -.505057E-01 | .192897E+00 |
| $S_3$ | -.393501E-01 | -.213099E-01 | -.931452E-04 | .701071E-01 | .681475E-01 | .175661E+00 | -.320797E-01 | .358098E-01 |
| $S_3'$ | -.411374E-01 | -.225732E-01 | -.146101E-02 | .711374E-01 | .686759E-01 | .177866E+00 | -.347500E-01 | .354194E-01 |
| | | | | ASYMMETRY NUMBER 2 | | | | |
| $S_0$ | .727594E+00 | .197149E+00 | -.347269E+00 | -.910482E-01 | .251426E+00 | .764289E+00 | -.866407E+00 | -.118315E+00 |
| $S_1$ | .371896E+00 | .366399E+00 | .834208E+00 | .322302E+00 | .158097E+00 | -.486511E+00 | .799921E+00 | .373850E+00 |
| $S_1'$ | .418208E+00 | .311093E+00 | .521541E+00 | .142005E+00 | .154748E-02 | -.541420E+00 | .353367E+00 | .147231E+00 |
| $S_2$ | -.162415E+00 | .293304E-01 | .108652E+00 | .210102E+00 | .203932E+00 | .345742E+00 | .338072E+00 | .226359E+00 |
| $S_2'$ | -.169512E+00 | -.142804E-03 | .140733E+00 | .194498E+00 | .210401E+00 | .338903E+00 | .363727E+00 | .228174E+00 |
| $S_3$ | -.844520E-01 | .277707E-01 | -.881919E-01 | .888741E-01 | .764903E-01 | .234971E+00 | .252593E-01 | .638080E-01 |
| $S_3'$ | -.870614E-01 | .215446E-01 | -.822390E-01 | .860236E-01 | .776623E-01 | .234751E+00 | .303024E-01 | .643633E-01 |
| | | | | ASYMMETRY NUMBER 3 | | | | |
| $S_0$ | .710338E+00 | .117011E-01 | .373364E-02 | .176956E+00 | -.284107E+00 | .301392E+00 | -.284996E+00 | -.689878E-01 |
| $S_1$ | .334979E+00 | .669574E+00 | .388471E+00 | .273397E+00 | .461525E+00 | -.160351E+00 | .202365E+00 | .376502E+00 |
| $S_1'$ | .439187E+00 | .384175E+00 | .218229E+00 | .494282E+00 | .165467E+00 | -.310724E+00 | -.185061E+00 | .998253E-01 |
| $S_2$ | -.161522E+00 | .378993E-01 | .128995E+00 | .172452E+00 | .234267E+00 | .332674E+00 | .412982E+00 | .208645E+00 |
| $S_2'$ | -.196645E+00 | .716467E-01 | .864839E-01 | .182695E+00 | .175683E+00 | .296710E+00 | .392045E+00 | .197011E+00 |
| $S_3$ | -.711889E-01 | -.616277E-01 | .617513E-01 | .633358E-01 | .939035E-01 | .214367E+00 | .193075E+00 | .777644E-01 |
| $S_3'$ | -.783241E-01 | -.566250E-01 | .539304E-01 | .644936E-01 | .868834E-01 | .208601E+00 | .191706E+00 | .759956E-01 |
| | | | | ASYMMETRY NUMBER 4 | | | | |
| $S_0$ | .790854E+00 | .133922E+00 | .142084E+00 | .134460E+00 | -.414546E+00 | .106076E+00 | -.231878E+00 | -.137125E+00 |
| $S_1$ | .172249E+00 | .567539E+00 | .526129E+00 | .282983E+00 | .896160E+00 | .510955E+00 | .815500E+00 | .678645E+00 |
| $S_1'$ | .323602E+00 | .191153E+00 | .259344E+00 | -.222901E-01 | -.860291E-01 | .231430E+00 | .130105E+00 | .165158E+00 |

| | $T_0$ | $T_1$ | $T_1'$ | $T_2$ | $T_2'$ | $T_3$ | $T_3'$ | $T_4$ | $T_4'$ | N |
|---|---|---|---|---|---|---|---|---|---|---|
| $S_2$ | -.987445E-01 | .954766E-01 | | .359984E-01 | .197579E+00 | | .235850E+00 | | .151309E+00 | .124929E+00 |
| $S_2'$ | -.119884E+00 | .806144E+00 | | .297135E-01 | .157694E+00 | | .350167E+00 | | .171989E+00 | .131542E+00 |
| $S_3$ | -.470989E-01 | .182522E-01 | | -.841517E-01 | .984434E-01 | | .434567E-01 | | .964385E-02 | .209287E-01 |
| $S_3'$ | -.542971E-01 | .151706E-01 | | -.116513E-01 | .916832E-01 | | .681327E-01 | | .181298E-01 | .224480E-01 |

TYPE 4

| | $T_0$ | $T_1$ | $T_1'$ | $T_2$ | $T_2'$ | $T_3$ | $T_3'$ | $T_4$ | $T_4'$ | N |
|---|---|---|---|---|---|---|---|---|---|---|

ASYMMETRY NUMBER 0

| | | | | | | | | | | |
|---|---|---|---|---|---|---|---|---|---|---|
| $S_0$ | .939144E+00 | -.683832E+00 | .881883E+00 | .691006E-01 | -.140673E+00 | -.394651E+00 | .454678E+00 | .979690E+00 | -.105447E+00 | -.119565E+ |
| $S_1$ | .336311E+00 | .951160E+00 | -.403490E+00 | .100369E+00 | -.358940E+00 | .603695E+00 | -.392612E+00 | -.109956E+00 | -.257466E+00 | .327258E- |
| $S_1'$ | .369717E+00 | .850501E+00 | -.398207E+00 | .990414E+00 | -.474492E+00 | .540363E+00 | -.460929E+00 | -.187126E+00 | -.457790E+00 | .260373E- |
| $S_2$ | -.225952E+00 | .798705E-01 | .218191E+00 | -.290004E+00 | .669725E+00 | .110708E+00 | .468212E+00 | .417976E+00 | .977240E+00 | .206422E- |
| $S_2'$ | -.230130E+00 | .809762E-01 | .214038E+00 | -.295190E+00 | .676112E+00 | .105491E+00 | .475048E+00 | .423780E+00 | .984073E+00 | .205227E- |
| $S_3$ | -.845063E-01 | -.107003E+00 | .195033E+00 | -.200852E+00 | .271097E+00 | .129261E+00 | .197385E+00 | .156520E+00 | .351784E+00 | .521410E- |
| $S_3'$ | -.856898E-01 | -.106885E+00 | .194192E+00 | -.202392E+00 | .272923E+00 | .115894E+00 | .199217E+00 | .157935E+00 | .353950E+00 | .519118E- |
| $S_4$ | -.114052E-01 | -.281303E-01 | .423016E-01 | -.363419E-01 | .414756E-01 | .289699E-02 | .292901E-01 | .211619E-01 | .523814E-01 | .740596E- |
| $S_4'$ | -.118946E-01 | -.280934E-01 | .419795E-01 | -.369797E-01 | .422268E-01 | .236070E-02 | .300322E-01 | .217206E-01 | .533003E-01 | .732210E- |

ASYMMETRY NUMBER 2

| | | | | | | | | | | |
|---|---|---|---|---|---|---|---|---|---|---|
| $S_0$ | .723785E+00 | .312166E+00 | -.532158E+00 | .705265E+00 | -.567802E+00 | .374574E+00 | -.482660E+00 | .754964E+00 | -.145632E+00 | -.196901E+0 |
| $S_1$ | .440923E+00 | .157508E+00 | .106973E-01 | -.344568E+00 | .443342E+00 | -.386654E+00 | .107058E-01 | -.617035E-01 | .239162E+00 | .442310E+0 |
| $S_1'$ | .474175E+00 | .865236E+00 | .845847E+00 | -.341779E+00 | .170963E+00 | -.439382E+00 | .846174E+00 | -.607875E+00 | .199289E+00 | .266716E+0 |
| $S_2$ | -.192114E+00 | .132817E+00 | .952101E-02 | .229388E+00 | .378565E+00 | .369552E+00 | .173126E-02 | .347711E+00 | -.287068E+00 | .202535E+0 |
| $S_2'$ | -.192564E+00 | .115802E+00 | .380272E-01 | .195811E+00 | .396331E+00 | .322915E+00 | .401942E-01 | .303256E+00 | -.216394E+00 | .204816E+0 |
| $S_3$ | -.108605E+00 | .732657E-01 | -.158301E+00 | .210799E+00 | .898218E-01 | .290526E+00 | -.171474E+00 | .313790E+00 | -.540095E+00 | .386157E-0 |
| $S_3'$ | -.110034E+00 | .708529E-01 | -.155077E+00 | .206129E+00 | .925053E-01 | .284427E+00 | -.167432E+00 | .307742E+00 | -.530851E+00 | .388771E-0 |
| $S_4$ | -.209389E-01 | .207854E-01 | -.502901E-01 | .573544E-01 | .261501E-02 | .779826E-01 | -.582762E-01 | .828150E-01 | -.148920E+00 | .225501E-0 |
| $S_4'$ | -.216243E-01 | .199681E-01 | -.493056E-01 | .557678E-01 | .356693E-02 | .759729E-01 | -.570719E-01 | .807816E-01 | -.145584E+00 | .233948E-0 |

ASYMMETRY NUMBER 3

| | | | | | | | | | | |
|---|---|---|---|---|---|---|---|---|---|---|
| $S_0$ | .933017E+00 | -.562633E+00 | .713036E+00 | -.321636E+00 | .380801E+00 | -.451275E+00 | .100425E+00 | -.532419E+00 | .887458E+00 | .109377E+00 |
| $S_1$ | .854268E-01 | .141950E-01 | -.705762E+00 | .978463E+00 | -.865530E-01 | .117874E+01 | -.193965E+00 | .131115E+01 | -.158651E+01 | .108732E+00 |
| $S_1'$ | .177164E+00 | .115762E+00 | -.770244E+00 | .780059E+00 | -.112217E+01 | .918275E+00 | -.199179E+00 | .100708E+01 | -.159465E+00 | -.584550E-01 |
| $S_2$ | -.937599E-01 | -.188507E+00 | .473225E+00 | -.636460E+00 | .771533E+00 | -.902841E+00 | .102909E+00 | -.107863E+00 | .840711E+00 | .264404E+00 |
| $S_2'$ | -.110087E+00 | -.185876E+00 | .441043E+00 | -.651658E+00 | .773010E+00 | -.684936E+00 | .961443E-01 | -.768669E+00 | .765473E+00 | .251281E+00 |
| $S_3$ | -.885939E-02 | -.260928E+00 | .339704E+00 | -.125341E+00 | .445364E+00 | -.189649E+00 | .777048E+00 | -.231240E+00 | .669203E+00 | .131855E+00 |
| $S_3'$ | -.128260E-01 | -.258919E+00 | .335844E+00 | -.126883E+00 | .448619E+00 | -.187185E+00 | .768728E+00 | -.226937E+00 | .658307E+00 | .130055E+00 |
| $S_4$ | -.521407E-02 | -.630178E-01 | .761618E-01 | -.275600E-01 | .830594E-01 | -.485872E-01 | .173285E+00 | -.604186E-01 | .155090E+00 | .274067E-01 |
| $S_4'$ | .362454E-02 | -.625238E-01 | .750080E-01 | -.282779E-01 | .846137E-01 | -.478584E-01 | .170707E+00 | -.589819E-01 | .151421E+00 | .268125E-01 |

| | | | | | | | | | | |
|---|---|---|---|---|---|---|---|---|---|---|
| $S_0$ | .558842E+00 | .141760E+00 | -.287107E+00 | .173748E+00 | -.115465E+00 | .563279E+00 | .234740E+00 | .218810E+00 | -.476931E+00 | -.933976E-01 |
| $S_1$ | .581109E+00 | .205419E+00 | .121872E+00 | .589093E-01 | .338348E+00 | .175770E+00 | .283285E+00 | .154750E+00 | .125175E+00 | .420358E+00 |
| $S_1'$ | .615358E+00 | .232035E+00 | .868588E+00 | -.984310E-01 | .871653E-01 | -.397410E-01 | .158471E+00 | .187996E+00 | .816627E+00 | .139561E+00 |
| $S_2$ | -.219078E+00 | .200280E+00 | -.128902E+00 | .255715E+00 | .234707E+00 | .254946E+00 | .106735E+00 | .181676E+00 | -.518047E-01 | .210630E+00 |
| $S_2'$ | -.224811E+00 | .185750E+00 | -.731087E-01 | .221578E+00 | .202747E+00 | .237100E+00 | .831269E-01 | .156864E+00 | .787232E-01 | .200945E+00 |
| $S_3$ | -.137419E+00 | .975966E-01 | -.227276E+00 | .151954E+00 | .998336E-01 | .128002E+00 | .477710E-01 | .104088E+00 | -.202277E+00 | .579657E-01 |
| $S_3'$ | -.140959E+00 | .949119E-01 | -.218881E+00 | .146607E+00 | .958995E-01 | .124834E+00 | .442130E-01 | .993585E-01 | -.192544E+00 | .582590E-01 |
| $S_4$ | -.244991E-01 | .205068E-01 | -.626094E-01 | .364664E-01 | .247040E-01 | .266402E-01 | .143148E-01 | .249061E-01 | -.598572E-01 | .808011E-02 |
| $S_4'$ | -.261019E-01 | .195200E-01 | -.597119E-01 | .345885E-01 | .234420E-01 | .255124E-01 | .130345E-01 | .231493E-01 | -.563880E-01 | .823647E-02 |

-continued

| | | | | ASYMMETRY NUMBER 4 | | | |
|---|---|---|---|---|---|---|---|
| $S_0$ | .651474E+00 | .471552E-01 | -.226165E+00 | .115152E+00 | .470022E-01 | .841467E-01 | -.336640E+00 | .103308E+00 | -.837446E-01 | -.398523E-01 |
| $S_1$ | .399153E+00 | .524087E+00 | .102437E-01 | .261438E+00 | .207200E+00 | .265223E+00 | .445107E+00 | .311166E+00 | .115385E-01 | .392420E+00 |
| $S_1'$ | .491426E+00 | .255257E+00 | .647282E+00 | .218100E-02 | -.931855E-01 | .132851E-02 | -.120293E+00 | .879080E-01 | .338050E+00 | .602273E-01 |
| $S_2$ | -.168576E+00 | .831840E-01 | -.640011E-01 | .202451E+00 | .266242E+00 | .212284E+00 | .354177E+00 | .163973E+00 | .219398E+00 | .207182E+00 |
| $S_2'$ | -.190667E+00 | .829052E-01 | -.382242E-01 | .187734E+00 | .251221E+00 | .190189E+00 | .385527E+00 | .136559E+00 | .298369E+00 | .195625E+00 |
| $S_3$ | -.912740E-01 | .378262E-02 | -.133357E+00 | .937572E-01 | .132177E+00 | .991678E-01 | .128764E+00 | .760325E-01 | -.381489E-01 | .775208E-01 |
| $S_3'$ | -.981028E-01 | .289436E-02 | -.129950E+00 | .912974E-01 | .129591E+00 | .959785E-01 | .135073E+00 | .709505E-01 | -.225958E-01 | .764340E-01 |
| $S_4$ | -.161735E-01 | -.197224E-02 | -.382428E-01 | .210510E-01 | .291520E-01 | .237677E-01 | .177055E-01 | .195600E-01 | -.299693E-01 | .164906E-01 |
| $S_4'$ | -.142521E-01 | -.175440E-02 | -.328736E-01 | .180350E-01 | .249801E-01 | .202554E-01 | .159333E-01 | .163671E-01 | -.246164E-01 | .141090E-01 |
| | | | | ASYMMETRY NUMBER 5 | | | |
| $S_0$ | .423607E+00 | -.246922E-01 | .219667E+00 | .211228E-01 | -.914869E-01 | .987523E-01 | -.281928E+00 | .156334E+00 | -.823136E+00 | .692389E-0 |
| $S_1$ | .466476E+00 | .719577E+00 | .512715E+00 | .402220E+00 | .491419E+00 | .225421E+00 | .103844E+01 | .356967E+00 | .154941E+01 | .414009E+00 |
| $S_1'$ | .461546E+00 | .248387E+00 | .249719E+00 | -.389091E-03 | -.930225E-01 | -.101142E+00 | .228843E+00 | .107552E+00 | .829074E-01 | .549125E-0 |
| $S_2$ | -.947690E-01 | .458535E-01 | .159884E-01 | .199616E+00 | .239191E+00 | .254508E+00 | .396236E-01 | .133771E+00 | .105591E+00 | .162621E+00 |
| $S_2'$ | -.130498E+00 | .660596E-01 | .205446E-01 | .157906E+00 | .235688E+00 | .184586E+00 | .150018E+00 | .780070E-01 | .361976E+00 | .124399E+00 |
| $S_3$ | -.703112E-01 | -.189207E-01 | -.128242E-01 | .877937E-01 | .978555E-01 | .131894E+00 | -.487265E-01 | .592237E-01 | -.551751E-01 | .678904E-0 |
| $S_3'$ | -.804282E-01 | -.161860E-01 | -.154930E-01 | .818605E-01 | .100728E+00 | .121433E+00 | -.298968E-01 | .487377E-01 | -.960359E-02 | .617896E-0 |
| $S_4$ | -.672793E-02 | -.809122E-02 | -.293188E-02 | .200640E-01 | .156418E-01 | .325076E-01 | -.275490E-01 | .177945E-01 | -.520919E-01 | .163150E-0 |
| $S_4'$ | -.108912E-01 | -.718931E-02 | -.424312E-02 | .180498E-01 | .170410E-01 | .288911E-01 | -.207254E-01 | .139217E-01 | -.353224E-01 | .141543E-0 |

FURTHER MODIFICATIONS

Description will now be given of a number of further modifications to the embodiment described with reference to the drawings.

Gaussian Algorithm—Modified Re-normalization Process

In the description of the Gaussian algorithm utilizing the Gaussian cut-off filter function described above with reference to FIGS. 40A and 40B, it is explained that the filtering operation is followed by re-normalization carried out by dividing the energy value in each cell by the total energy value in all cells. As an alternative to this, and in order to achieve improved accuracy, the re-normalization method just described could be changed to a re-normalization method which involves summing the difference between the original and the filtered diffraction patterns and then adding $\frac{1}{7}$ of this sum to each of the seven elements located within the zero order.

Gaussian Algorithm—Alternative Filtering Methods

In the above description of the Gaussian algorithm for determining Rq, given with reference to FIGS. 40A and 40B, two alternative filter functions have been described, namely the Gaussian cut-off filter function and the phase-corrected 2 RC cut-off filter function. As respective modifications to those two filter functions, the processes described as follows may be utilized.

The first step in the modified filtering processes is to read and save the values of the seven elements constituting the zero order in the composite diffraction pattern. Thereafter, a modified Gaussian cut-off filter function or a modified phase corrected 2 RC cut-off filter function may be performed.

The modified Gaussian cut-off filter function may be as follows:

$$Filt = \left[1 - \exp\left[-\log_e 2 \cdot \left(\frac{\lambda_c k2 \sin\theta_{max}}{\lambda DPTS}\right)^2\right]\right]^2$$

where $\lambda_c$=filter cut-off in um $\lambda$=laser wavelength in um =0.78 k=distance from centre of zero order in number of detector elements

DPTS=total number of CCD elements=2048

$\theta_{max}$ has the value explained with reference to FIG. 2 and in the preferred embodiment is 3.5 degrees The modified phase corrected 2 RC cut-off filter function, may be as follows:

$$Filt = \left[1 + \frac{1}{3}\left(\frac{\lambda DPTS}{\lambda_c k2 \sin\theta_{max}}\right)^2\right]^{-2}$$

Following the performance of either of these filter functions, a predetermined part of the resulting diffraction pattern is stored in an array of memory cells. This predetermined part is that which corresponds to the part of the composite array obtained under the optimum exposure condition plus a number of elements on either side sufficient to provide in the predetermined part that number of cells which is equal to the next integer power of 2. By way of example, if there were 200 cells in the part of the composite diffraction pattern obtained at optimum exposure, the next integer power of $2(2^n)$ would be 256 and therefore the predetermined part of the diffraction pattern taken in this process would comprise the 200 cells just mentioned plus 28 on either side thereof making a total of 256.

The above mentioned predetermined part is then subjected to a Fast Fourier transform in a conventional manner. This produces an array of Fourier coefficients corresponding to the spacial frequencies present in the predetermined part of the diffraction pattern array. These coefficients are then filtered to attenuate the high frequency content.

That is to say, each coefficient resulting from the Fast Fourier transform is multiplied by the following amount, which varies according to the frequency represented by the coefficient:

$$\exp-\left(\frac{\pi j j^*}{N}\right)^2$$

where N is the number of elements to which the Fast Fourier transform has been applied and j*=1.56 (the derivation of which will be explained below), and j is the number of the term in the FFT.

An inverse Fast Fourier transform is then applied to the transformed, filtered part of the array and the resulting values are written back into the memory cells in which the composite diffraction pattern is stored in place of the original values, except for those cells which stored the zero order where the original values are re-inserted, having been saved as described above. The composite array is then renormalized by dividing the energy value in each cell by the total energy value in all cells in the composite array. The renormalized values are then used for the required computations including to obtain $S_7$ for computation of Rq using the Gaussian algorithm:

$$Rq = \frac{\lambda}{4\pi} \sqrt{-\log_e(S_7)}$$

where $\lambda$=laser wavelength in nm =780

$S_7$=sum of the seven elements which make up the zero order in the normalized composite diffraction pattern The advantage of these modifications to the Gaussian cut-off filtering operation and the phase corrected 2RC cut-off filtering operation are that improved signal to noise ratio is achieved. This arises because the portion of the composite diffraction pattern at and surrounding the zero order originally obtained will have resulted from the optimum energy setting and will not have had the benefit of improved signal to noise ratio which arises from over exposure i.e. the 10× optimum and maximum exposure settings.

The improvement obtained will be most noticeable in the derived power spectrum.

Calculation of j*=1.56

The single-mode fibre delivery system illustrated in FIG. 1 is assumed to support the $TEM_{oo}$ mode so that the resulting line spread function is Gaussian:

$$I(x) = \frac{1}{\sqrt{2\pi}} \frac{1}{x_o} \exp-\left(\frac{x}{x_o}\right)^2$$

where

I(x) is the intensity at position x.

The Fourier transform of this is $$\hat{I}(f) = \frac{1}{\sqrt{2\pi}} \int_{-\infty}^{\infty} \frac{1}{x_o} \exp-\left(\frac{x}{x_o}\right)^2 \exp-12\pi f x dx =$$

-continued
$$\sqrt{\frac{2}{\pi}} \; \frac{1}{x_o} \int_0^\infty \exp-\left(\frac{x}{x_o}\right)^2 \cos(2\pi fx)dx$$

This implies $$\frac{\hat{i}(f)}{\hat{i}(0)} = \exp-(\pi x_o f)^2$$

In the above, i is $$\sqrt{-1}\;.$$

Now, through examination of the actual line spread function as received from a very flat surface, $$x_o = j^* \Delta$$

where
$\Delta$ is the CCD pitch (13 μm) and where $j^*=1.56$.

If the Fourier transform takes place on N elements, then there will be a total of N frequency terms, the frequency of the jth term being $$fj = \frac{j}{N\Delta}$$

where
$-N/2+1 \le j \le N/2$.

The multiplicative filter therefore has the form:

$$\frac{\hat{i}(f)}{\hat{i}(0)} = \exp-(\pi x_o fj)^2 = \exp-\left(\frac{\pi jj^*}{N}\right)^2$$

We claim:

1. Apparatus for measuring surface roughness of a workpiece comprising:
   a) means for illuminating the workpiece to produce a diffraction pattern;
   b) means for determining a set of values dependent upon the energy distribution in said pattern;
   c) means for providing, for each of a plurality of values of surface roughness, a set of interpolated reference values representing the energy distribution in a diffraction pattern, said set of reference values being obtained by interpolation between first and second sets of reference values representing the energy distributions in diffraction patterns obtained respectively from relatively symmetrical and relatively asymmetrical surfaces; and
   d) means for comparing the set of values determined from said diffraction pattern produced by the workpiece with said set of interpolated reference values to obtain an indication of said surface roughness.

2. Apparatus according to claim 1, comprising means for determining the degree of asymmetry in the diffraction pattern obtained from the workpiece and performing said interpolation on the basis of said asymmetry.

3. Apparatus according to claim 2, comprising means for rebuilding the energy distribution in the values representing the orders in the diffraction pattern derived from the workpiece utilizing polynomials whose coefficients are selected dependent upon said degree of asymmetry and dependent upon the number of orders in the diffraction pattern derived from the work piece.

4. Apparatus according to claim 3, wherein said comparison comprises deriving a function representing a plot against variation in Rq of the difference between the values derived from the workpiece and said sets of reference values and identifying minima in said plot, wherein Rq is surface roughness.

5. Apparatus according to claim 4, wherein if the diffraction pattern derived from the workpiece has only zero and one or both first orders, the surface roughness value corresponding to the smallest minimum value in said function is taken as correct.

6. Apparatus according to claim 4, wherein, if said diffraction pattern derived from said workpiece has at least a second, third or fourth order and there is only one minimum in said function, the corresponding value of surface roughness is taken as the correct one if it fails within a range indicated by comparing the energies in the zero orders of first and second diffraction patterns derived from the workpiece at different wavelengths.

7. Apparatus according to claims 4, wherein, if the diffraction pattern obtained from the workpiece includes at least a second, third or fourth order and there is only one minimum in said function, if the value of surface roughness indicated by said one minimum disagrees with a range indicated by comparing the energies in the zero orders of first and second diffraction patterns obtained from the workpiece at different wavelengths, said function is differentiated to locate a point of inflection and said point of inflection utilized in determination of surface roughness.

8. Apparatus according to claim 4, wherein, if said diffraction pattern derived from said workpiece contains at least a second, third or fourth order and there is only one minimum in said function and said minimum indicates a value for surface roughness within the range 70 to 120 nanometers, the function having a flat bottom within the region of said minimum, the value for surface roughness is obtained utilizing a linear equation.

9. Apparatus according to claim 4, wherein if said function has a plurality of minima indicating respective different possible values for surface roughness, the smallest possible value for surface roughness is taken as correct if this is less than or equal to 25 nanometers; that value of surface roughness which is closest to 88 nanometers is taken as correct if comparison of the energies in the zero orders of first and second diffraction patterns obtained from the workpiece at different wavelengths indicates a value close to 88 nanometers; if said comparison of said energy in said zero orders suggests that surface roughness is not close to 88 nanometers, the number of possible values of surface roughness which conform to the result of said comparison is determined and:
   (i) if there is only one such value, this is taken as correct;
   (ii) if there are several possible such values, the one closest to 88 nanometer is taken as correct if said comparison indicates that surface roughness is relatively close to 88 nanometers and the one furthest from 88 nanometers is taken as correct if said comparison indicates that the value is remote from 88 nanometers; and
   (iii) if none of said possible values of surface roughness is in agreement with said comparison then that which is closest to 88 nanometers is taken as correct.

10. Apparatus according to claim 1, wherein said relatively symmetrical surface is a sinusoidal surface.

11. Apparatus according to claim 1, wherein said relatively symmetrical surface is of cusp-like form.

12. Apparatus according to claim 1, wherein said relatively symmetrical surface is of triangular form.

13. Apparatus according to claims 1, wherein said relatively asymmetrical surface is of saw-tooth form.

14. Apparatus according to claim 1, wherein said set of interpolated reference values are representative of the energy distribution in diffraction patterns which would be obtained from theoretical surfaces and wherein said processing means includes means for performing a value rebuilding step which takes into account low level diffracted energy arising in the diffraction pattern derived from the workpiece prior to comparing the values derived from the workpiece with the reference values.

15. Apparatus according to claim 14, wherein said value rebuilding step comprises rebuilding the values derived from the workpiece.

16. Apparatus according to claim 15, wherein said rebuilding step comprises rebuilding a value representing each order respectively utilizing a polynomial in which the values of the orders in the diffraction pattern derived from the workpiece are multiplied by coefficients and added.

17. Apparatus according to claim 16, wherein said coefficients are pre-calculated and derived from a multiplicity of surfaces having different surface characteristics.

18. Apparatus according to claim 17, wherein said multiplicity of surfaces from which said coefficients are derived are simulated surfaces.

19. Apparatus according to claim 17, wherein said derivation of said coefficients comprises deriving from said multiplicity of surfaces data representing the energy distribution in diffraction patterns which would be produced from such surfaces utilizing said apparatus, calculating the surface roughness of such multiplicity of surfaces, deriving sets of reference values for said multiplicity of surfaces utilizing said surface roughness as calculated, and relating the values representing the energy distribution of the diffraction patterns derived from said multiplicity of surfaces with said reference values derived for said multiplicity of surfaces by polynomial equations comprising unknown coefficients and obtaining best fit values for said unknown coefficients utilizing a mathematical technique.

20. Apparatus according to claim 19, wherein said mathematical technique is a least means squares method.

21. Apparatus according to claim 19, wherein said values representing said energy distribution in said diffraction patterns derived from said multiplicity of surfaces are divided into groups dependent upon the orders in said diffraction patterns and different sets of coefficients are derived for said different groups.

22. Apparatus according to claim 21, wherein said groups are further divided according to the degree of asymmetry of said diffraction patterns derived from said multiplicity of surfaces.

23. Apparatus according to claim 1, wherein said interpolation is performed according to the asymmetry in the diffraction pattern derived from the workpiece.

24. Apparatus according to claim 23, wherein said asymmetry in said diffraction pattern derived from said workpiece is obtained by summing the differences in the energies in the different pairs of orders in the diffraction pattern.

25. Apparatus according to claim 23, wherein said asymmetry is quantized, said quantization being utilized in selecting the coefficients derived from the multiplicity of surfaces in said group.

26. Apparatus for measuring a surface characteristic of a workpiece comprising:

a) means for illuminating the workpiece to produce a diffraction pattern;

b) means for deriving a plurality of signals dependent upon the energy distribution in said pattern;

c) means defining a plurality of algorithms with which said signals may be processed for determining said surface characteristics;

d) means for selecting an algorithm from said plurality dependent upon the orders in the diffraction pattern, wherein a first algorithm is selected if said diffraction pattern has substantially only a zero order, and a second algorithm is selected if said diffraction pattern contains substantial energy in orders other than the zero order; and e) processing means for processing said signals with the selected algorithm to obtain said surface characteristic.

27. Apparatus according to claim 26, wherein said selecting means is operative to count the orders in the diffraction pattern after discarding energy levels less than a predetermined percentage of the maximum energy level detected in said pattern.

28. Apparatus according to claim 27, wherein said predetermined percentage is 10%.

29. Apparatus according to claim 26, including means for providing, for each of a plurality of values of surface roughness, a set of reference values representing the energy distribution in a diffraction pattern, wherein said second algorithm comprises comparing a set of values dependent upon the energy distribution in said pattern with said reference values.

30. Apparatus according to claim 29, wherein said reference values are derived by interpolation between a first set of reference values representative of the energy distribution in a diffraction pattern which would be produced from a relatively symmetrical surface and a second set of reference values representing the energy distribution in a diffraction pattern which would be produced from a relatively asymmetrical surface.

31. Apparatus according to claim 26, wherein said first algorithm comprises calculating Rq from the Gaussian Algorithm formula $$Rq = \frac{\lambda}{4\pi} \sqrt{-\log_e(S_n)}$$

wherein $\lambda$ is representative of the wavelength of said illumination and $S_n$ is representative of the energy in the zero order of said diffraction pattern, wherein said selecting means selects said formula when said diffraction pattern comprises only the zero order.

32. Apparatus according to claim 31, comprising means for performing a filtering operation on a set of signals representing the diffraction pattern comprising only the zero order prior to applying said formula.

33. Apparatus for measuring a surface characteristic of a workpiece comprising:

a) means for illuminating the workpiece to produce a diffraction pattern;

b) means for deriving a plurality of signals dependent upon the energy distribution in said pattern;

c) means defining a plurality of algorithms with which said signals may be processed for determining said surface characteristic;

d) means for selecting an algorithm from said plurality dependent upon the orders in the diffraction pattern, wherein one of said algorithms comprises calculating Rq from the Gaussian Algorithm formula $$Rq = \frac{\lambda}{4\pi} \sqrt{-\log_e(S_n)}$$

wherein λ is representative of the wavelength of said illumination and Sn is representative of the energy in the zero order of said diffraction pattern; and wherein said selecting means selects said formula when said diffraction pattern comprises only the zero order; and e) processing means for processing said signals with the selected algorithm to obtain said surface characteristic.

34. A method for measuring surface roughness of a workpiece comprising the steps of:

a) illuminating said workpiece to produce a diffraction pattern;

b) determining a set of values dependent upon the energy distribution in said pattern;

c) providing for each of a plurality of values of surface roughness a set of reference values representing the energy distribution in a diffraction pattern, said set of reference values being obtained by the step of interpolation between first and second sets of reference values representing the energy distributions in diffraction patterns obtained respectively from relatively symmetrical and relatively asymmetrical surfaces; and d) comparing the sets of values determined from said diffraction pattern produced by the workpiece with said reference values to obtain an indication of said surface roughness.

35. The method according to claim 34, further comprising the step of determining the degree of asymmetry in the diffraction pattern obtained from the workpiece and performing said interpolation on the basis of said asymmetry.

36. The method according to claim 35, further comprising the step of rebuilding the energy distribution in the values representing the orders in the diffraction pattern derived from the workpiece utilizing polynomials whose coefficients are selected dependent upon said degree of asymmetry and dependent upon the number of orders in the diffraction pattern derived from the workpiece.

37. The method according to claim 36, wherein said step of comparing the step of deriving a function representing a plot against variation in Rq of the difference between the values derived from the workpiece and said sets of reference values and identifying minima in said plot, wherein Rq is surface roughness.

38. The method according to claim 37, wherein if said diffraction pattern derived from said workpiece has only zero and one or both first orders, the surface roughness value corresponding to the smallest minimum value in said function is taken as correct.

39. A method according to claim 37, wherein if said diffraction pattern derived from said workpiece has at least a second, third or fourth order and there is only one minimum in said function, the corresponding value of surface roughness is taken as the correct one if it falls within a range initiated by comparing the energies in the zero orders of first and second diffraction patterns derived from the workpiece at different wavelengths.

40. A method according to claim 37, wherein if said diffraction pattern obtained from the workpiece includes at least a second, third or fourth order and there is only one minimum in said function, if the value of surface roughness indicated by said one minimum disagrees with a range indicated by comparing the energy in the zero orders of first and second diffraction patterns obtained from the workpiece at different wavelengths, said function is differentiated to locate a point of inflection, said point of inflection being utilized in determining the surface roughness.

41. A method according to claim 37, wherein if said diffraction pattern derived from said workpiece contains at least a second, third or fourth order and there is only one minimum in said function and said minimum indicates a value for surface roughness within the range 70–120 nanometers, the function having a flat bottom within the region of said minimum, the value for surface roughness obtained utilizing a linear equation.

42. A method according to claim 37, wherein if said function has a plurality of minima indicating respective different possible values for surface roughness, the smallest possible value of surface roughness is taken as correct if this is less than or equal to 25 nanometers; that value of surface roughness which is closest to if comparison of the energies in the zero orders of first and second diffraction patterns obtained from said workpiece at different wavelengths indicates a value close to 88 nanometers; if said comparison of said energy in said zero orders suggest that surface roughness is not close to 88 nanometers, the number of possible values of surface roughness which conform to the result of said comparison is determined and;

(i) if there is only one such value, this is taken as correct;

(ii) if there are several possible such values, the one closest to 88 nanometers is taken as correct if said comparison indicates that surface roughness is relatively close to 88 nanometers and the one furthest from 88 nanometers is taken as correct if said comparison indicates that the value is remote from 88 nanometers; and (iii) if none of said possible values of surface roughness is in agreement with said comparison then that which is closest to 88 nanometers is taken as correct.

43. A method according to claim 34, wherein said relatively symmetrical surface is a sinusoidal surface.

44. A method according to claim 34 wherein said relatively symmetrical surface is of cusp-like form.

45. A method according to claim 34, wherein said relatively symmetrical surface is of triangular form.

46. A method according to claim 34, wherein said relatively asymmetrical surface is of a saw-tooth form.

47. A method according to claim 34, wherein reference values are representative of the energy distribution in diffraction patterns which would be obtained from theoretical surfaces and wherein said processing means includes means for performing a value rebuilding step which takes into account low level diffracted energy arising in the diffraction pattern derived from the workpiece prior to comparing of values derived from said workpiece with the reference values.

48. A method according to claim 34, wherein said value rebuilding step comprises rebuilding the values derived from the workpiece.

49. A method according to claim 48, wherein said rebuilding step comprises rebuilding a value representing each order respectively utilizing a polynomial in which the values of the orders in the diffraction pattern derived from the workpiece are multiplied by coefficients and added.

50. A method according to claim 49, wherein said coefficients are pre-calculated and derived from a multiplicity of surfaces having different surface characteristics.

51. A method according to claim 50, wherein said multiplicity of surfaces from which said coefficients are derived are simulated surfaces.

52. A method according to claim 50, wherein said derivation of said coefficients comprises the steps of deriving from said multiplicity of surface data representing the energy distribution in diffraction patterns which would be produced from such surfaces utilizing said apparatus, calculating the surface roughness of such multiplicity of surfaces, deriving sets of reference values for said multiplicity of surfaces utilizing said surface roughness as calculated, and relating the values representing the energy distribution of diffraction patterns derived from said multiplicity of surfaces with said reference values derived from said multiplicity of surfaces by polynomial equations comprising unknown coefficients and obtaining best fit values for said unknown coefficients utilizing a mathematical technique.

53. A method according to claim 52, wherein said mathematical technique is a least means squares method.

54. A method according to claim 52, wherein said values representing said energy distribution in said diffraction patterns derived from said multiplicity of surfaces are divided into groups dependent upon the orders in said diffraction patterns and different sets of coefficients are derived for said different groups.

55. A method according to claim 54, wherein said groups are further divided according to the degree of asymmetry of said diffraction patterns derived from said multiplicity of surfaces.

56. A method according to claim 34, wherein said step of interpolation is performed according to the asymmetry in the diffraction pattern derived from the workpiece.

57. A method according to claim 56, wherein said asymmetry in said diffraction pattern derived from said workpiece is obtained by the step of summing the differences in the energies in the different pairs of orders in the diffraction pattern.

58. A method according to claim 56, wherein said asymmetry is quantized, said quantization being utilized in selecting the coefficients derived from the multiplicity of surfaces in said group.

59. A method for measuring a surface characteristic of a workpiece comprising the steps of:
 a) illuminating the workpiece to produce a diffraction pattern;
 b) deriving a plurality of signals dependent upon the energy distribution in said pattern;
 c) defining a plurality of algorithms with which said signals may be processed for determining said surface characteristics;
 d) selecting an algorithm from said plurality dependent upon the orders in the diffraction pattern, wherein a first algorithm is selected if said diffraction pattern has substantially only a zero order, and a second algorithm is selected if said diffraction pattern contains substantial energy in orders other than the zero order; and
 e) processing said signals with the selected algorithm to obtain said surface characteristic.

60. A method according to claim 59, wherein said step of selecting an algorithm is operative to count the orders in the diffraction pattern after discarding energy levels less than a predetermined percentage of the maximum energy level detected in said pattern.

61. A method according to claim 60, wherein said predetermined percentage is 10%.

62. A method according to claim 59, including the step of providing, for each of a plurality of values of surface roughnesses, a set of reference values representing the energy distribution in a diffraction pattern, wherein said second algorithm comprises comparing a set of values dependent upon the energy distribution in said pattern with said reference values.

63. A method according to claim 62, wherein said reference values are derived by the step of interpolation between a first set of reference values representative of the energy distribution in a diffraction pattern which would be produced from a relatively symmetrical surface and a second set of reference values representing the energy distribution in a diffraction pattern which would be produced from a relatively asymmetrical surface.

64. A method according to claim 59, wherein said first algorithm comprises calculating Rq from the Gaussian Algorithm formula $$Rq = \frac{\lambda}{4\pi} \sqrt{-\log_e(S_n)}$$

wherein $\lambda$ is representative of the wavelength of said illumination and $S_n$ is representative of the energy in the zero order of said diffraction pattern, wherein said selecting means selects said formula when said diffraction pattern comprises only the zero order.

65. Apparatus according to claim 64, comprising the step of performing a filtering operation on a set of signals representing the diffraction pattern comprising only the zero order prior to applying said formula.

66. A method of measuring a surface characteristic of a workpiece comprising:
 a) illuminating the workpiece to produce a diffraction pattern;
 b) deriving a plurality of signals dependent upon the energy distribution in said pattern;
 c) defining a plurality of algorithms with which said signals may be processed for determining said surface characteristic;
 d) selecting an algorithm from said plurality dependent upon the orders in the diffraction pattern, wherein one of said algorithms comprises calculating Rq from the Gaussian Algorithm formula $$Rq = \frac{\lambda}{4\pi} \sqrt{-\log_e(S_n)}$$

wherein $\lambda$ is representative of the wavelength of said illumination and $S_n$ is representative of the energy in the zero order of said diffraction pattern; and wherein said step of selecting selects said formula when said diffraction pattern comprises only the zero order; and
 e) processing said signals with the selected algorithm to obtain said surface characteristic.

* * * * *

UNITED STATES PATENT AND TRADEMARK OFFICE
CERTIFICATE OF CORRECTION

PATENT NO. : 5,488,476

DATED : January 30, 1996

INVENTOR(S) : Mansfield et al.

It is certified that error appears in the above-identified patent and that said Letters Patent is hereby corrected as shown below:

On the cover page the PCT information has been omitted, please insert --PCT/GB91/00550 filed 4/9/91--.

Column 1, line 5, "07/77,394" should read --07/777,349--.

Column 2, line 53, delete "is".

Column 9, line 58, "1.74" should read --174--.

Column 12, line 46, "well_known" should read --well known--.

Column 13, line 22, "Es." should read --$Es_j$--.

Column 13, line 55, "112.6rim." should read --112.6 nm--.

Column 14, line 50, "practice,that" should read --practice, that--.

Column 15, line 27, "=0," should read --$\alpha=0$,--.

Column 16, line 51, "3," should read --3, 4--.

Column 17, line 37, "60" should read --$\alpha$--.

Column 19, line 17, "$S_j$" should read --$S'_j$--.

Column 20, line 47, "Havinh" should read --Having--.

UNITED STATES PATENT AND TRADEMARK OFFICE
CERTIFICATE OF CORRECTION

PATENT NO. : 5,488,476

DATED : January 30, 1996

INVENTOR(S) : Mansfield et al.

It is certified that error appears in the above-identified patent and that said Letters Patent is hereby corrected as shown below:

Column 20, line 67, "order," should read --order),--.

Column 21, line 4, delete "reference" (second occurrence).

Column 21, line 9, after "each", insert --surface in the selected group its set of calculated--.

Column 21, lines 10-11, delete "surface in the selected group its set of calculated".

Column 21, line 12, delete "having" after --latter--.

Column 21, line 26, "$V_1=A_1T_0+B_1T_1+C_1T_1+M_1N$" should read --$V'_1=A'_1T_0+B'_1T_1+C'_1T_1+M'_1N$--.

Column 21, line 55, "patters" should read --patterns--.

Column 22, line 59, "o f" should read --of--.

Column 24, line 44, "here" should read --there--.

Column 25, line 54, insert "." after --nm--.

Column 26, line 26, delete "and" (second occurrence).

Column 26, line 33, "$S_j$" (second occurrence) should read --$S'_j$--.

UNITED STATES PATENT AND TRADEMARK OFFICE
CERTIFICATE OF CORRECTION

PATENT NO. : 5,488,476

DATED : January 30, 1996

INVENTOR(S) : Mansfield et al.

It is certified that error appears in the above-identified patent and that said Letters Patent is hereby corrected as shown below:

Column 26, line 48, "c" should read --$c$--.

Column 26, line 48, "s" should read --$s$--.

Column 27, line 42, delete "for" (second occurrence).

Column 29, line 3, insert --.-- after "therefrom".

Column 31, line 67, "run" should read --nm--.

Column 32, line 10, "arise" should read --arises--.

Column 32, line 41, "an" should read --at--.

Column 32, line 45, "24E-" should read --248 --.

Column 33, line 46, "$S_1$" (second occurrence) should read -- $S_1'$--.

Column 38, line 40, ""Type+" should read --"Type"--.

Column 38, line 41, ""Type+" should read --"Type"--.

Column 38, line 42, ""Type+" should read --"Type"--.

Column 40, line 14, "add" should read --and--.

Column 40, line 59, "min." should read --mm.--.

UNITED STATES PATENT AND TRADEMARK OFFICE
CERTIFICATE OF CORRECTION

PATENT NO. : 5,488,476

DATED : January 30, 1996

INVENTOR(S) : Mansfield et al.

It is certified that error appears in the above-identified patent and that said Letters Patent is hereby corrected as shown below:

Column 42, line 2, "5E" should read --5 mm--.

Table at columns 49 and 50, third subcolumn below Asymmetry Number 2 (second occurrence), row 5, "-.185876E+00" should read -- -.165876E+00--.

Table at columns 49 and 50, eleventh subcolumn below Asymmetry Number 3, row 4, ".210630E+00" should read --.201630E+00--.

Table at column 51, eleventh subcolumn, under Asymmetry Number 5, ".692389E-0      should read --.692389E-01
           .414009E+00                          .414009E+00
           .549125E-0                           .549125E-01
           .162621E+00                          .162621E+00
           .124399E+00                          .124399E+00
           .678904E-0                           .678904E-01
           .617896E-0                           .617896E-01
           .163150E-0                           .163150E-01
           .141543E-0"                          .141543E-01--.

UNITED STATES PATENT AND TRADEMARK OFFICE
CERTIFICATE OF CORRECTION

PATENT NO. : 5,488,476

DATED : January 30, 1996

INVENTOR(S) : Mansfield et al.

It is certified that error appears in the above-identified patent and that said Letters Patent is hereby corrected as shown below:

Column 56, line 15, "fails" should read --falls--.

Column 59, line 42, "comparing the" should read --comparing comprises the--.

Column 60, line 13 after "to" insert --88 nanometers is taken as correct--.

Signed and Sealed this

Twenty-seventh Day of August, 1996

Attest:

BRUCE LEHMAN

Attesting Officer

Commissioner of Patents and Trademarks